United States Patent
Borowicz et al.

(10) Patent No.: US 9,555,701 B2
(45) Date of Patent: Jan. 31, 2017

(54) SIDE-BY-SIDE UTILITY VEHICLE

(71) Applicant: Eicher Polaris Private Limited, New Delhi (IN)

(72) Inventors: David J. Borowicz, Roseau, MN (US); Jeremy T. Hulst, Roseau, MN (US)

(73) Assignee: Eicher Polaris Private Limited, New Delhi (IN)

( * ) Notice: Subject to any disclaimer, the term of this patent is extended or adjusted under 35 U.S.C. 154(b) by 0 days.

(21) Appl. No.: 14/809,750

(22) Filed: Jul. 27, 2015

(65) Prior Publication Data
US 2015/0329148 A1 Nov. 19, 2015

Related U.S. Application Data

(63) Continuation of application No. PCT/IN2014/000066, filed on Jan. 28, 2014.

(30) Foreign Application Priority Data

Jan. 28, 2013 (IN) .............................. 214/DEL/2013

(51) Int. Cl.
*B62D 33/02* (2006.01)
*B60N 2/36* (2006.01)
(Continued)

(52) U.S. Cl.
CPC ................ *B60K 17/16* (2013.01); *B60G 3/06* (2013.01); *B60K 17/08* (2013.01); *B60K 17/28* (2013.01);
(Continued)

(58) Field of Classification Search
CPC ................ B60N 2/01; B60N 2/04; B60N 2/36
(Continued)

(56) References Cited

U.S. PATENT DOCUMENTS 3,561,291 A   2/1971   Webster et al.
4,193,322 A   3/1980   Morino et al.
(Continued)

FOREIGN PATENT DOCUMENTS

DE   4029058 A1   3/1992
DE   19529312 A1  3/1996
(Continued)

OTHER PUBLICATIONS

International Search Report and Written Opinion issued by the European Patent Office, Oct. 29, 2014, for International Application No. PCT/IN2014/000066; 18 pages.
(Continued)

*Primary Examiner* — Dennis H Pedder
(74) *Attorney, Agent, or Firm* — Faegre Baker Daniels LLP

(57) ABSTRACT

A utility vehicle comprises a plurality of ground engaging members and a frame supported by the plurality of ground engaging members. The utility vehicle includes a front seating area and a rear seating area. A rear cargo bed is reconfigurable from a configuration where it is rearward of the rear seating area to a second configuration where it includes the rear seating area space. The vehicle includes a transmission having a final drive portion and a plurality of transmission shafts housed in a common housing, the final drive portion being forward of an end of the plurality of transmission shafts. The vehicle also includes a front suspension and a rear suspension.

5 Claims, 57 Drawing Sheets

(51) Int. Cl.
  *B60K 17/16* (2006.01)
  *B62D 33/06* (2006.01)
  *B60K 17/28* (2006.01)
  *F16H 57/037* (2012.01)
  *B60N 2/04* (2006.01)
  *B60N 2/01* (2006.01)
  *B60K 17/08* (2006.01)
  *B62D 33/023* (2006.01)
  *B62D 47/00* (2006.01)
  *B60G 3/06* (2006.01)
  *F16H 57/031* (2012.01)
  *B60P 3/42* (2006.01)
  *F16H 57/02* (2012.01)
  *F16H 57/023* (2012.01)

(52) U.S. Cl.
  CPC . *B60N 2/01* (2013.01); *B60N 2/04* (2013.01); *B60P 3/423* (2013.01); *B62D 33/023* (2013.01); *B62D 33/0617* (2013.01); *B62D 47/003* (2013.01); *F16H 57/031* (2013.01); *F16H 57/037* (2013.01); *B60G 2300/124* (2013.01); *B60G 2300/13* (2013.01); *B60Y 2200/20* (2013.01); *F16H 2057/02026* (2013.01); *F16H 2057/0235* (2013.01); *F16H 2057/02056* (2013.01)

(58) Field of Classification Search
  USPC .......................................... 296/66, 69, 65.01
  See application file for complete search history.

(56) References Cited

U.S. PATENT DOCUMENTS

| | | |
|---|---|---|
| 4,888,854 A * | 12/1989 | Russell et al. ......... B60N 2/366 |
| | | 16/260 |
| 6,851,741 B1 | 2/2005 | Burg |
| 6,905,159 B1 | 6/2005 | Saito et al. |
| 2008/0023249 A1 | 1/2008 | Sunsdahl et al. |
| 2009/0223312 A1 | 9/2009 | Yamaguchi |
| 2009/0301830 A1 | 12/2009 | Kinsman et al. |
| 2011/0156420 A1 | 6/2011 | Yasui et al. |
| 2011/0156427 A1 | 6/2011 | Morita et al. |
| 2012/0193163 A1 | 8/2012 | Wimpfheimer et al. |

FOREIGN PATENT DOCUMENTS

| | | | |
|---|---|---|---|
| EP | 0041320 | A2 | 12/1981 |
| EP | 0899477 | A2 | 3/1999 |
| EP | 2505458 | A1 | 10/2012 |
| FR | 2380157 | A1 | 9/1978 |
| FR | 2775228 | * | 8/1999 |
| GB | 814210 | | 6/1959 |
| GB | 2023518 | A | 1/1980 |
| JP | 2005178783 | A | 7/2005 |
| JP | 2010236582 | A | 10/2010 |
| WO | WO2012/109546 | A1 | 8/2012 |

OTHER PUBLICATIONS

International Preliminary Report on Patentability issued by The International Bureau of WIPO, Oct. 6, 2015, for International Application No. PCT/IN2014/000066; 36 pages.

* cited by examiner

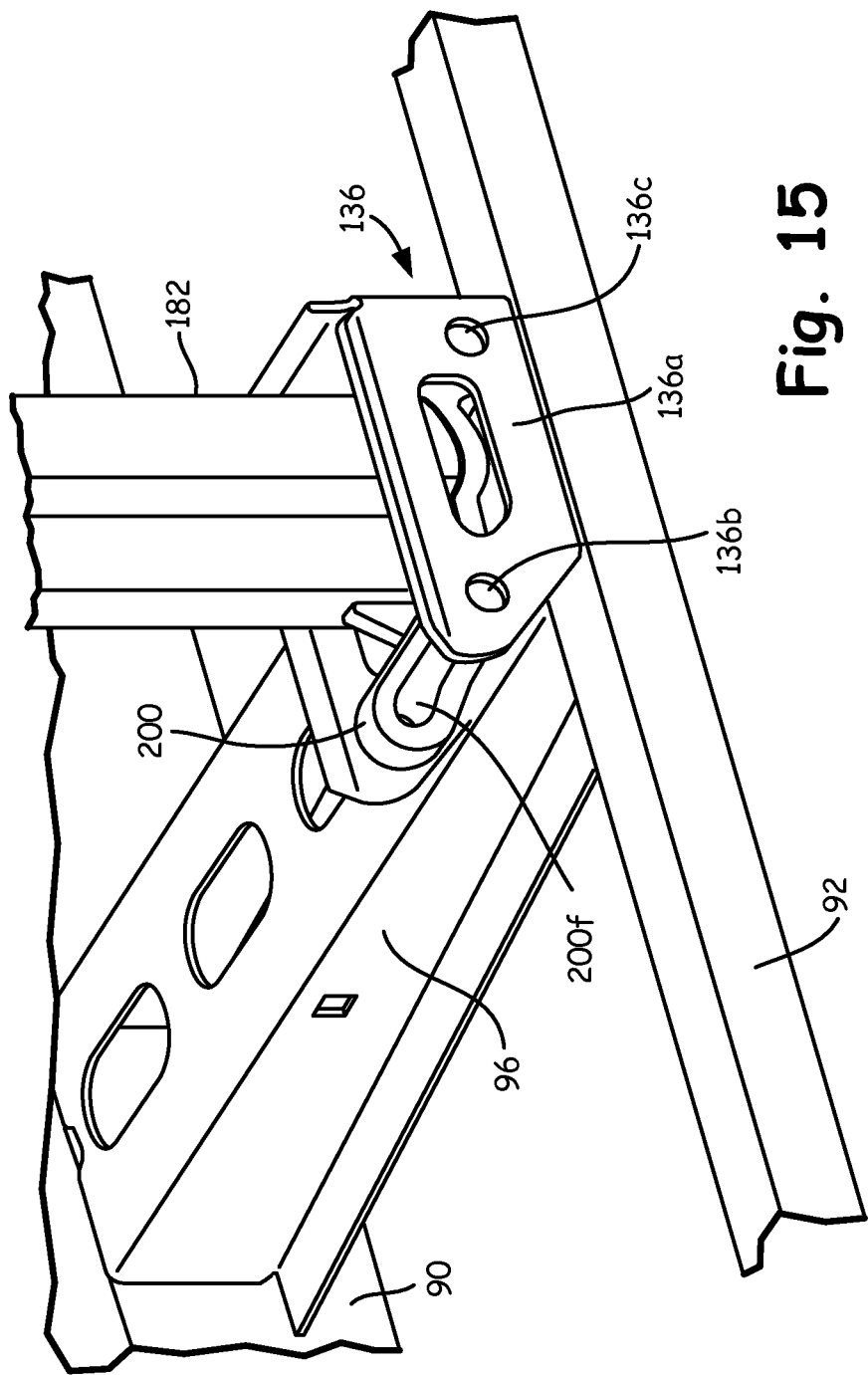

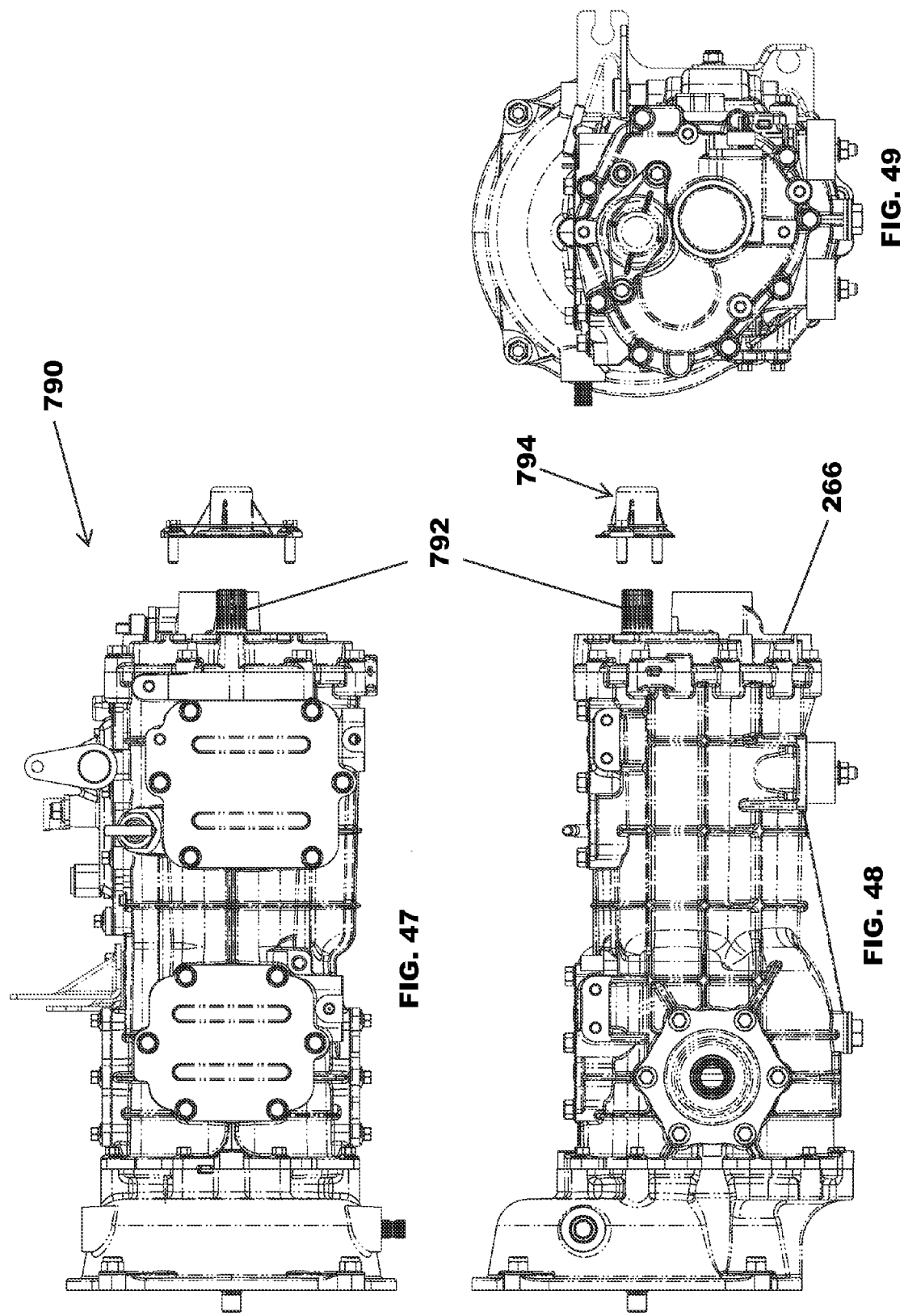

_US 9,555,701 B2_

SIDE-BY-SIDE UTILITY VEHICLE

The present application is a continuation under 35 U.S.C. §363 of PCT application number PCT/IN2014/000066 filed Jan. 28, 2014, which in turn claims priority to Indian Provisional Patent Application No. 214/DEL/2013, filed Jan. 28, 2013, the subject matter of each being incorporated herein by reference.

BACKGROUND OF THE DISCLOSURE

The present disclosure generally relates to side-by-side utility vehicles and, more particularly, to side-by-side utility vehicles configured to support at least front-end attachments.

Generally, all terrain vehicles and utility vehicles are used to carry one or two passengers and cargo over a variety of terrains. Typically, the cargo is carried in a rear cargo box of such vehicles.

Exemplary utility vehicles configured to support at least one passenger and cargo are available from Polaris Industries Inc. of Medina, Minn., and are disclosed in U.S. Pat. No. 7,819,220, issued on Oct. 26, 2010; U.S. Provisional Patent Application No. 61/442,071, filed on Feb. 11, 2011; U.S. patent application Ser. No. 13/1370,139, filed on Feb. 9, 2012; U.S. patent application Ser. No. 13/464,603, filed on May 4, 2012; U.S. patent application Ser. No. 13/492,589, filed on Jun. 8, 2012; and International Patent Application No. PCT/US2011/031376, filed on Apr. 6, 2011, the complete disclosures of which are expressly incorporated by reference herein.

SUMMARY OF THE DISCLOSURE

In another aspect, a utility vehicle comprises a plurality of ground engaging members; a frame supported by the ground engaging members and including a front frame portion and a rear frame portion, the frame defining a longitudinal axis, the frame including a support for a front seating area and a rear seating area; front seats supported by the front frame portion having a seat bottom and a seat back, the seat back having panel portion; rear seats supported by the rear frame portion having a seat bottom and a seat back, the seat back having panel portion; an engine supported by the frame, the engine being positioned under the rear seating area; and a utility box being positioned behind the rear seats, the utility box having a first configuration where a front of the utility box is defined by the rear seat panel portion and an enlarged configuration where a front of the utility box is defined by the front seat panel portion.

In yet another embodiment a utility vehicle comprises a plurality of ground engaging members; a frame supported by the ground engaging members and including a front frame portion and a rear frame portion, the frame defining a longitudinal axis, the frame including a support for a front seating area and a rear seating area; front seats supported by the front frame portion having a seat bottom and a seat back, the seat back having panel portion; rear seats supported by the rear frame portion having a seat bottom and a seat back, the seat back having panel portion; a utility box being positioned behind the rear seating area; the rear seat bottom is positioned on a structural panel, and the rear seat bottom is removable whereby the rear seat bottom structural panel defines a floor portion of the enlarged cargo floor; and the rear seat back includes a structural panel, and the rear seat back is removable whereby the rear seat back structural panel defines another floor portion of the enlarged cargo floor.

In another embodiment, a utility vehicle comprises a plurality of ground engaging members, including front and rear ground engaging members, the front ground engaging members including front wheels having an axial center line; a frame supported by the ground engaging members and including a front frame portion and a rear frame portion, the frame defining a longitudinal axis; front struts coupled between the front wheels and the frame; a front suspension including an alignment arm coupled between the frame and the front wheels; a steering assembly generally comprising a steering gear, hub, and steering linkage, wherein steering gear being positioned forward of the axial center line of front wheels by a distance, which moves steering motor away from a quadrant; and operator's controls positioned in the quadrant.

In another embodiment, a utility vehicle comprises a plurality of ground engaging members, including front and rear wheels; a frame supported by the ground engaging members and including a front frame portion and a rear frame portion; a rear suspension including an upper alignment arm coupled between the frame and the rear wheels; and a spindle assembly coupled between the upper and lower alignment arms, the spindle assembly includes a hub, a knuckle, a backing plate, a bearing, and drive member, wherein the bearing has an upper race being fixed relative to backing plate and knuckle, and a lower race fixed relative to hub and drive member.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 15 is an enlarged perspective view of the middle attachment mechanism of the frame assembly of FIG. 13;

FIG. 47 is a top view of an alternate transmission with an integrated PTO shaft;

FIG. 48 is a left side view of the transmission shown in FIG. 47; and

FIG. 49 shows an end view of the transmission shown in FIG. 47.

DETAILED DESCRIPTION OF THE DRAWINGS

Figure 1:
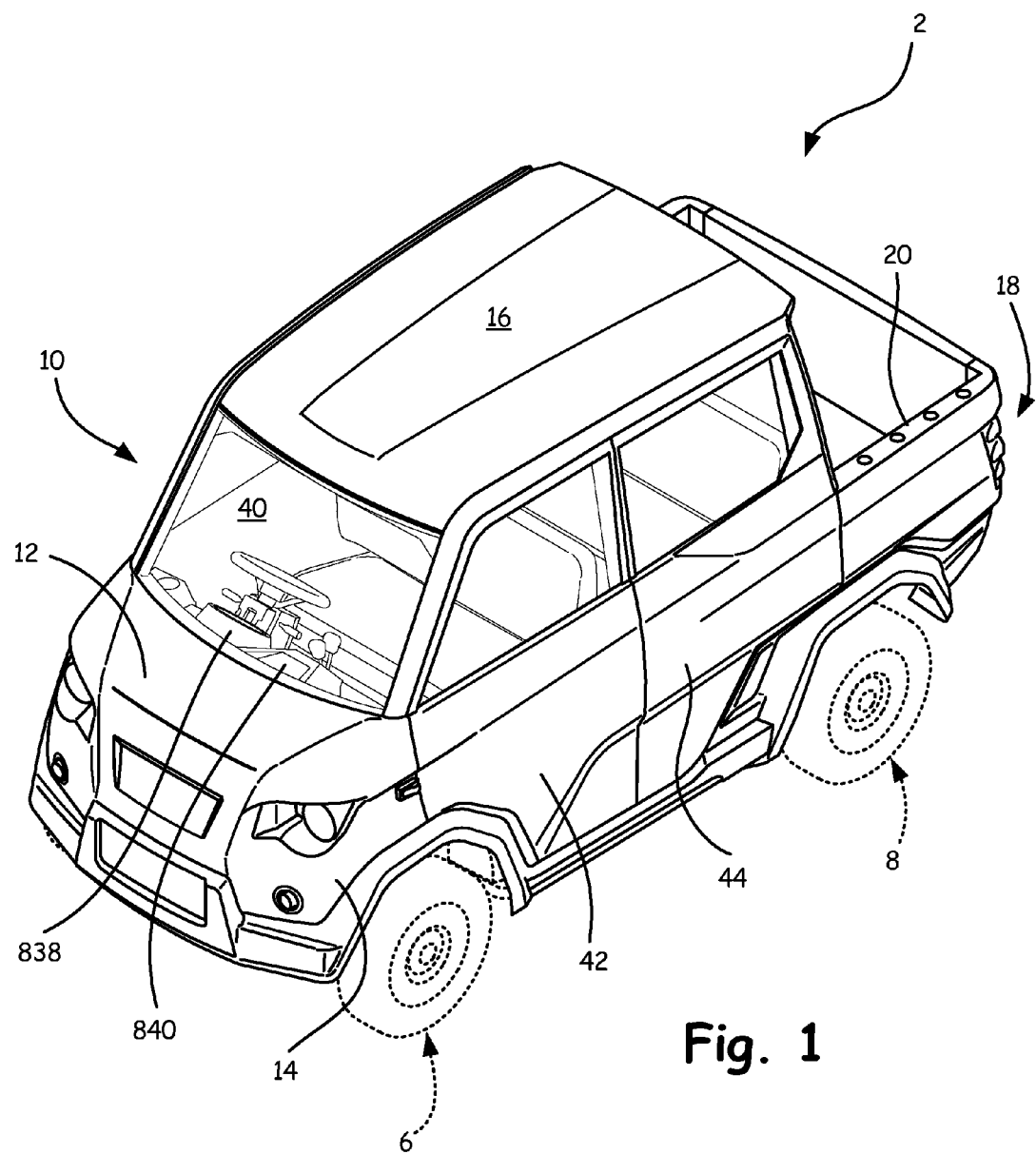
FIG. 1 is a front left perspective view of an exemplary utility vehicle of the present disclosure.
Figure 2:
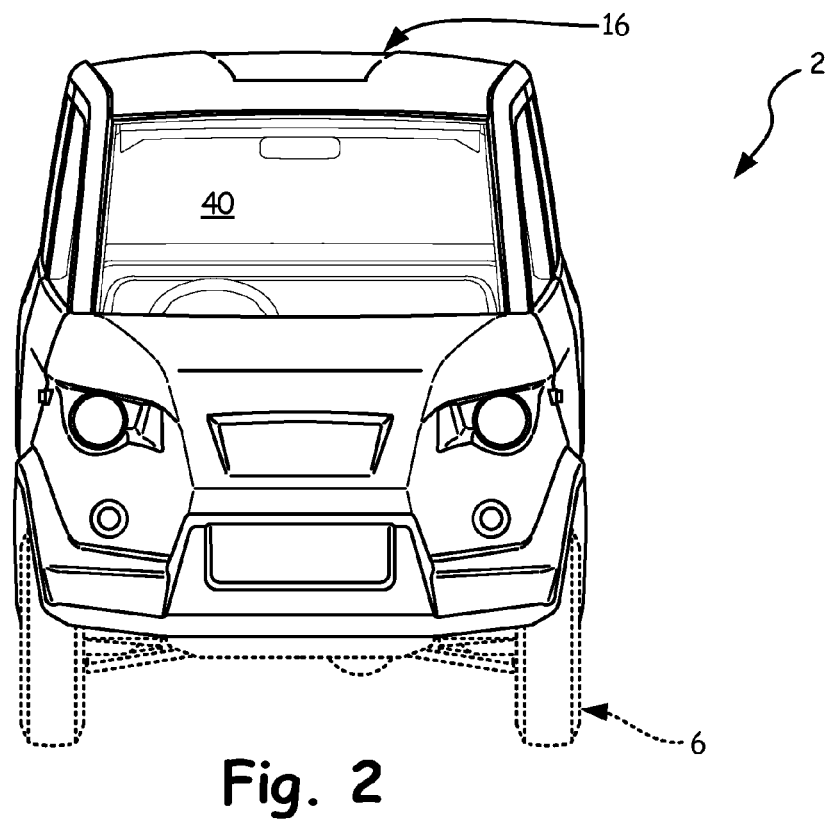
FIG. 2 is a front view of the vehicle of FIG. 1.
Figure 3:
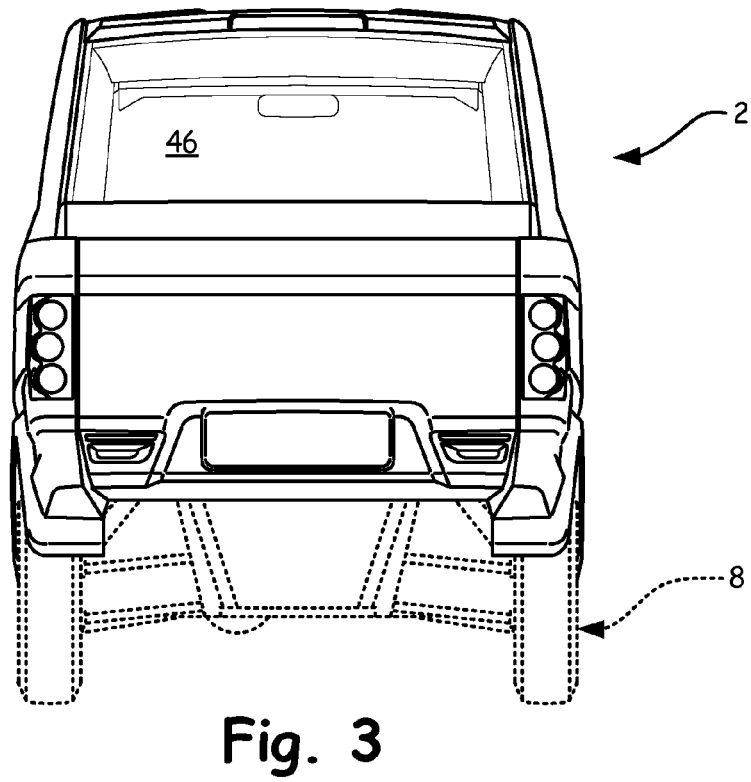
FIG. 3 is a rear view of the vehicle of FIG. 1.
Figure 4:
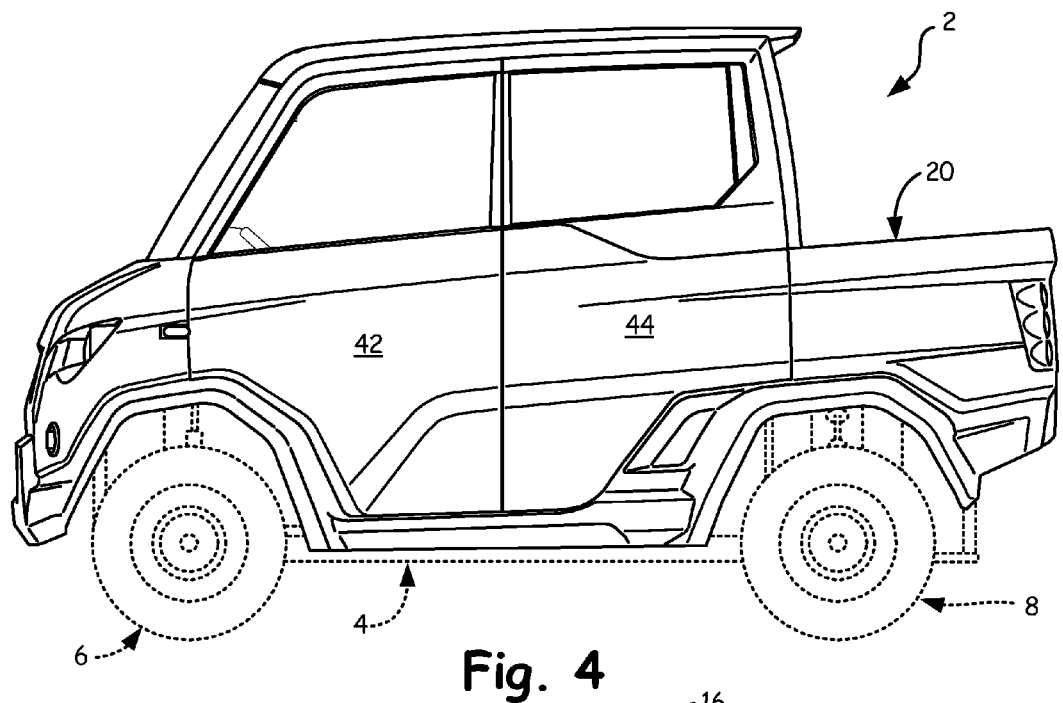
FIG. 4 is a left side view of the vehicle of FIG. 1.
Figure 5:
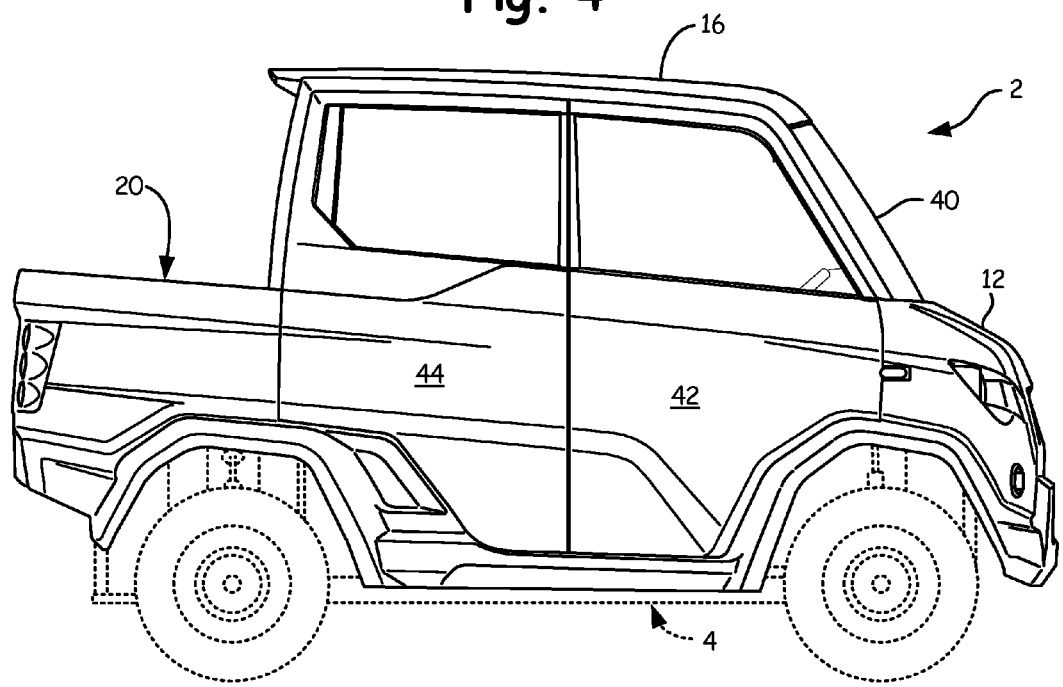
FIG. 5 is a right side view of the vehicle of FIG. 1.
Figure 6:
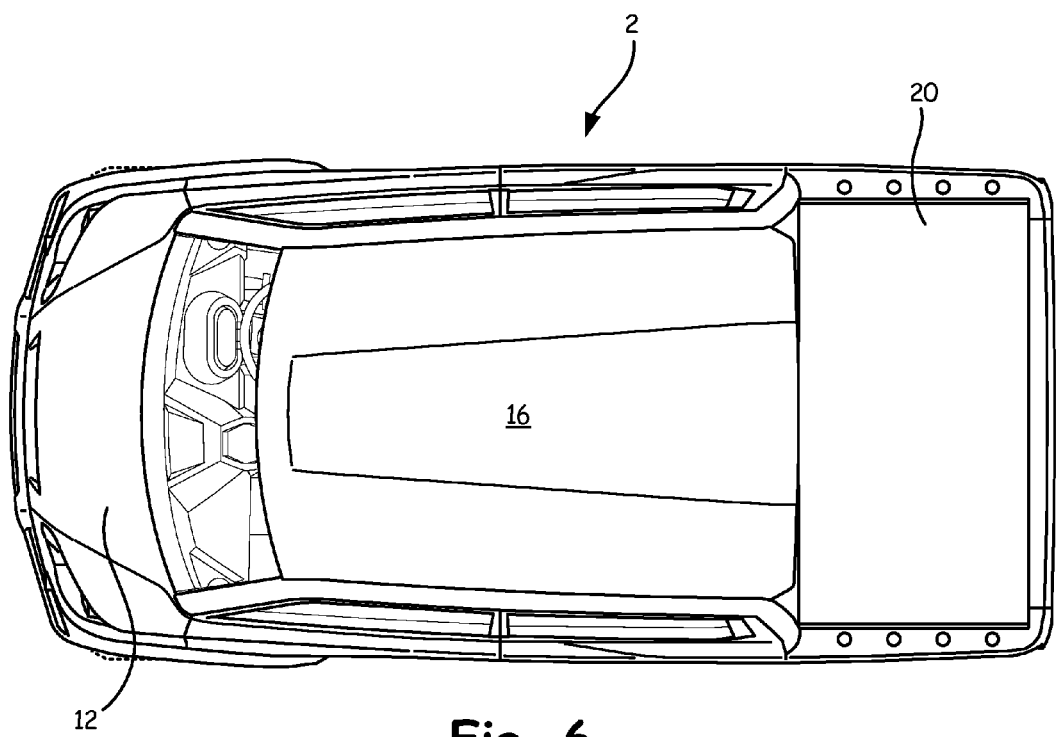
FIG. 6 is a top view of the vehicle of FIG. 1.
Figure 7:
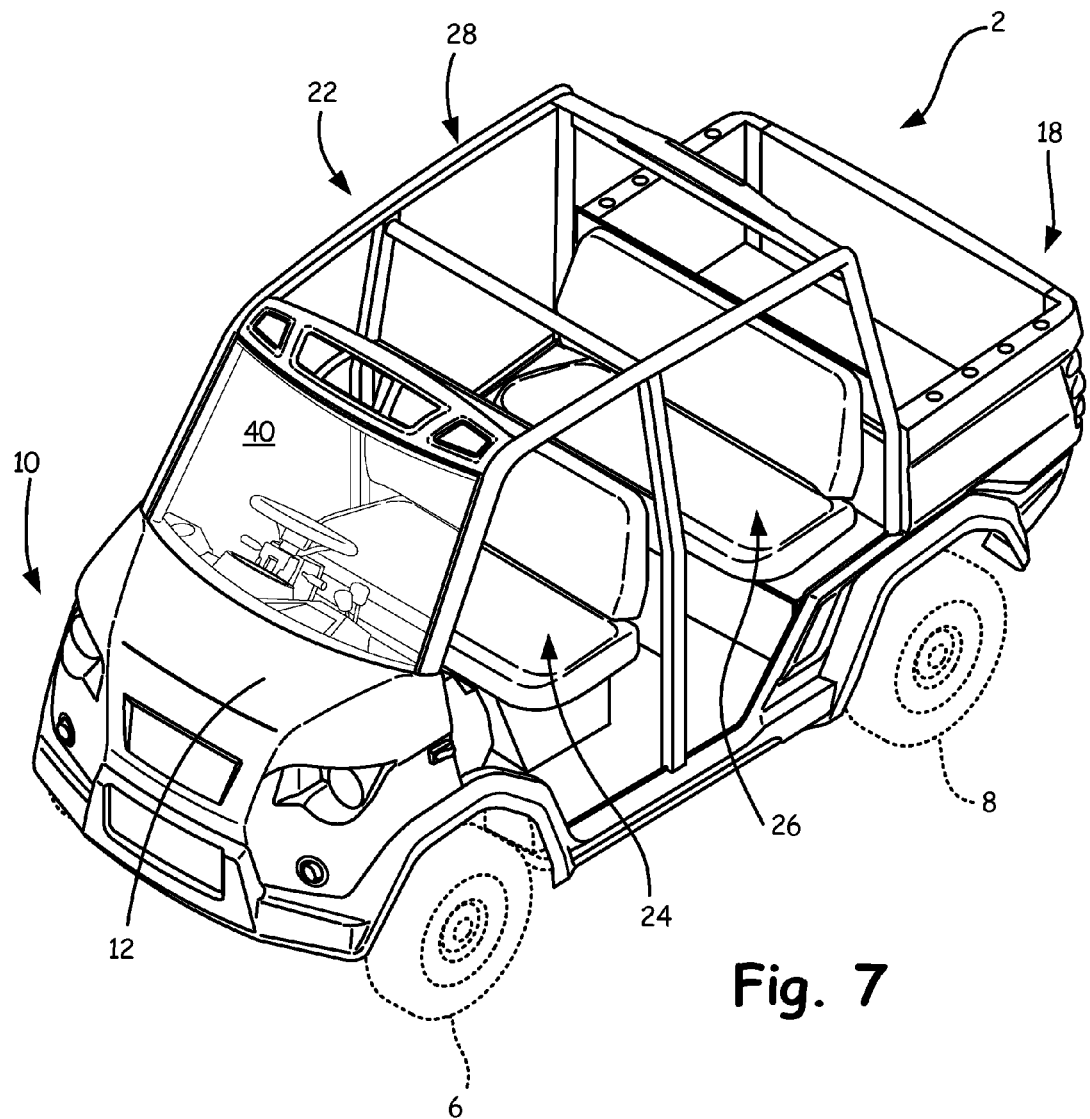
FIG. 7 is a front left perspective view of the exemplary utility vehicle of FIG. 1, with the roof panel and doors removed.
Figure 8:
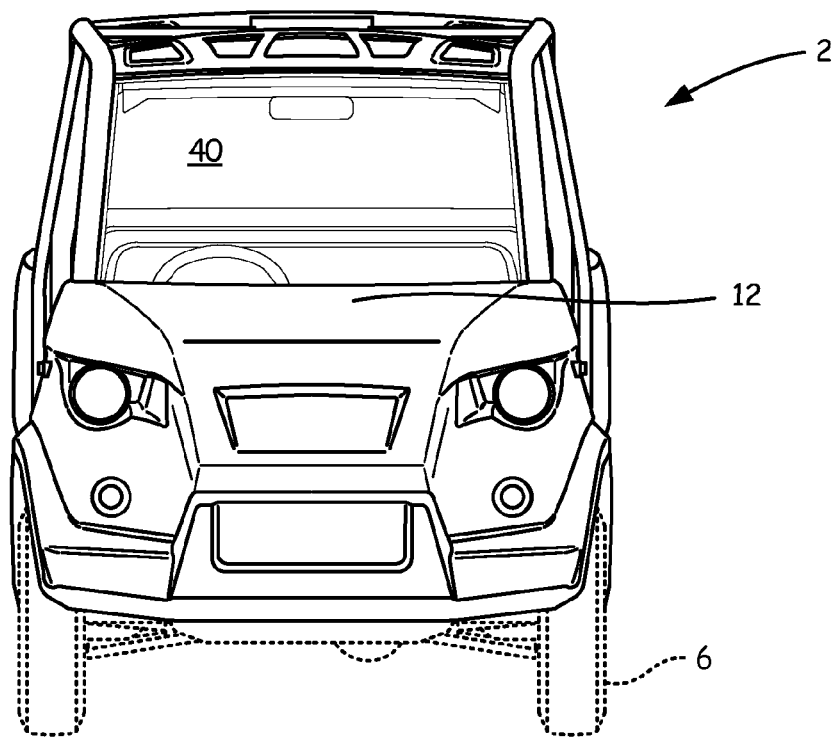
FIG. 8 is a front view of the exemplary utility vehicle of FIG. 1, with the roof panel and doors removed.
Figure 9:
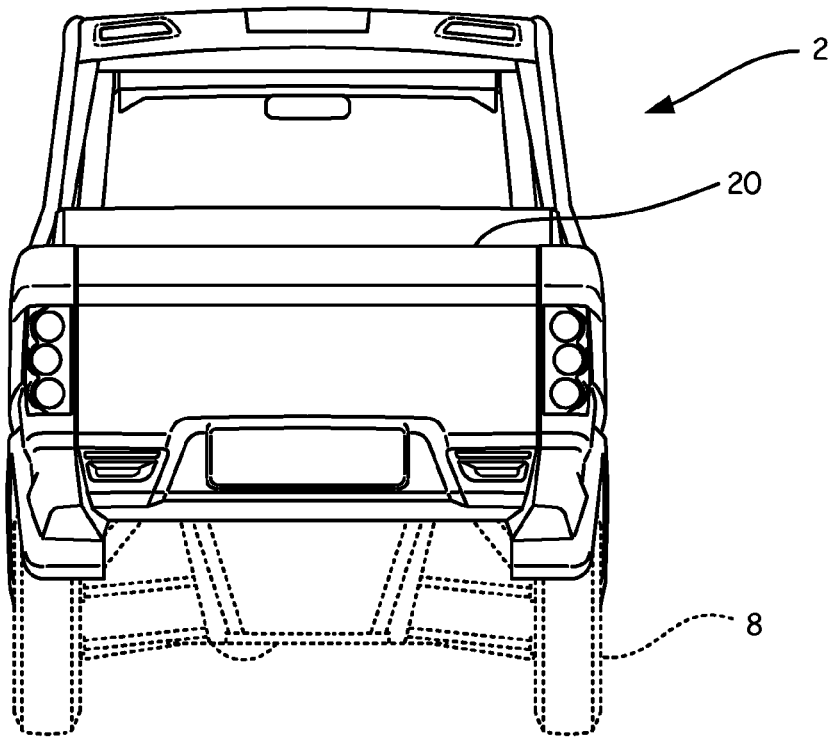
FIG. 9 is a rear view of the exemplary utility vehicle of FIG. 1, with the roof panel and doors removed.
Figure 10:
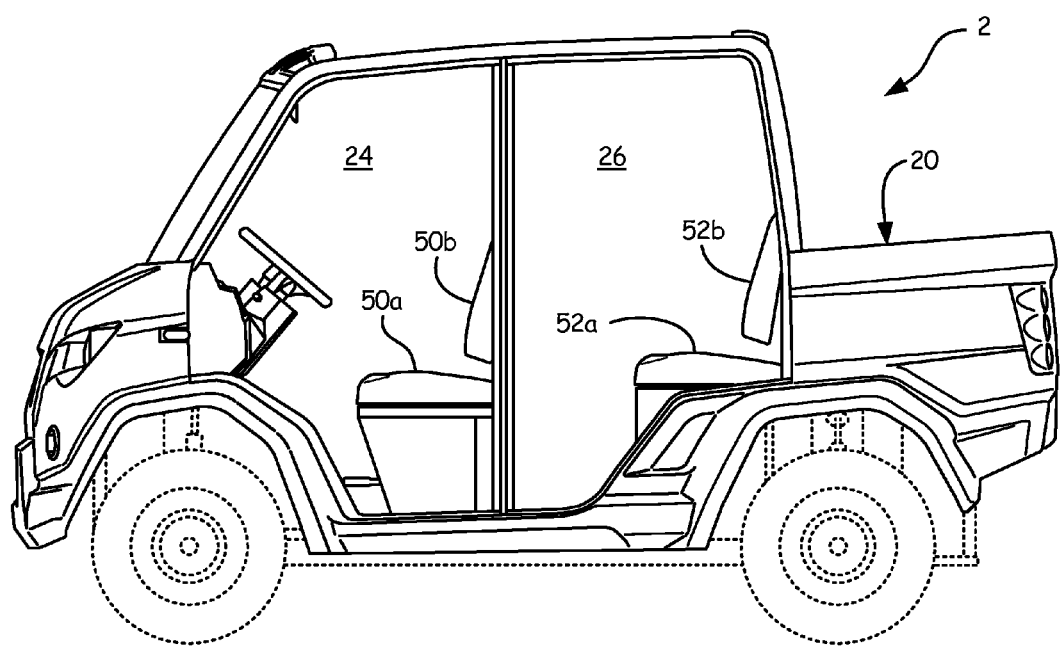
FIG. 10 is a left side view of the exemplary utility vehicle of FIG. 1, with the roof panel and doors removed.
Figure 11:
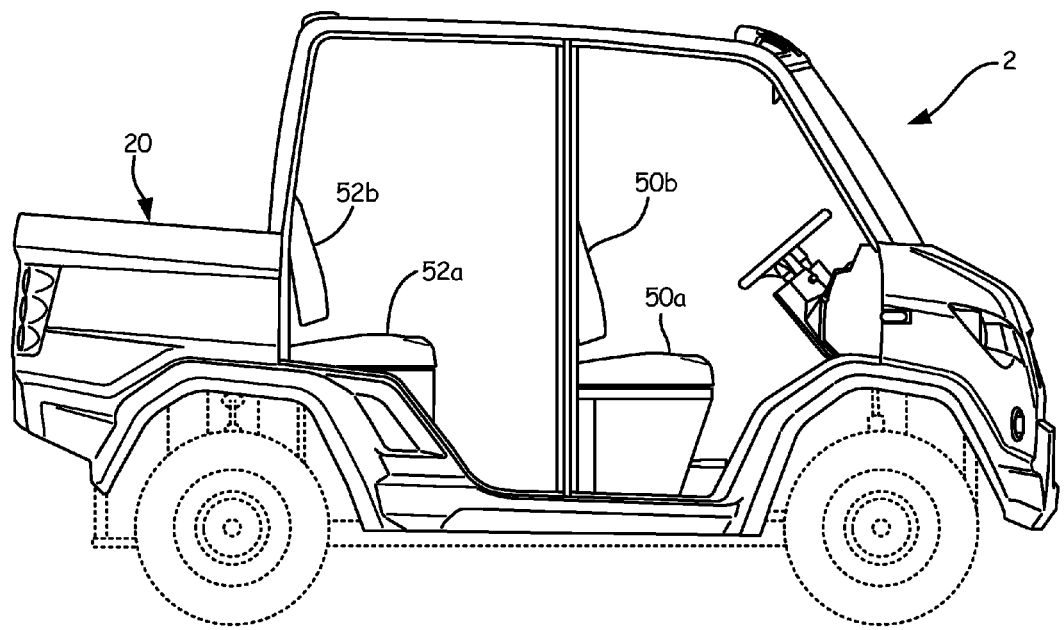
FIG. 11 is a right side view of the exemplary utility vehicle of FIG. 1, with the roof panel and doors removed.
Figure 12:
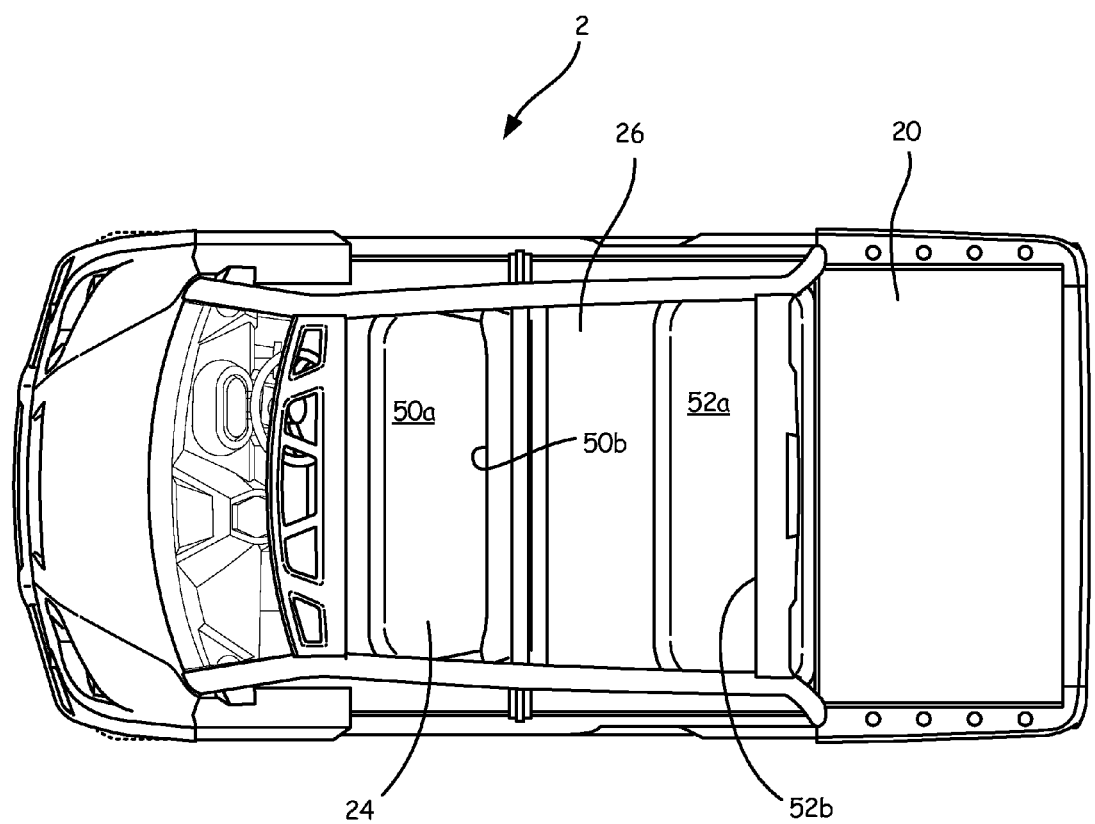
FIG. 12 is a top view of the exemplary utility vehicle of FIG. 1, with the roof panel and doors removed.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIGS. 1-6, a utility vehicle 2 generally includes a frame assembly 4 (FIGS. 4 and 5) supported by a plurality of ground engaging members, for example front wheels 6 and rear wheels 8. Utility vehicle 2 includes a front end 10 having a hood 12, side body panels 14 and roof 16. A rear end 18 of utility vehicle 2 includes a utility cargo box 20.

Vehicle 2 is modular in nature, having the provision of an interior of the vehicle enclosed (FIGS. 1-6) or open (FIGS. 7-12). As shown best in FIG. 7, an integrated operator cab 22 is supported on frame assembly 4 between front end 10 and rear end 18 and illustratively encloses an operator area 24. A passenger area 26 is defined rearwardly of the operator's area as further described herein. A cab frame 28 surrounds operator cab 22 and may support a front windshield 40. In the case of the enclosed version, cab frame 28 supports front doors 42, rear doors 44, roof 16, and a rear windshield 46 (FIG. 3), all of which may be removably coupled from cab frame 28. It should be understood that the base vehicle as shown in FIGS. 7-12 is identical to that of FIGS. 1-6; the enclosed version of FIGS. 1-6 simply includes the additional features of the roof 16, doors 42, 44 and rear windshield 46.

Additional possible features of operator cab 22 and cab frame 28 are disclosed in U.S. Provisional Patent Application No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Operator area 24 comprises a seating assembly 50 in the form of a bench seat, comprising a seat bottom 50a and a seat back 50b (FIG. 11), and rear passenger area 26 includes bench seat 52 including a seat bottom 52a and a seat back 52b. While individual captain's type chairs or bucket seats are also possible for the seating arrangements, bench seats allow a more efficient modular nature to the vehicle as will be described herein. That is, rear seat 52 is reconfigurable to enlarge the volume of the utility cargo box 20 when the rear passenger area is not needed, as further described herein.

Figure 13:
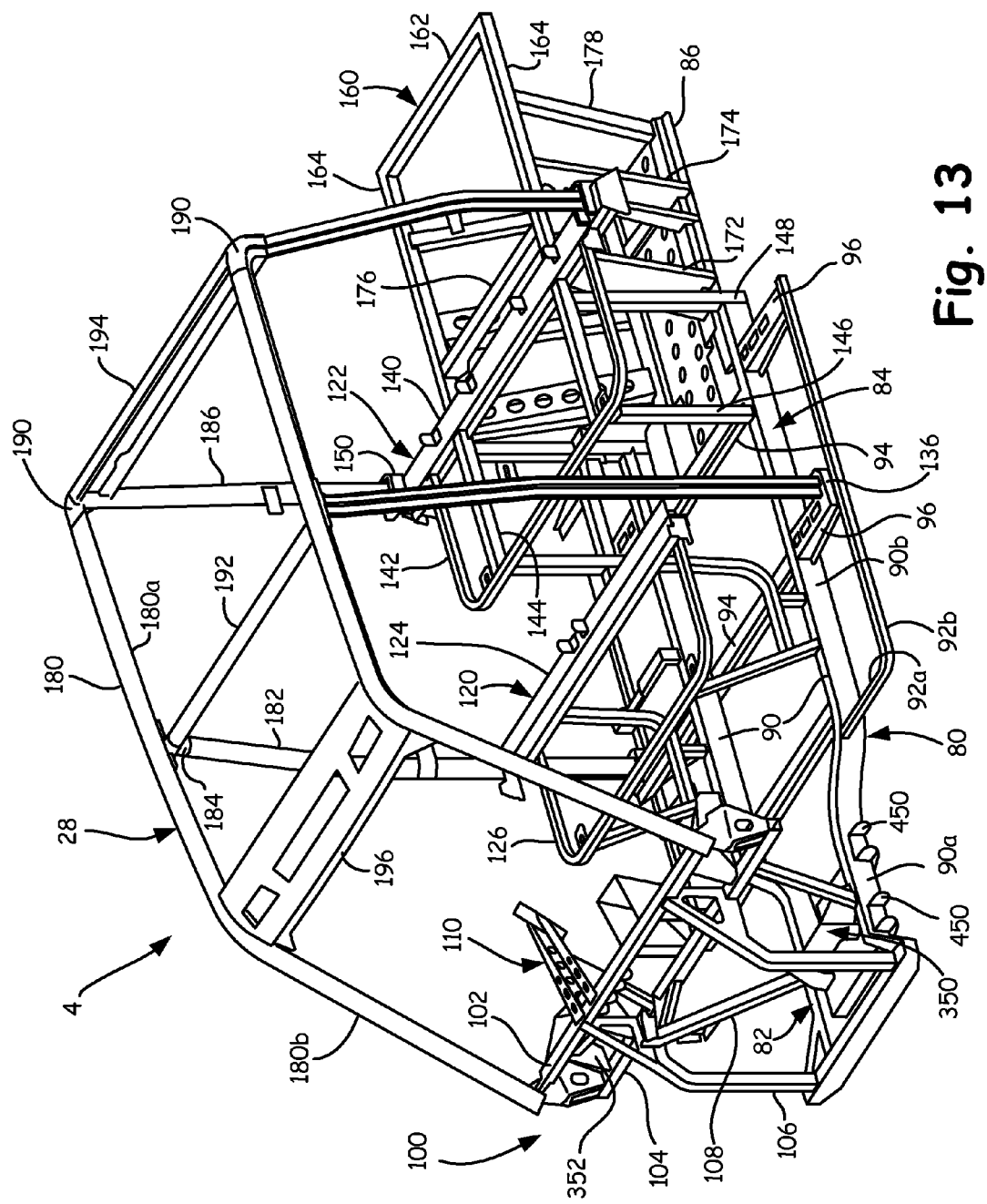
FIG. 13 is a left front perspective view of the frame assembly for the vehicles of FIGS. 1-12.
Figure 14:
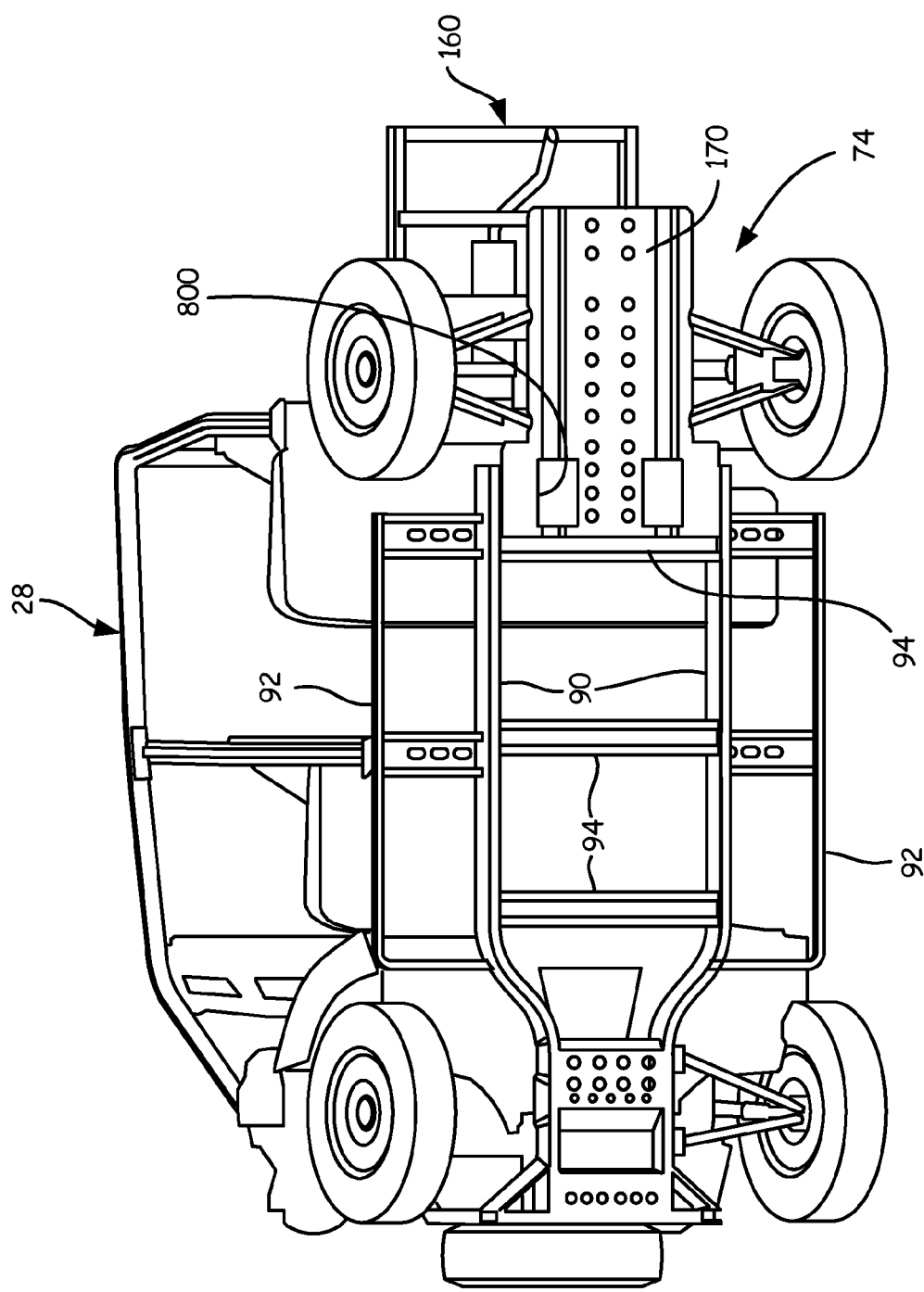
FIG. 14 is an underside perspective view of the frame assembly of FIG. 13.

Frame assembly 4 supports the systems of utility vehicle 2, such as powertrain system 60 (FIGS. 24-28), an air intake system 62 (FIG. 29), exhaust system 64 (FIG. 29), steering system 70 (FIGS. 30-33), front suspension system 72 (FIGS. 30-33), and rear suspension system 74 (FIGS. 34-35), all of which are further detailed herein. Frame assembly 4 further supports the seats and body components referred to above as well as the utility cargo box 20, as further detailed herein. With reference now to FIGS. 13 and 14, frame 4 will be described in further detail.

Frame assembly 4 generally includes a lower frame portion 80 comprising a frame portion 82 for supporting the front wheels 6, a frame portion 84 for supporting the seats 50, 52, and a frame portion 86 for supporting the cargo box 20 and rear wheels 8. The entire lower frame portion supports the cab frame 28 as described herein. Frame portion 80 includes a plurality of lower longitudinal frame tubes 90 extending generally lengthwise between frame portion 82 and frame portion 86. Illustratively, lower longitudinal frame tubes 90 each include a front portion 90a and a rear portion 90b, which flares outwardly from front portion 90a. An outer frame member 92 is positioned laterally outward from lower longitudinal frame tubes 90. More particularly, a front portion 92a of outer frame member 92 is adjacent to, and couples with, frame tube 90, and an outer portion 92b of outer frame member 92 is spaced apart from rear portion 90b of lower longitudinal frame tube 90. Cross tubes 94 extend between lower longitudinal frame tube portions 90b. Frame channels 96 integrally couple each longitudinal frame tube 90b with the adjacent outer frame member 92b.

With reference still to FIG. 13, frame portion 82 includes transverse support structure 100 including transverse frame tubes 102, 104 supported by way of upright frame tubes 106, 108. Steering support 110 extends from transverse tube 102 and support brackets 112 are supported by transverse tube 104. Frame portion 82 further includes structure to support the steering and front suspension as further described herein.

Frame portion 84 supports front seat frame 120 and rear seat frame 122. As shown, front seat frame 120 includes cross-channel 124, seat hoop 126, each of which is supported by frame uprights 128 and 130. Frame portion 84 further includes bracket portion 136 as described in greater detail herein. Rear seat frame 122 includes cross channel 140 having a frame hoop 142 supported by frame uprights 146, 148. Transverse channel 140 further supports brackets 150 on each end thereof as further described herein.

Frame portion 86 includes a utility box support portion 160 comprised of transverse frame tube 162 and side frame tubes 164. As shown, side frame tubes 164 extend from an opposite side of frame channel 140 and are aligned with frame tubes 144 of seat frame 122. Frame tubes 144, 164, are also at a common height defining a planar surface as described herein. Frame portion 86 further includes rear skid plate 170 supporting front frame channels 172, extending upwardly to frame channel 140, and rear channels 174 extending upwardly to side tubes 164. Further support is provided by cross tube 176 and rear upright tubes 178.

With reference still to FIGS. 13 and 14, cab frame 28 includes upper portions 180 having longitudinally extending sections 180a and front portions at 180b. Front portions 180b are coupled to brackets 112 as further described herein. Cab frame 28 further includes uprights 182 attached to couplers 184 and uprights 186 attached to couplers 190. Couplers 184 are profiled to couple with uprights 182, cross member 192 and upper portion 180. Couplers 190 are profiled to couple with longitudinally extending sections 180a, uprights 186, and cross member 194. Uprights 182 are coupled to frame portion 84 at bracket 136 and uprights 186 are coupled to brackets 150 as further described herein. A front cross member 196 extends between upper portions 180. It should be appreciated that the frame tubes 180, 182, and 186, and cross member 196 have a cross sectional profile defining surfaces facilitating the accommodation of the windshield, roof, and doors, as more fully described in U.S. Pending application Ser. No. 13/492,589; the subject matter of which is fully incorporated herein by reference.

Figure 16A:
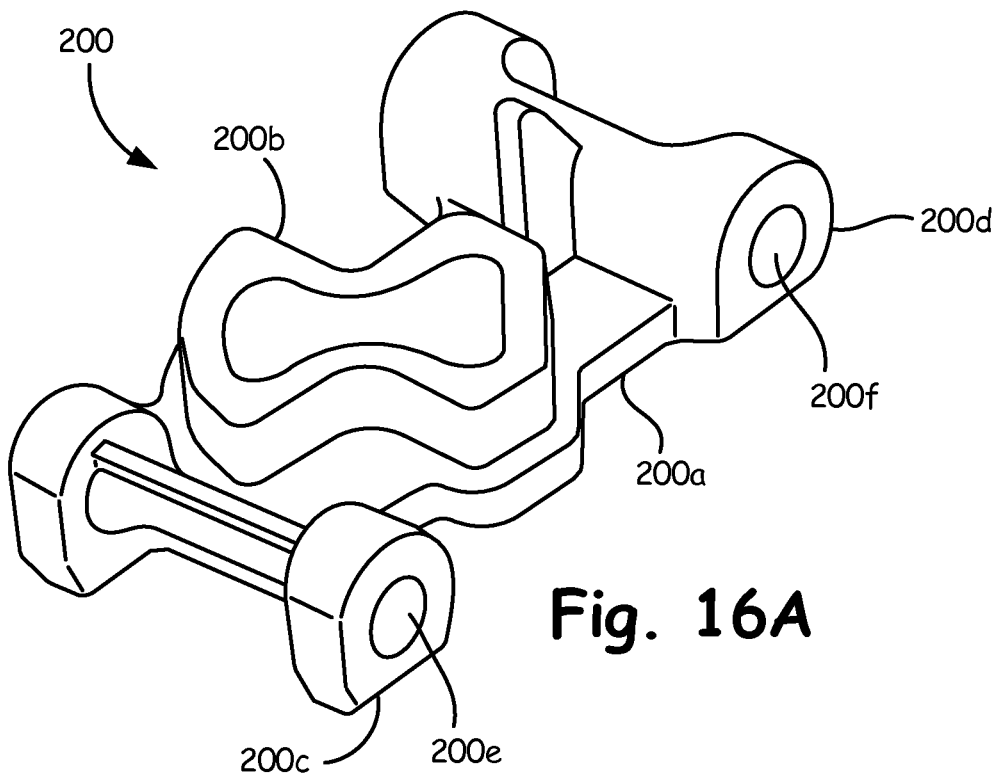
FIG. 16A is a perspective view of the attachment insert utilized in the middle attachment mechanism.
Figure 16B:
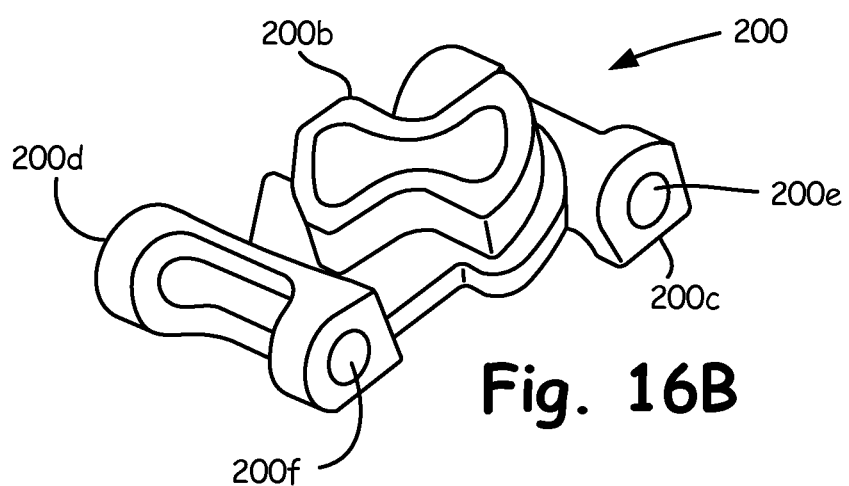
FIG. 16B is a second perspective view of the attachment insert utilized in the middle attachment mechanism.

With reference now to FIGS. 15, 16A, and 16B, the interconnection of upright tube 182 of cab frame 28 is shown attached to bracket 136. As shown, an insert 200 facilitates the coupling of tube 182 to bracket 136. As shown in FIGS. 16A and 16B, coupler 200 includes a base portion 200a supporting a contoured insert 200b, which fits internally of frame tube 182. Transverse bosses 200c and 200d provide mounting apertures 200e and 200f, respectively. With reference again to FIG. 15, bracket 136 includes side plates 136a providing apertures at 136b and 136c, which are profiled to cooperate with apertures 200f and 200e, respectively, on insert 200. It should be appreciated that fasteners (not shown) may be positioned through apertures 136b, 200f, and 136e, 200e, to retain the combination of the frame tube 182 and coupler 200 to channel 96. It should be appreciated that frame tube 182 and coupler 200 are bonded together by any known means such as by welding, fasteners, or industrial adhesive.

Figure 17:
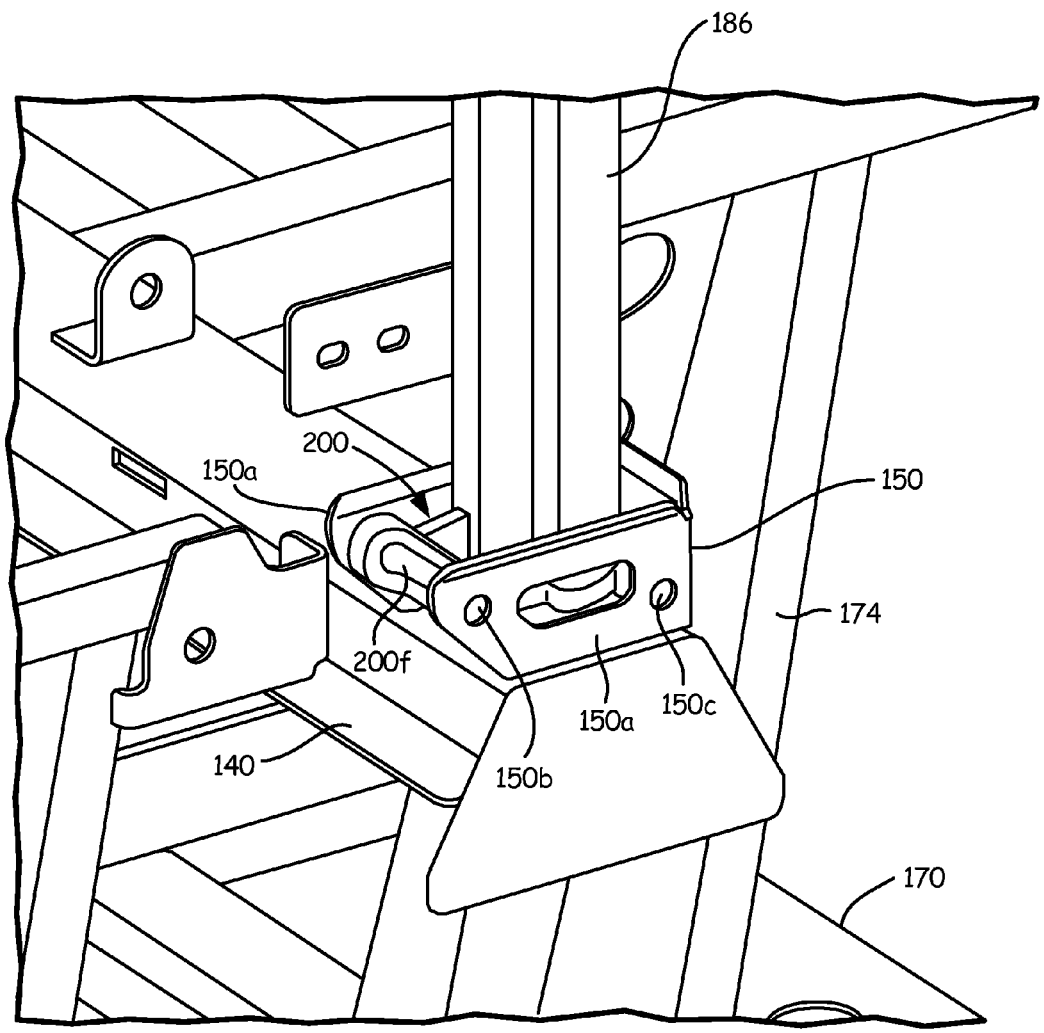
FIG. 17 is an enlarged perspective view of the rear attachment mechanism of the frame assembly of FIG. 13.

With reference now to FIG. 17, frame tube 186 is shown attached to bracket 150, which in turn is attached to cross channel 140. As shown, an identical coupler 200 is utilized with frame tube 186 and bracket 150 includes side plates 150a having apertures 150b, 150c for alignment with apertures 200f, 200e, of coupler 200.

Figure 18:
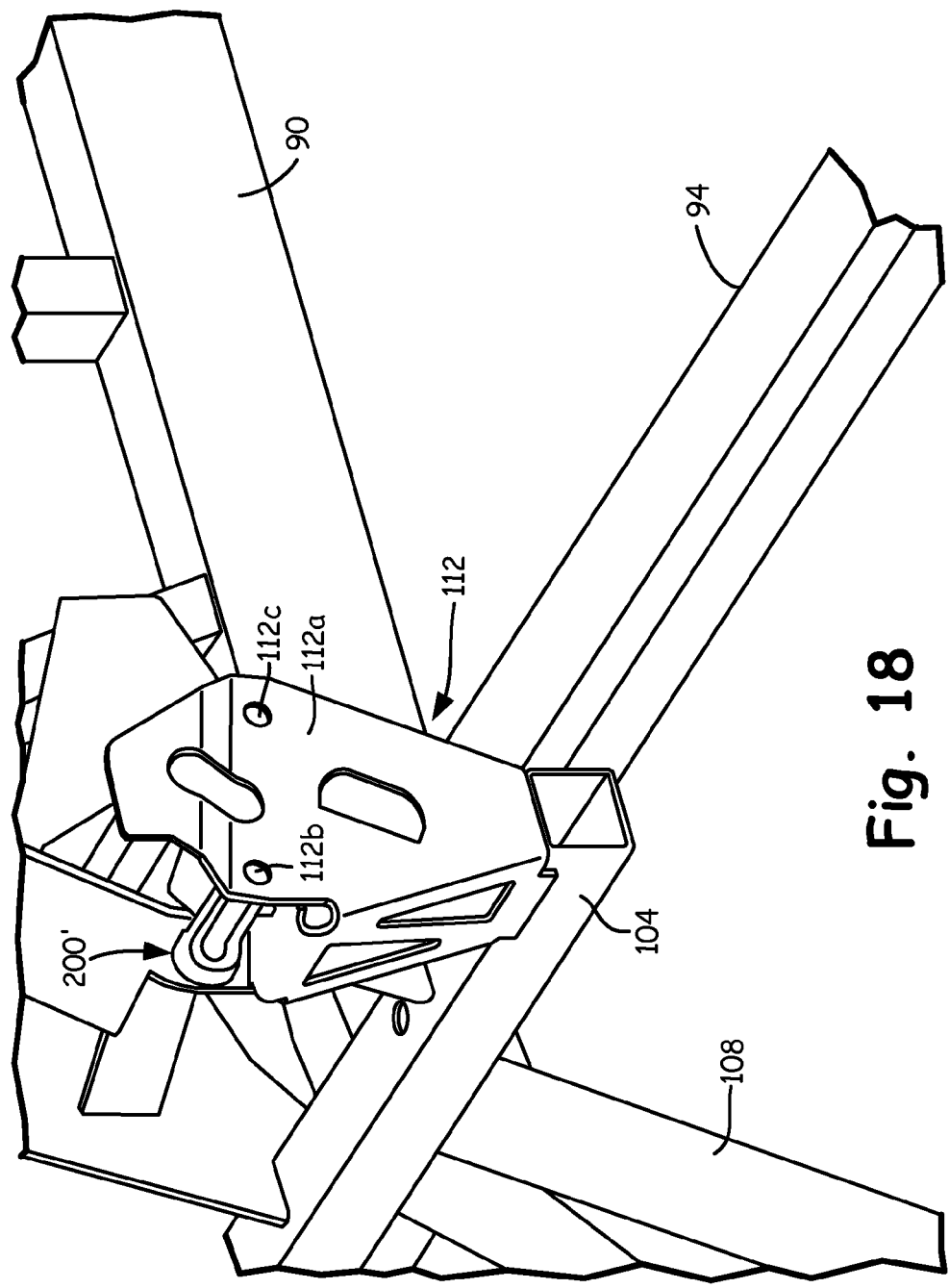
FIG. 18 is an enlarged perspective view of the front attachment mechanism of the frame assembly of FIG. 13.

With reference now to FIG. 18, frame tube portion 180b is shown coupled to bracket 112. Coupler 200' is substantially similar to couplers 200, and bracket 112 includes side plates 112a, including apertures 112b, and 112c for cooperating with insert 200' thereby coupling frame tube 180b with transverse tube 184.

Figure 19:
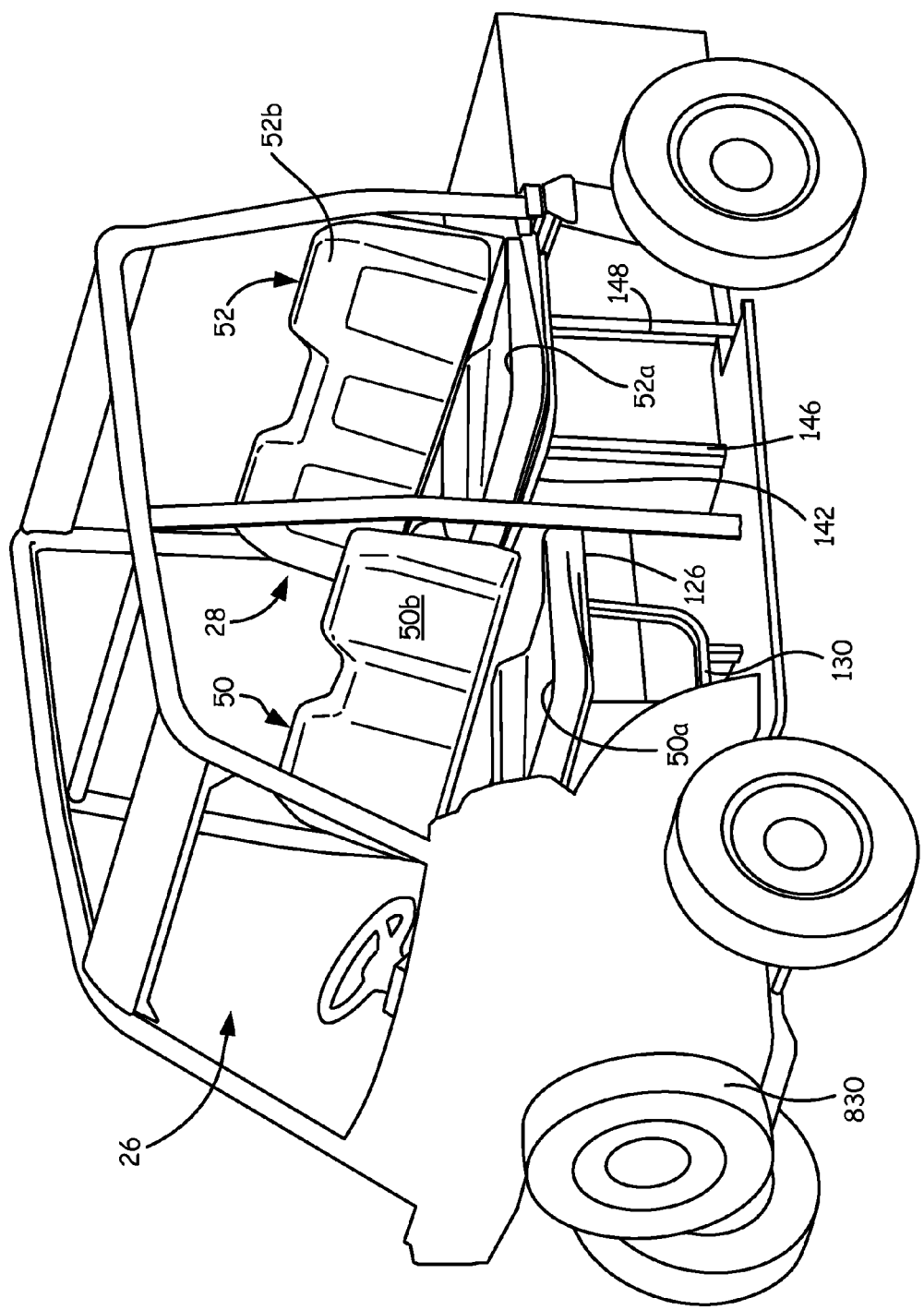
FIG. 19 is a front left perspective view of the vehicle without the outer body.
Figure 20:
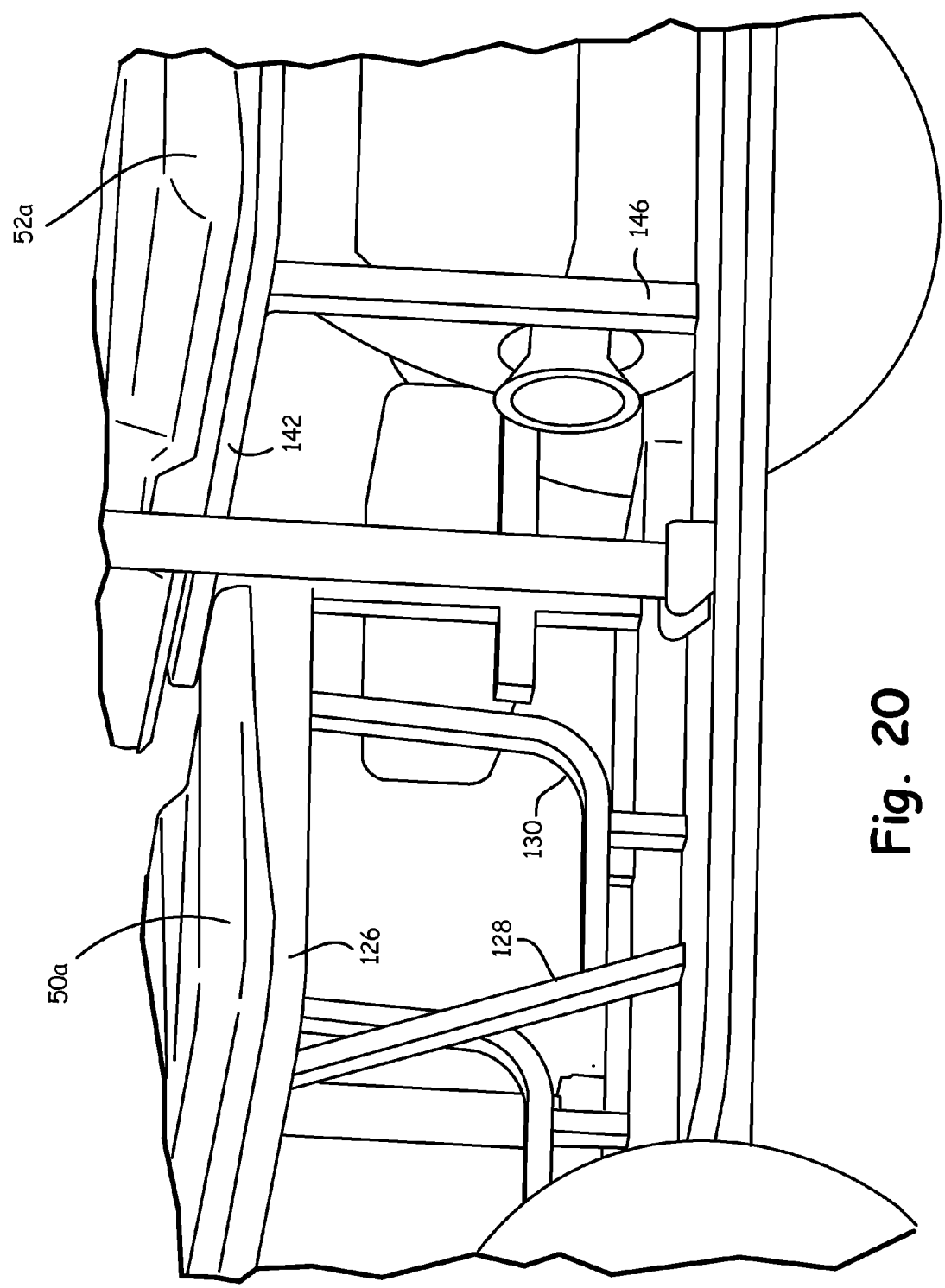
FIG. 20 is an exploded view of the seat attachments.

With reference to FIGS. 19-23, the front and rear seats 50, 52 and their operation will be described in further detail. With reference first to FIGS. 19 and 20, front seat 50 and rear seat 52 are shown as held by their respective frame hoops 126, 142 and supported by their respective frame tubes 128, 130 and 146, 148. It should be appreciated that fasteners or latches may be utilized for such retention.

Figure 21:
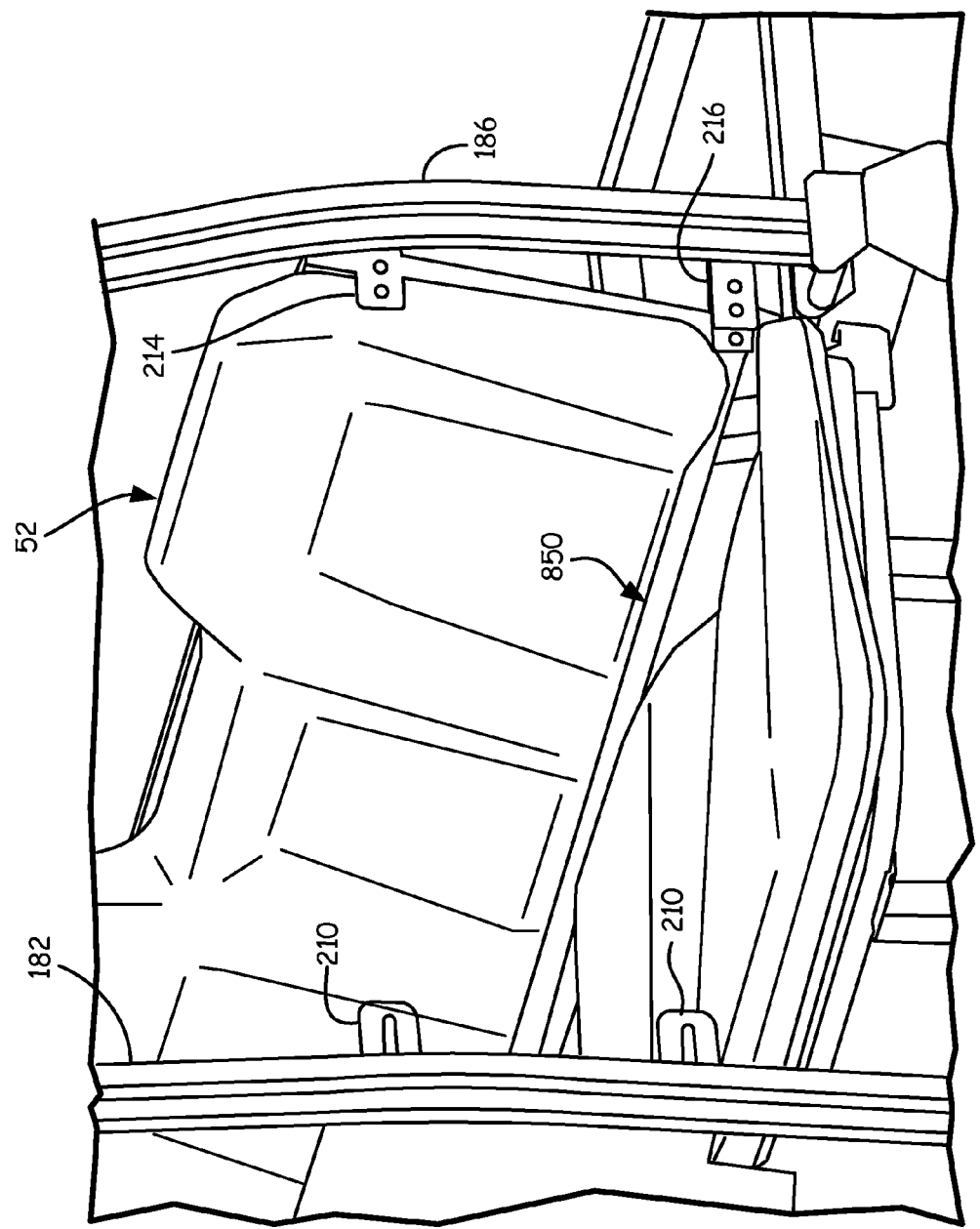
FIG. 21 is a front left perspective view of rear seat assembly.
Figure 22:
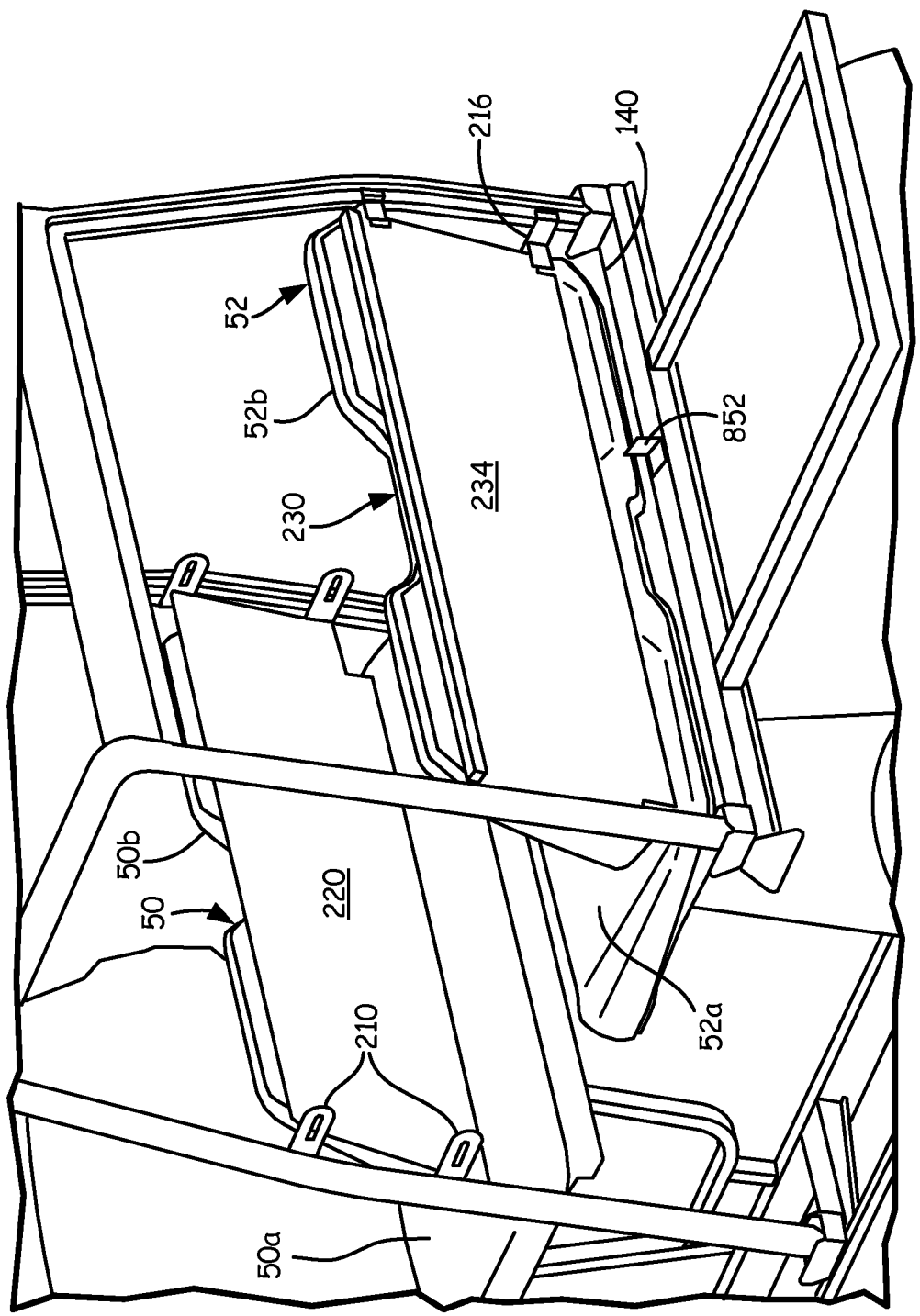
FIG. 22 is a rear left perspective view of rear seat assembly.
Figure 23A:
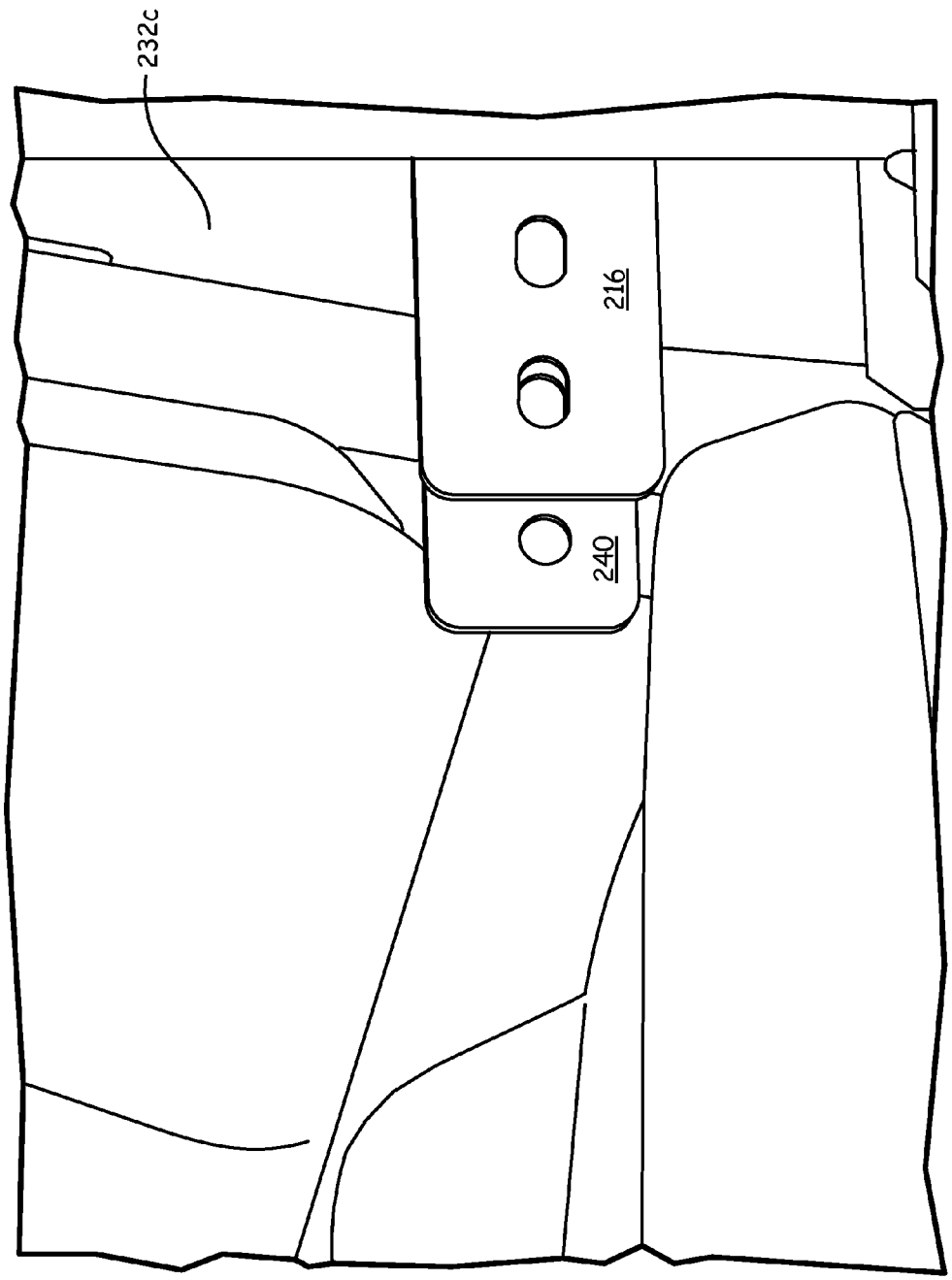
FIG. 23A is a front left perspective view of a portion of the attachment mechanism for the seat back of the rear seat assembly.
Figure 23B:
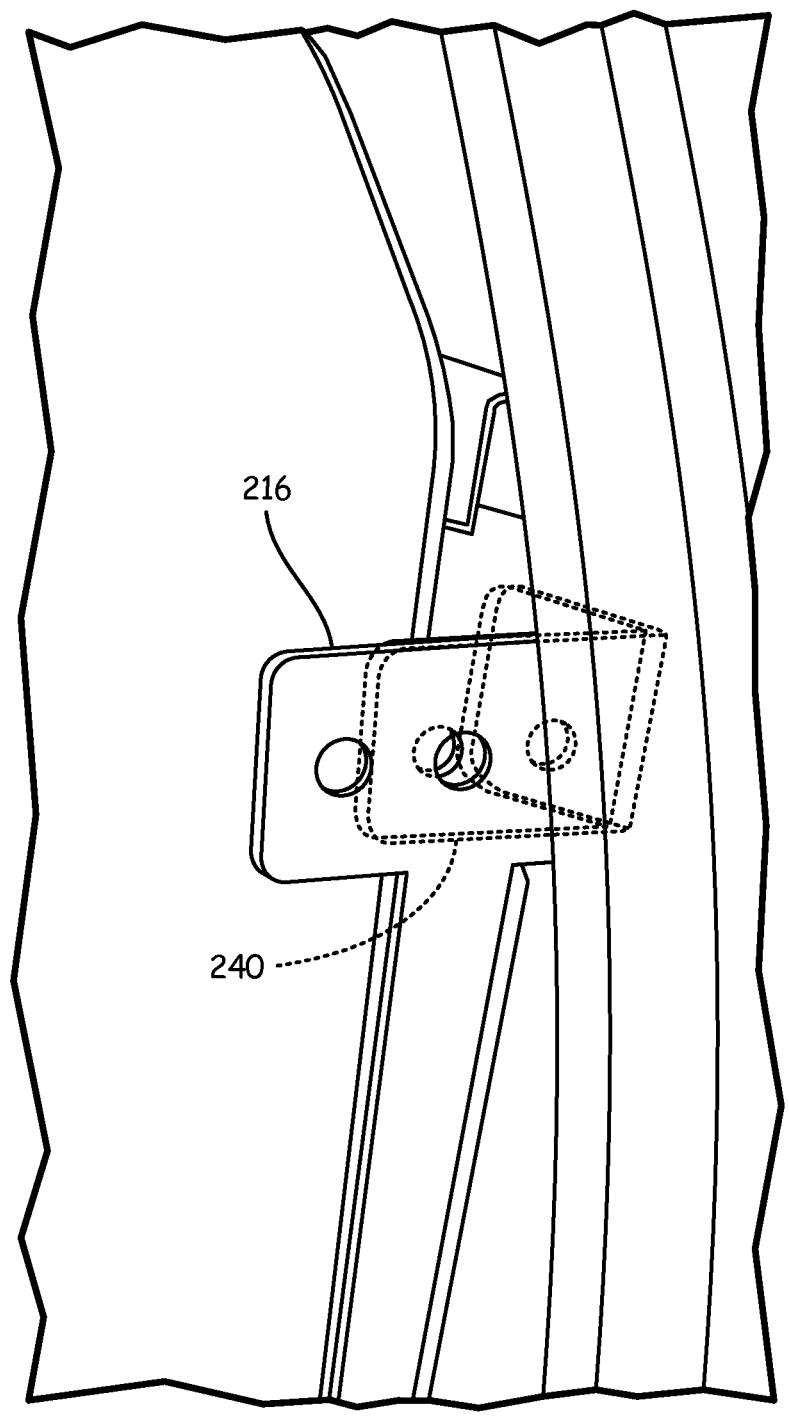
FIG. 23B is a front left perspective view of a portion of the attachment mechanism for the seat back of the rear seat assembly.
Figure 23C:
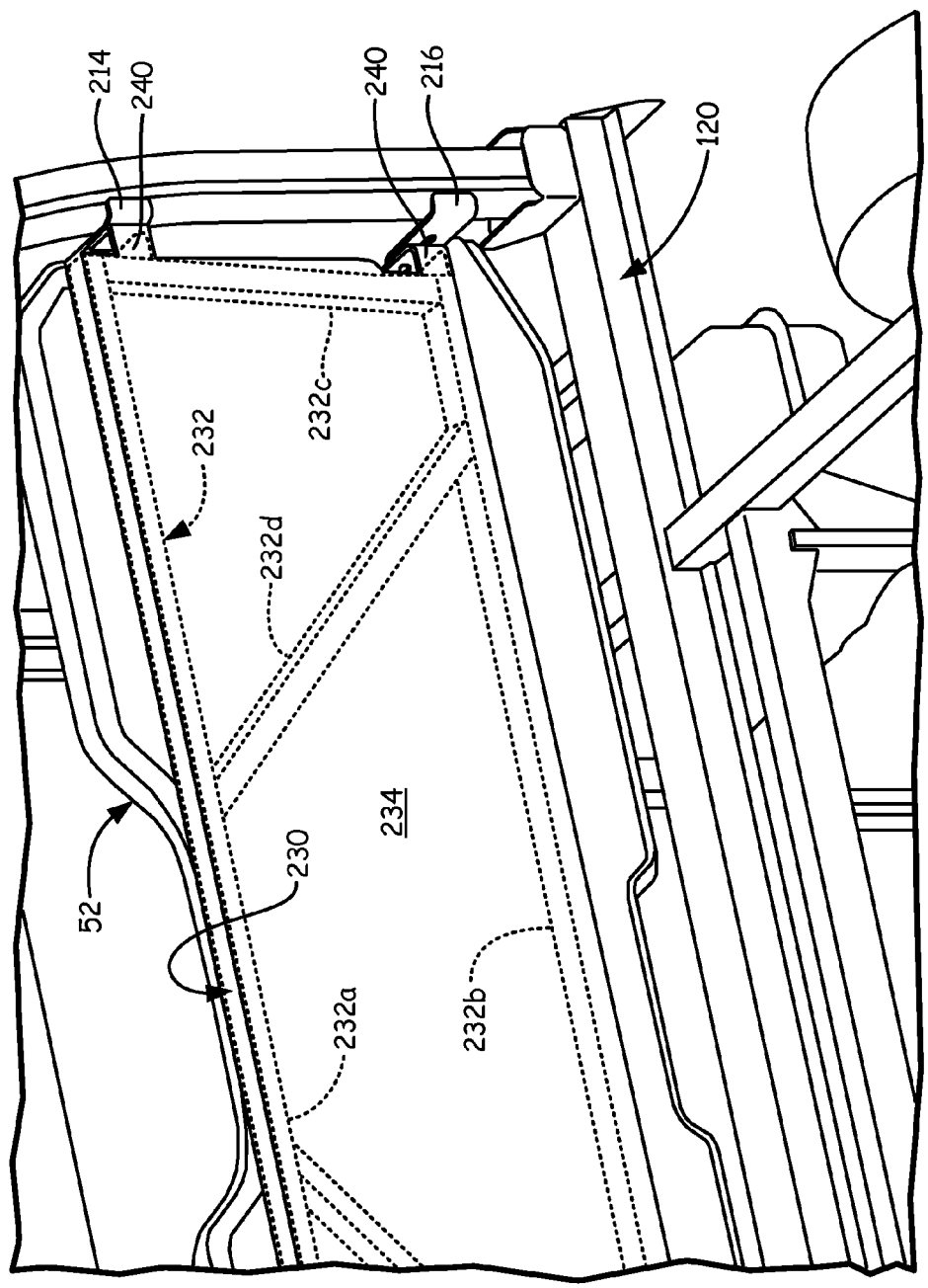
FIG. 23C is a rear left perspective view of the seat back of the rear seat assembly.
Figure 23D:
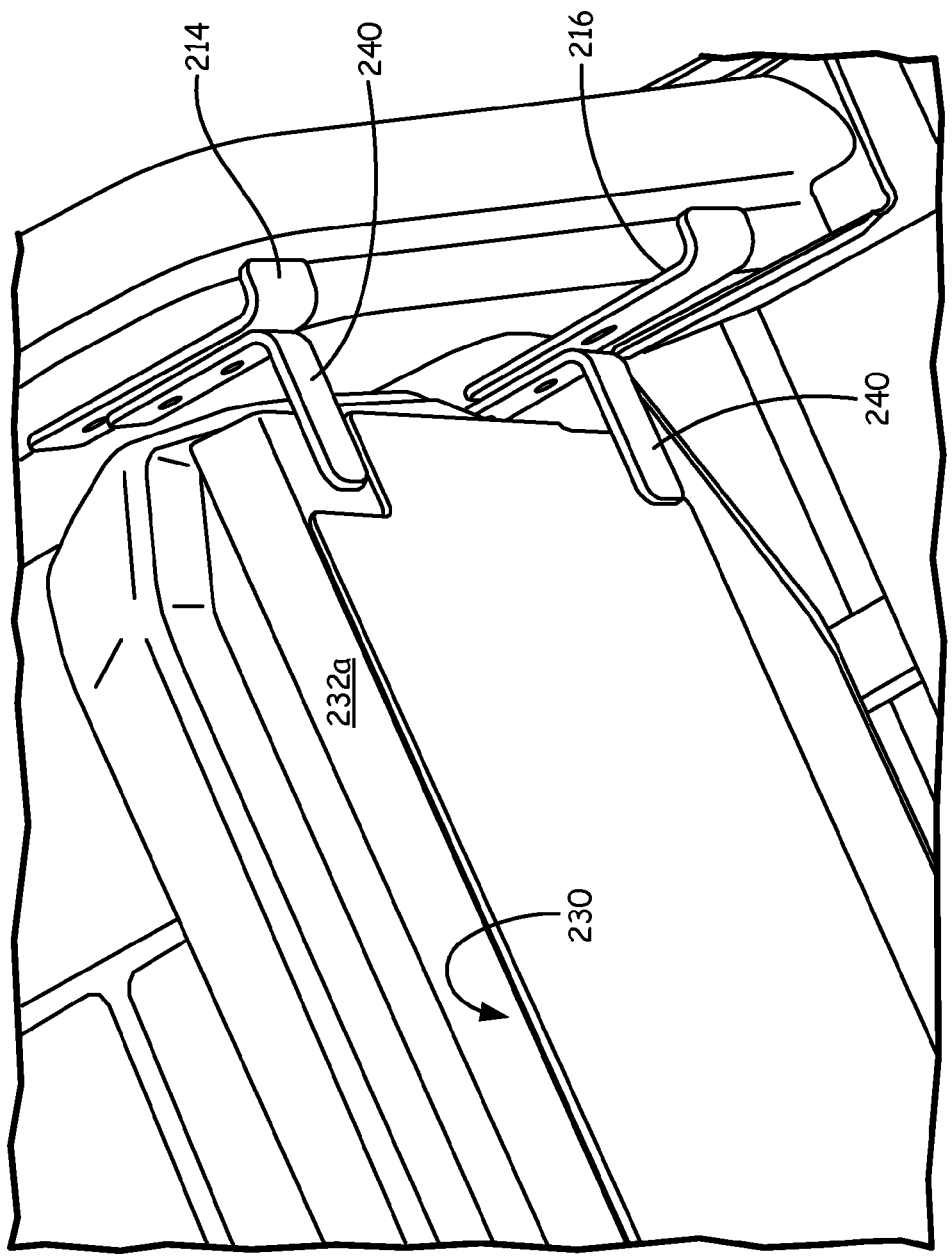
FIG. 23D is a rear left perspective view of the seat back of the rear seat assembly.
Figure 23E:
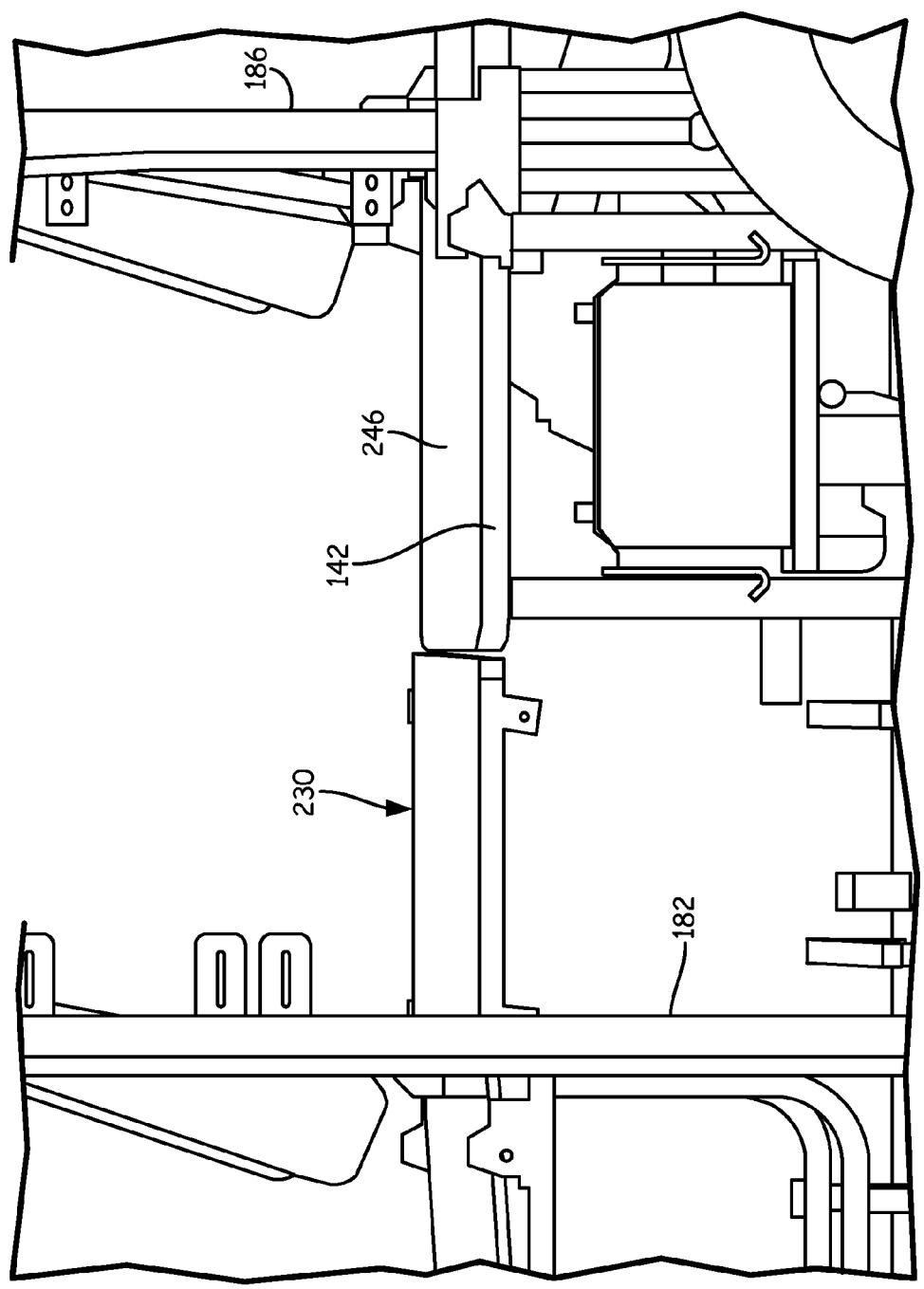
FIG. 23E is a side view of the seat back platform in the down position.
Figure 23F:
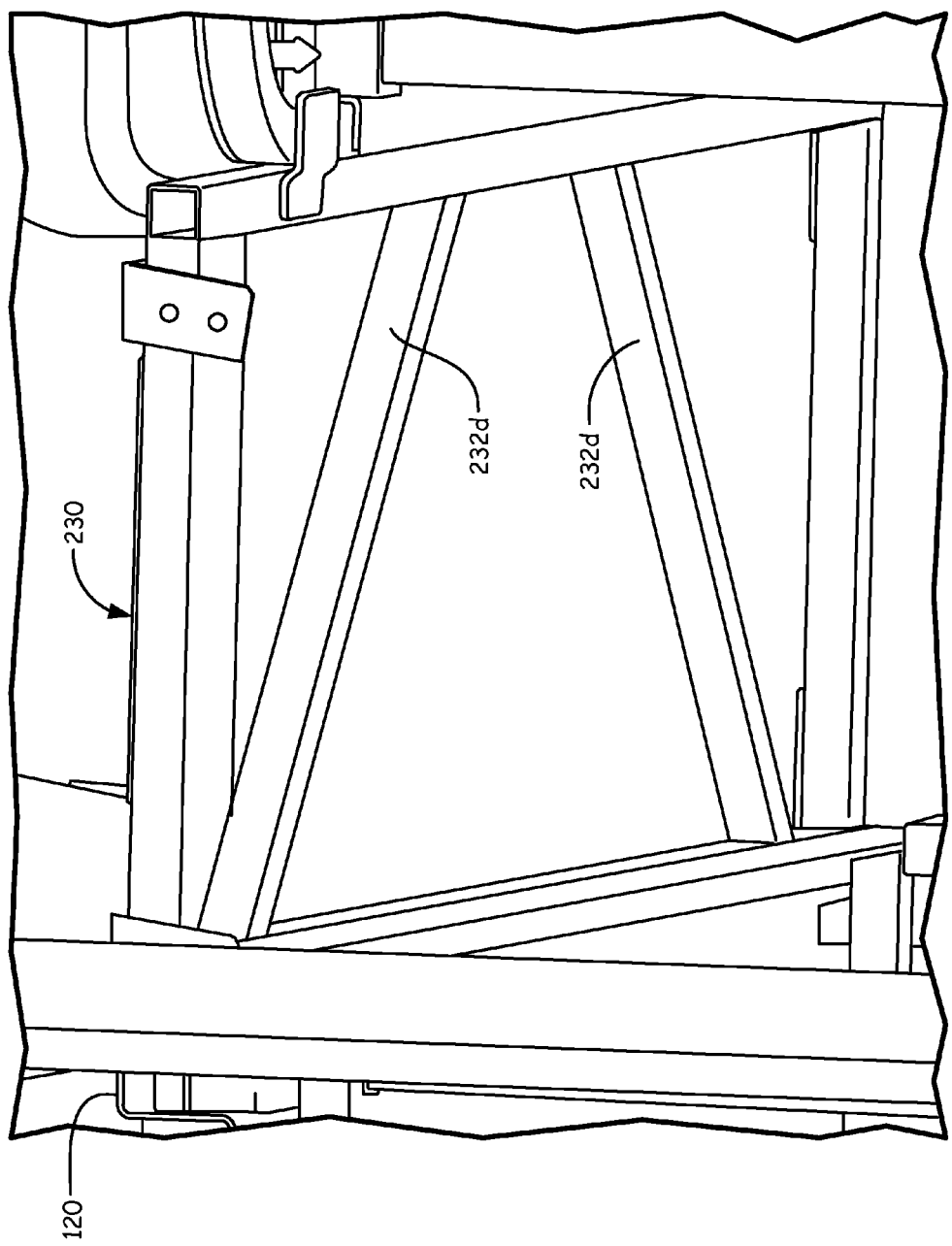
FIG. 23F is an underside view of the seat back platform in the down position.
Figure 23G:
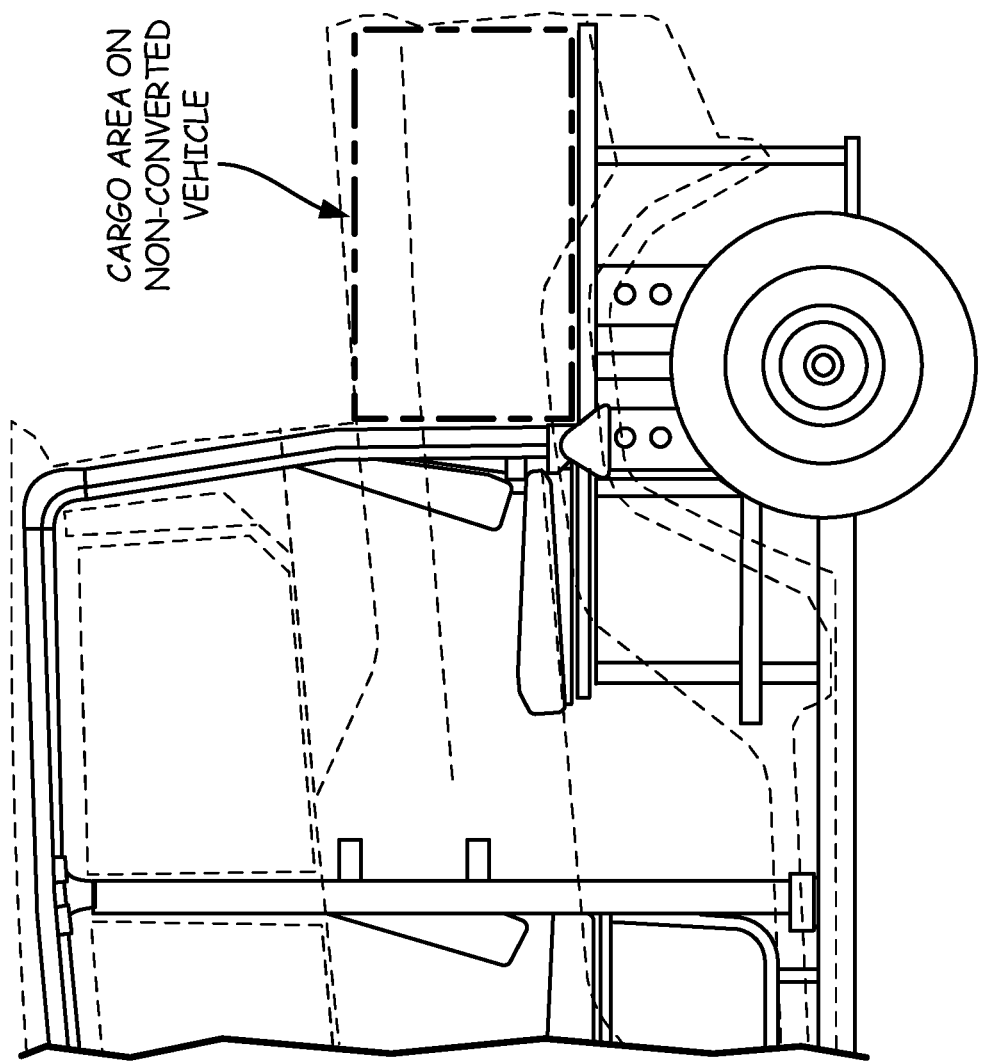
FIGS. 23G-23M show progressive views of the conversion, from a front and rear seat and standard utility box, to a front seat only with enlarged utility box.
Figure 23H:
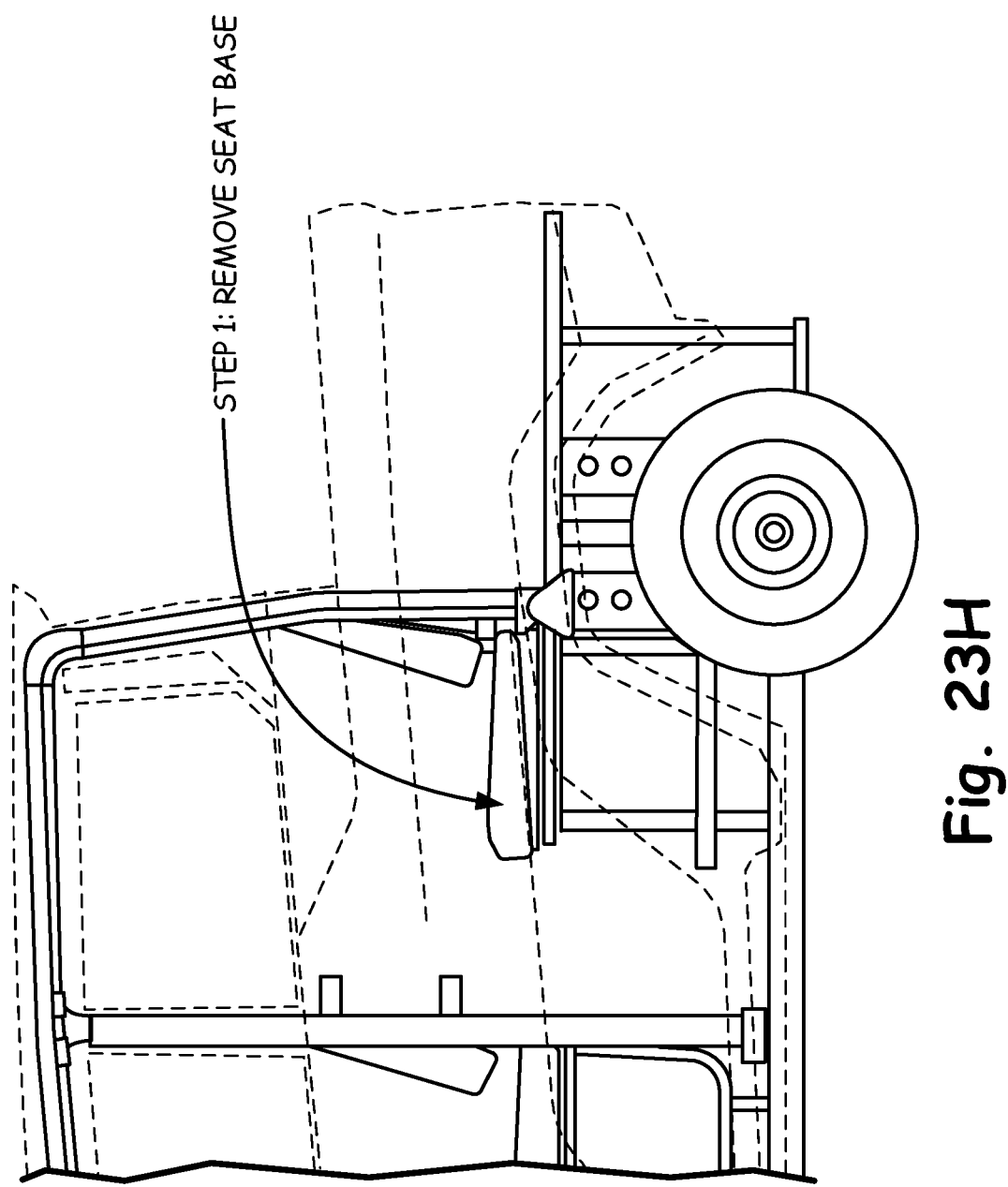
Figure 23I:
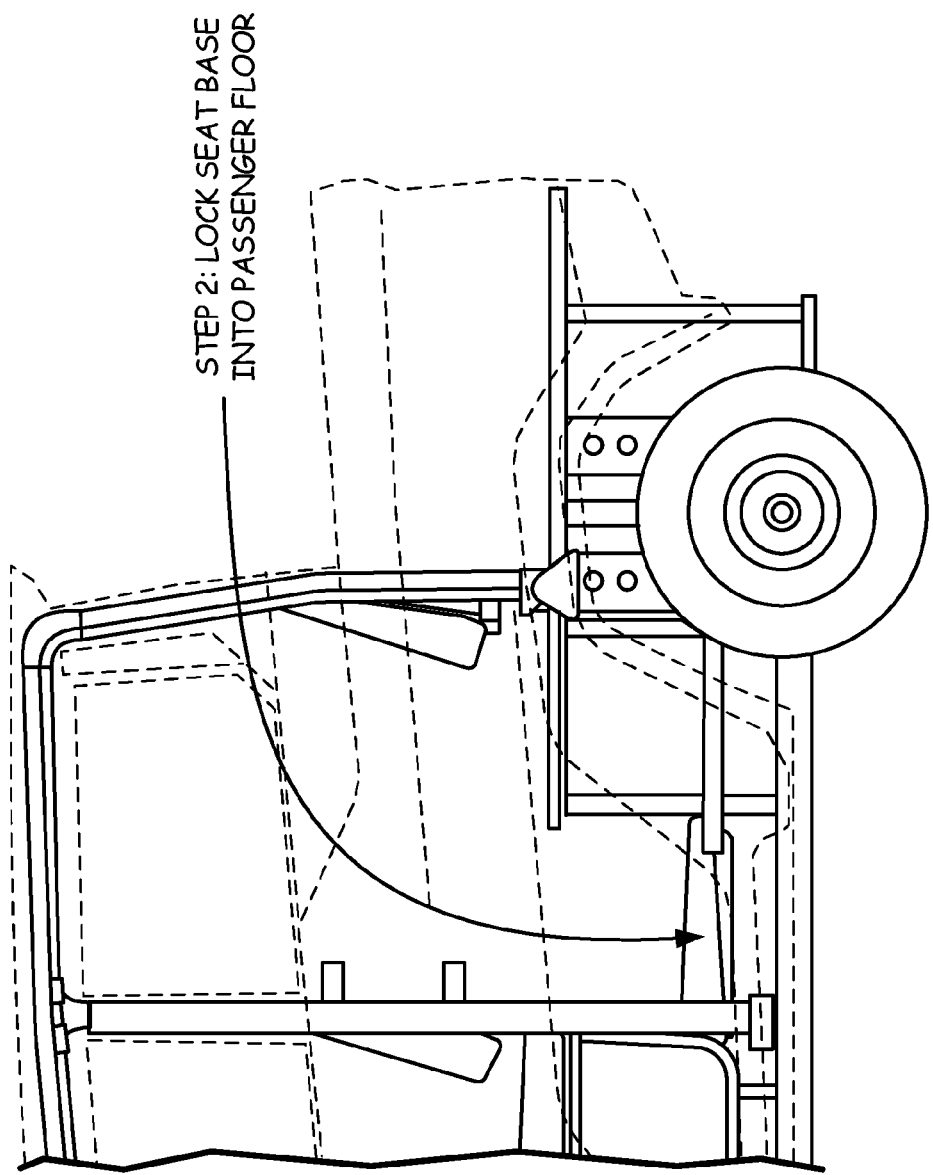
Figure 23J:
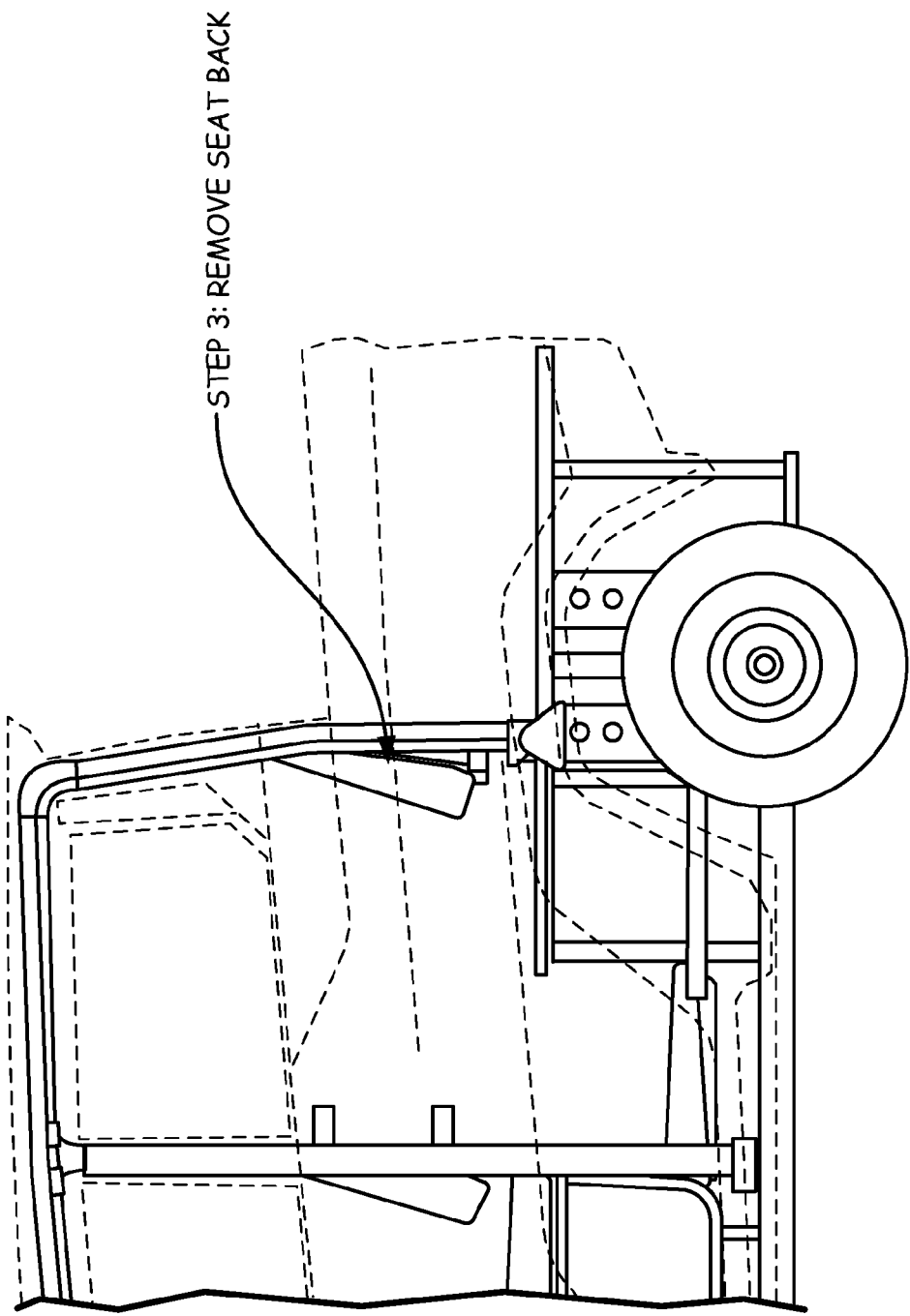
Figure 23K:
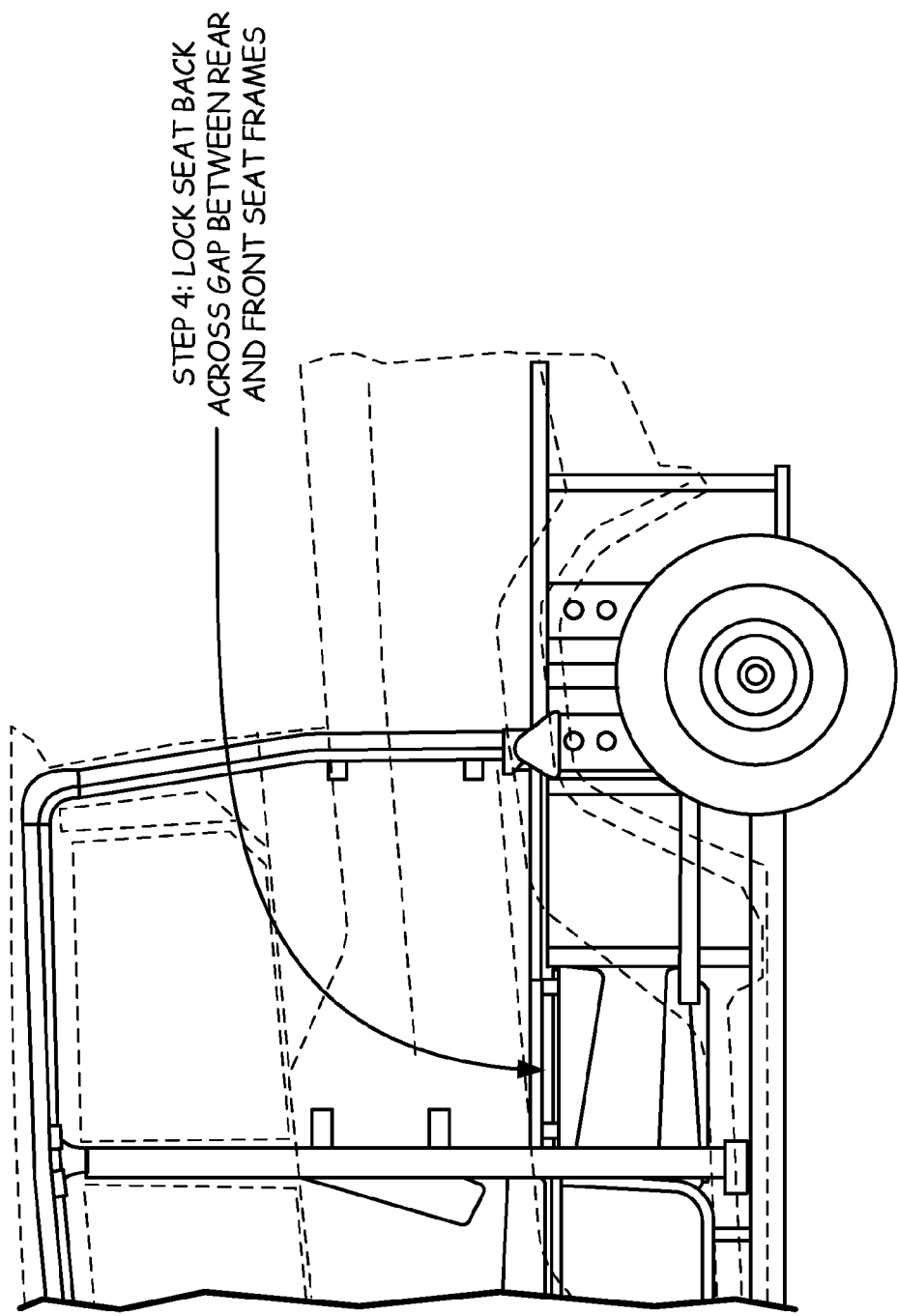
Figure 23L:
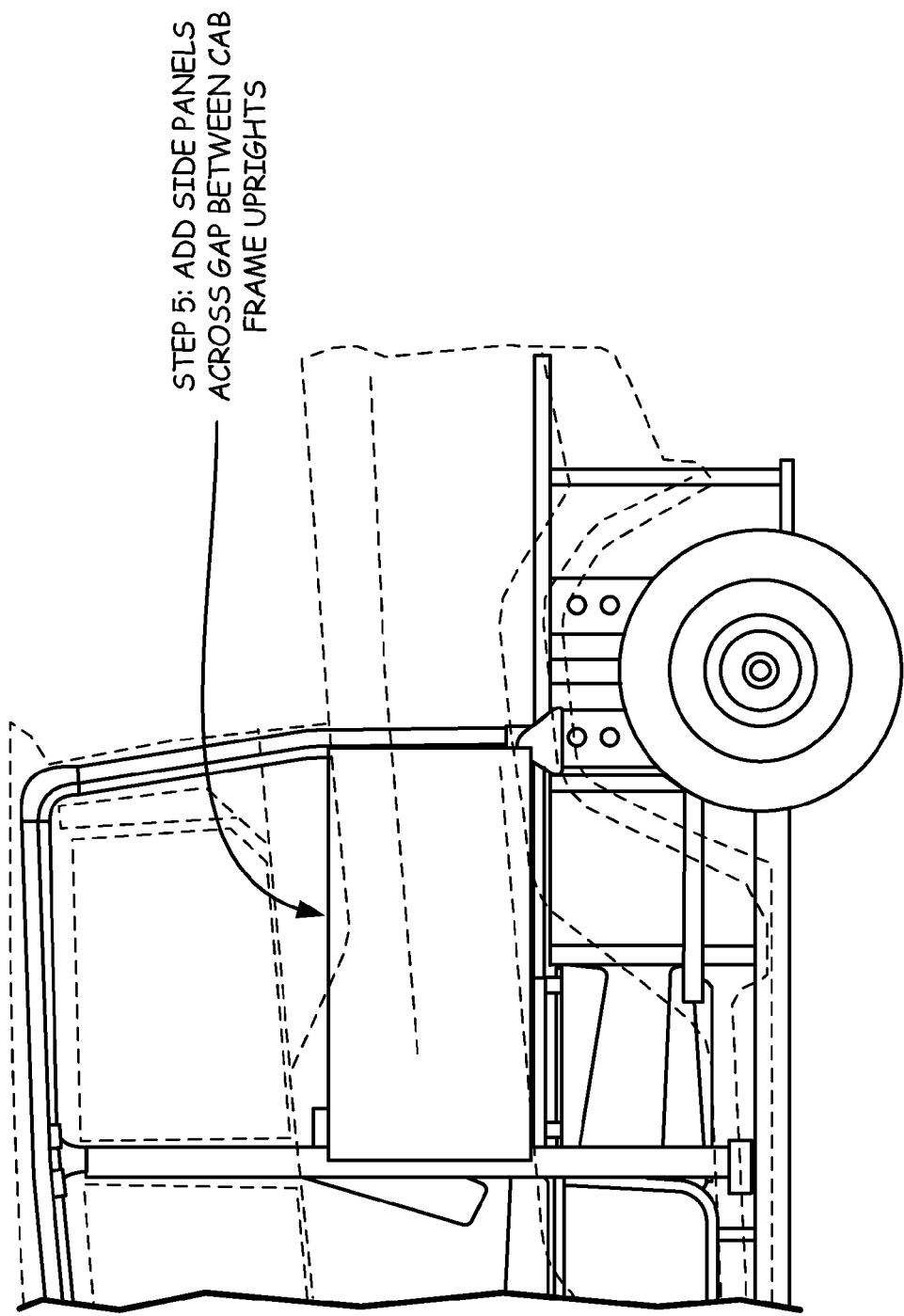
Figure 23M:
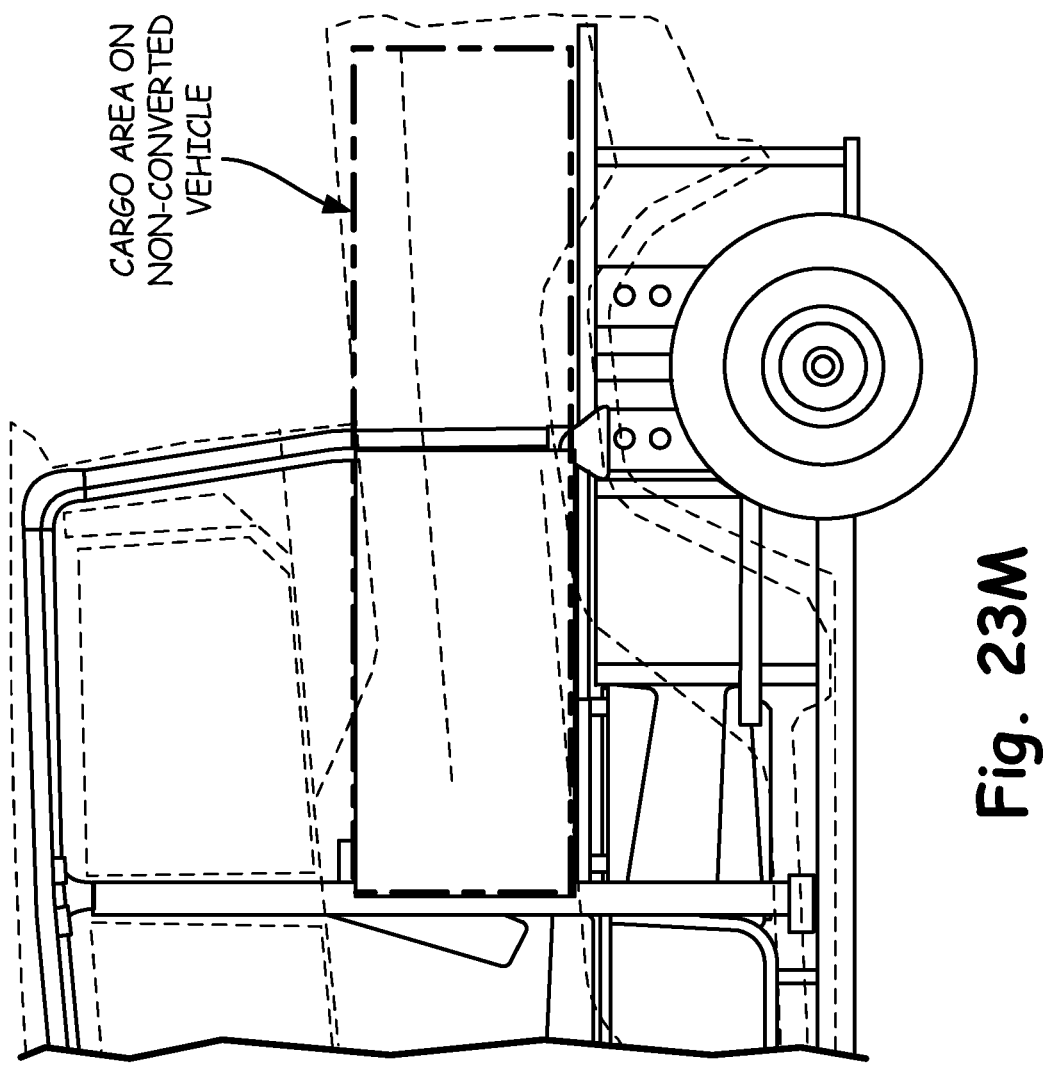
Figure 24:
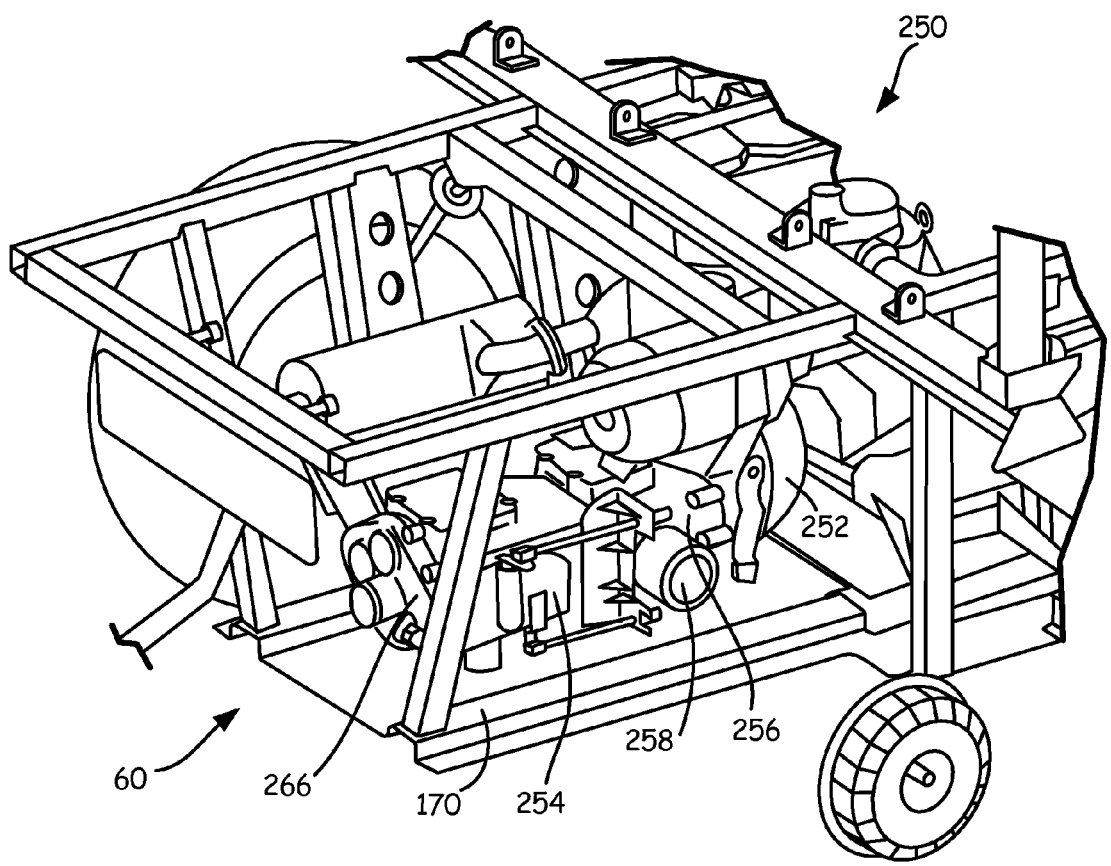
FIG. 24 is a rear right perspective view showing the powertrain for the present embodiment.

With reference now to FIGS. 21-23D, seats 50, 52, and their reconfiguration will be described in greater detail. As shown best in FIG. 21, support brackets 210 are coupled to cab frame upright 182, and support brackets 214, 216 are coupled to cab frame upright 186 and extend forwardly. With reference now to FIG. 22, a rear side of front seat back 50b defines a rigid support surface 220, which could be a material such as aluminum, but in the embodiment shown, is defined as a rigid plastic material. It should be appreciated that support surface 220 defines a front of the reconfigured cargo box when rear seat 52 is not used. With reference now to FIGS. 22 and 23C, rear seat back 52b includes a structural backing 230 defined by an internal frame 232 (shown in phantom in FIG. 23C) and supports a rear support surface 234 similar in nature to support surface 220 on front seat 50. As shown in FIG. 23C, frame 232 includes an upper frame tube 232a, lower frame tube 232b, side frame tubes 232c, and diagonal frame tubes 232d. As shown in FIGS. 23C and 23D, support brackets 240 are coupled to frame portion 232c and cooperate with brackets 214, 216 to retain seat back 52b in position.

Thus, given the configuration of the front and rear seats 50, 52, the utility vehicle may be configured as shown in FIGS. 1-12, and 23G with front and rear compartments 24, 26 and a standard sized utility box 20; or, the vehicle can be re-configured to remove the rear compartment 26 and enlarge the utility box 20 to occupy the volume once accommodated by the rear compartment 26. When a utility box 20 is to be reconfigured, the seat bottom 52a (FIG. 22) is removed from its associated support, and can simply be stored on the back floor, see FIGS. 23H and 23I. This leaves a seat platform 246 attached to seat frame hoop 142, where seat platform 246 becomes a portion of the enlarged utility box floor. Seat back 52b is thereafter rotated downwardly (see FIG. 23K) whereby back panel 234 becomes the remaining portion of the enlarged cargo floor and together with panel 220 on front seat back 50b forms an enlarged cargo bed. It should also be appreciated that side panels (see FIG. 23L) extend between support brackets 210 and 214, 216 to elongate the side panels of the cargo box 20. These panels may be stored in a volume (not shown) on the rear compartment floor.

With reference now to FIGS. 24-29, power train 60 is comprised of an engine 250, clutch 252, and transmission 254. As shown best in FIG. 25, power train 60 has a longitudinal arrangement allowing for a narrower profile of the vehicle, as well as, the room to provide independent rear suspension. Moreover transmission 254 is integrated with a final drive portion 256 having drive portions 258 to drive rear wheels. Final drive 256 is in the form of a differential, and the transmission 256 is profiled with an upper plate at 260 to provide an option for a lockable differential. Transmission 254 further includes an upper plate at 262, which is optionally removable to provide an add-on feature for a power takeoff (PTO). The PTO mode is designed to turn-off the gear train in the transmission to improve the efficiency while running in the PTO mode and prevents operating of the vehicle while in the PTO mode. Transmission 254 includes a rear plate 266 (FIG. 28), which is removable to allow the gear ratios of the transmission to be changed without removing the entire transmission. Transmission 254 will be further described herein in greater detail. As shown best FIG. 25, engine 250 includes an emergency front pulley 268 for a pull start in the event of a dead battery.

Figure 25:
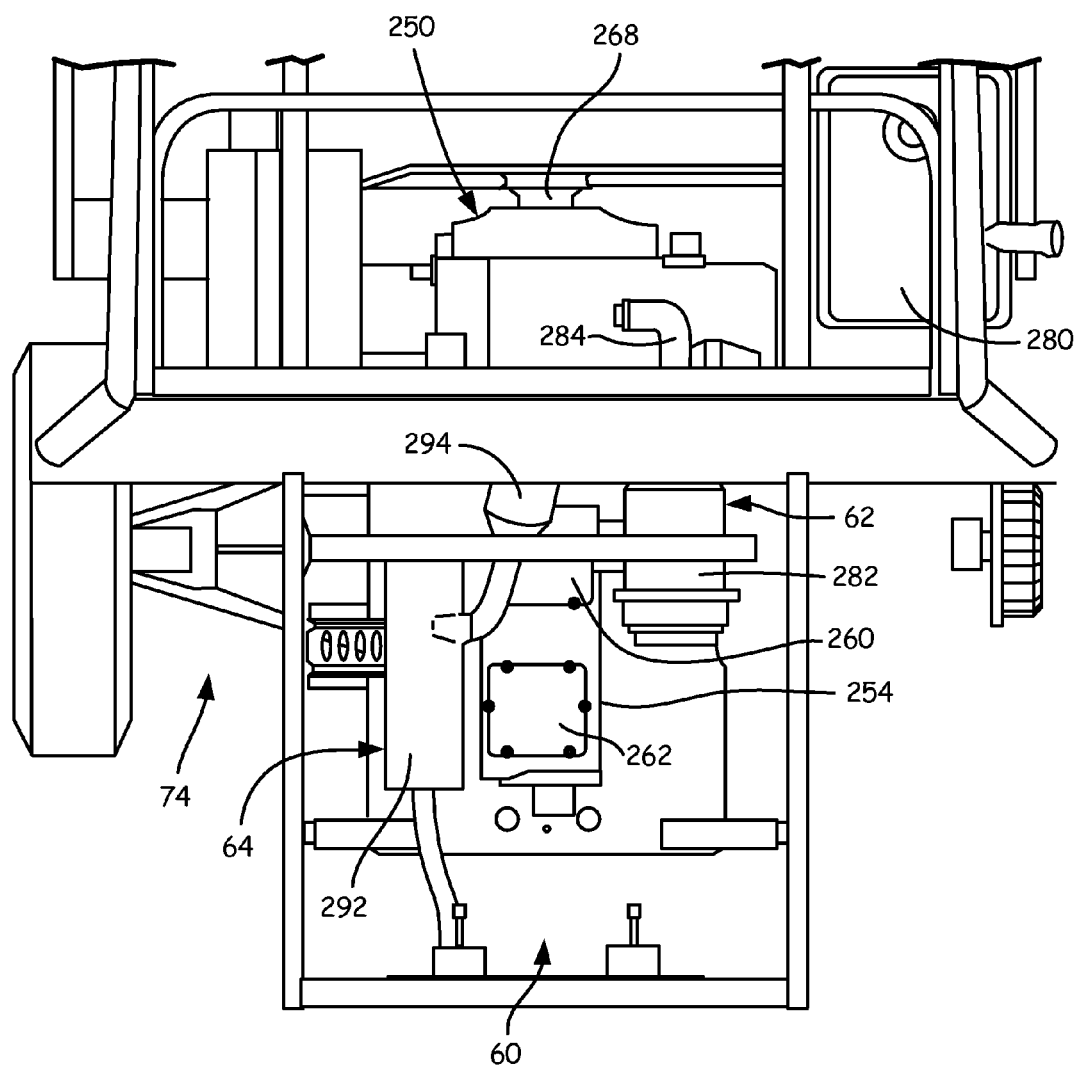
FIG. 25 is a top view showing the powertrain for the present embodiment.
Figure 29:
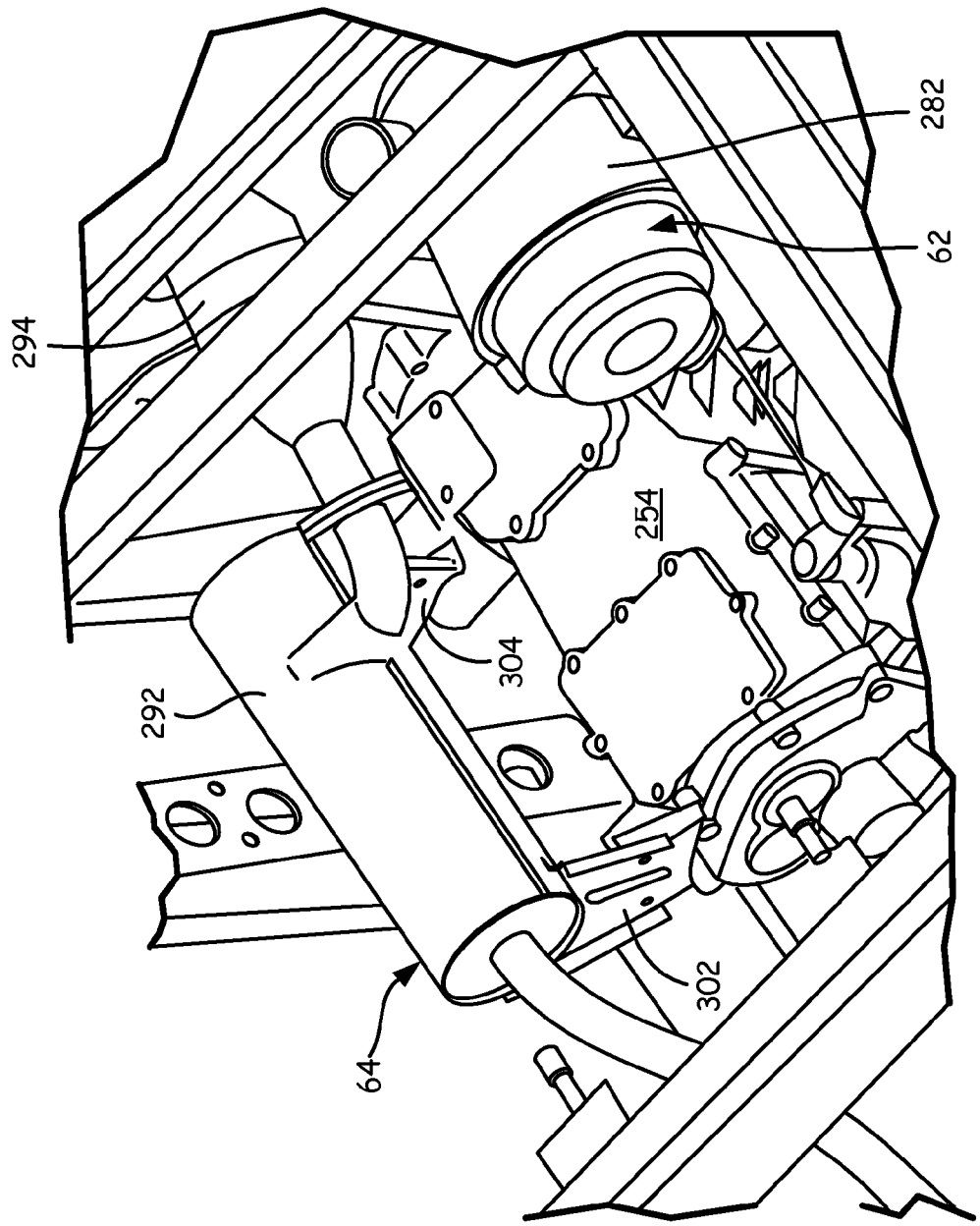
FIG. 29 is an upper perspective view showing the intake and exhaust systems of the present embodiment.

With reference to FIGS. 25 and 29, intake and exhaust systems are shown where the intake system is shown generally at 62 including a filter canister at 282 and an intake duct at 284. Exhaust system 64 includes a muffler at 292 and a resonator at 294. As shown best in FIG. 29, muffler mounting brackets 302 and 304 are coupled directly to muffler 292 and are attached to transmission 254 allowing the joints to move together as a unit.

Figure 26:
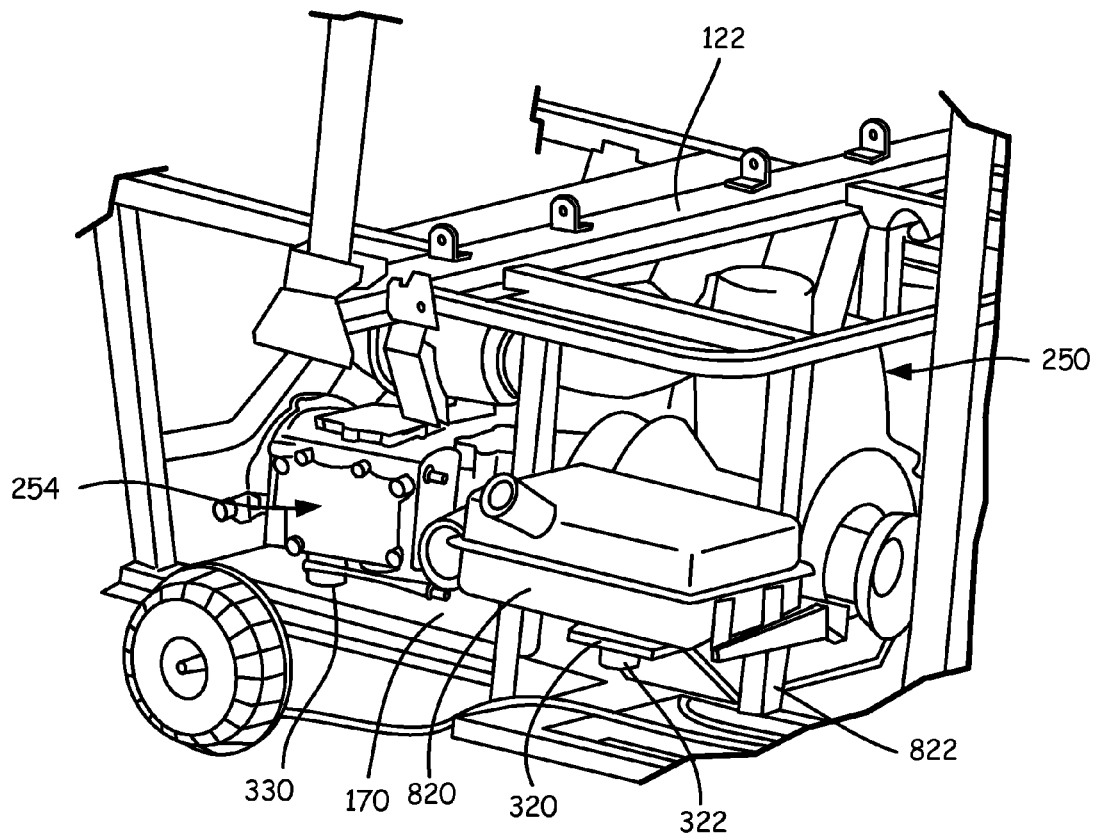
FIG. 26 is a front left perspective view showing the powertrain for the present embodiment.
Figure 27:
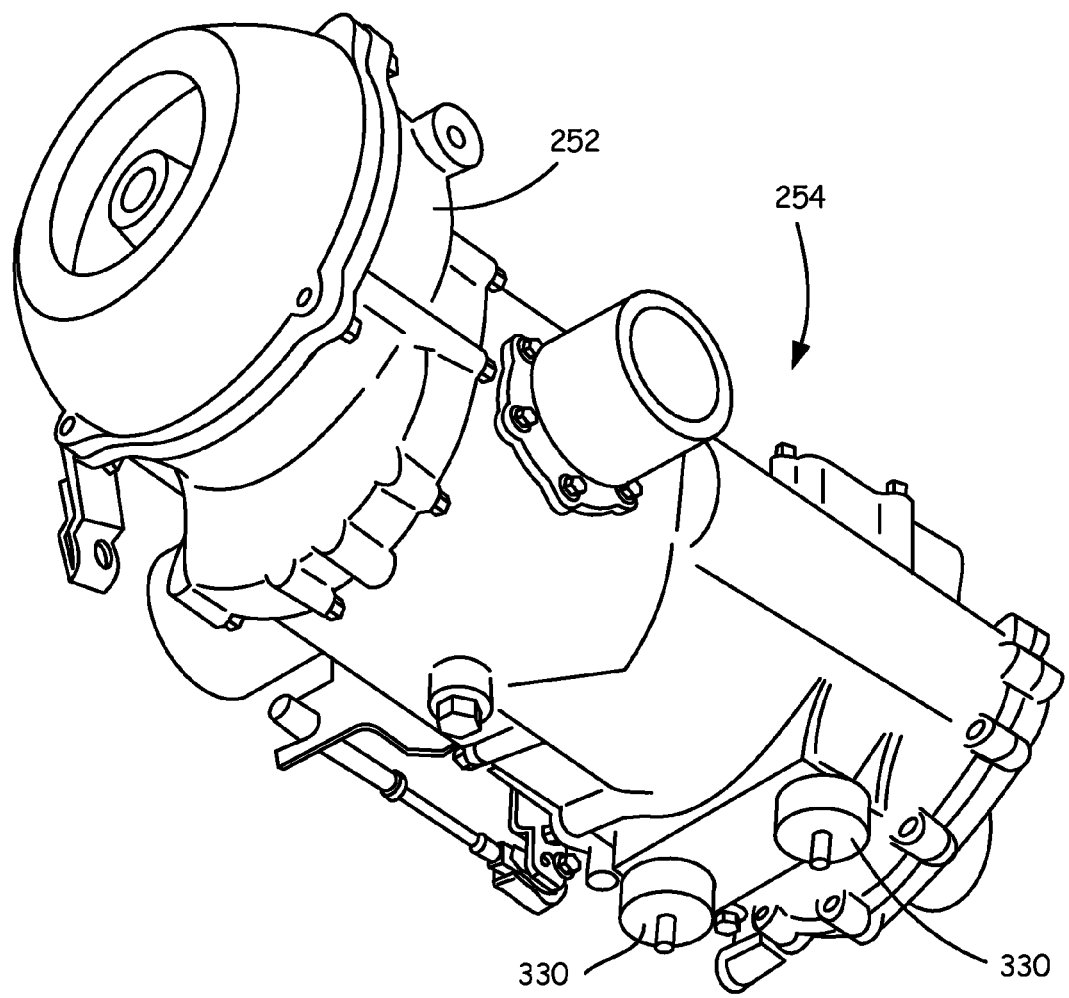
FIG. 27 is an underside perspective view showing the transmission for the powertrain of the present embodiment.
Figure 28:
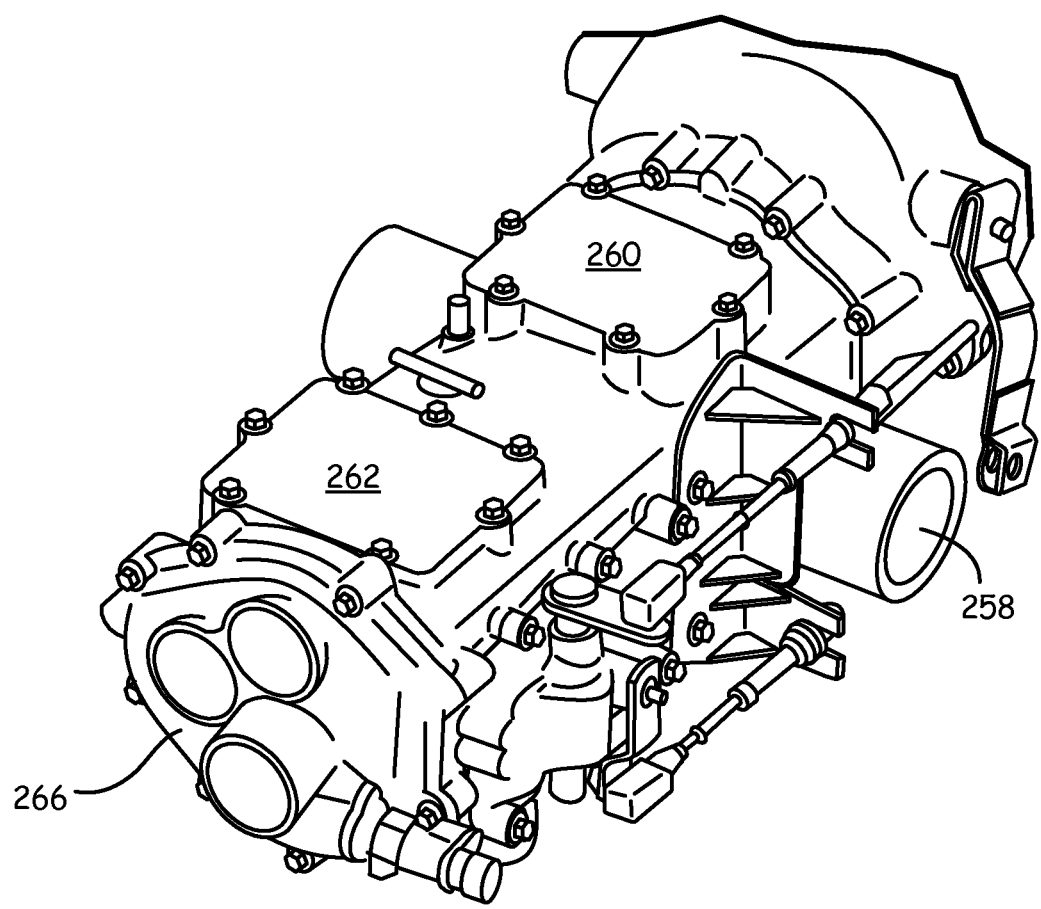
FIG. 28 is an upper perspective view showing the transmission for the powertrain of the present embodiment.

With reference again to FIGS. 26-28, engine 250 is shown mounted to skid plate 170 by way of a U-shaped engine mount 320 and by way of isolation mounts 322 positioned between engine mount 320 and skid plate 170. Two mounts 330, are positioned under transmission 254 as shown in FIGS. 26 and 27, which support the aft end of the transmission 254.

Figure 30:
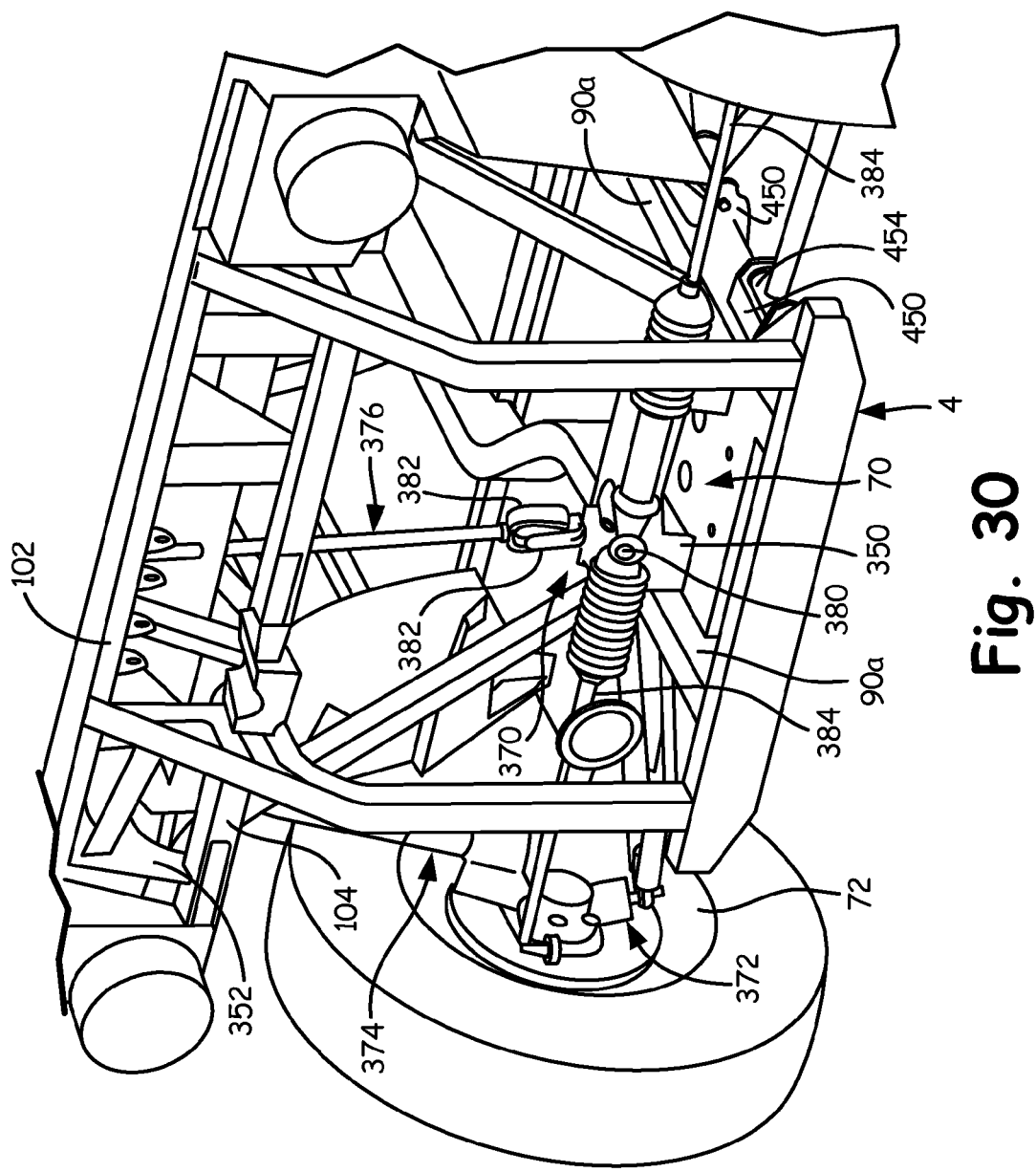
FIG. 30 is a left front perspective view of the steering assembly attached to the frame assembly.
Figure 31:
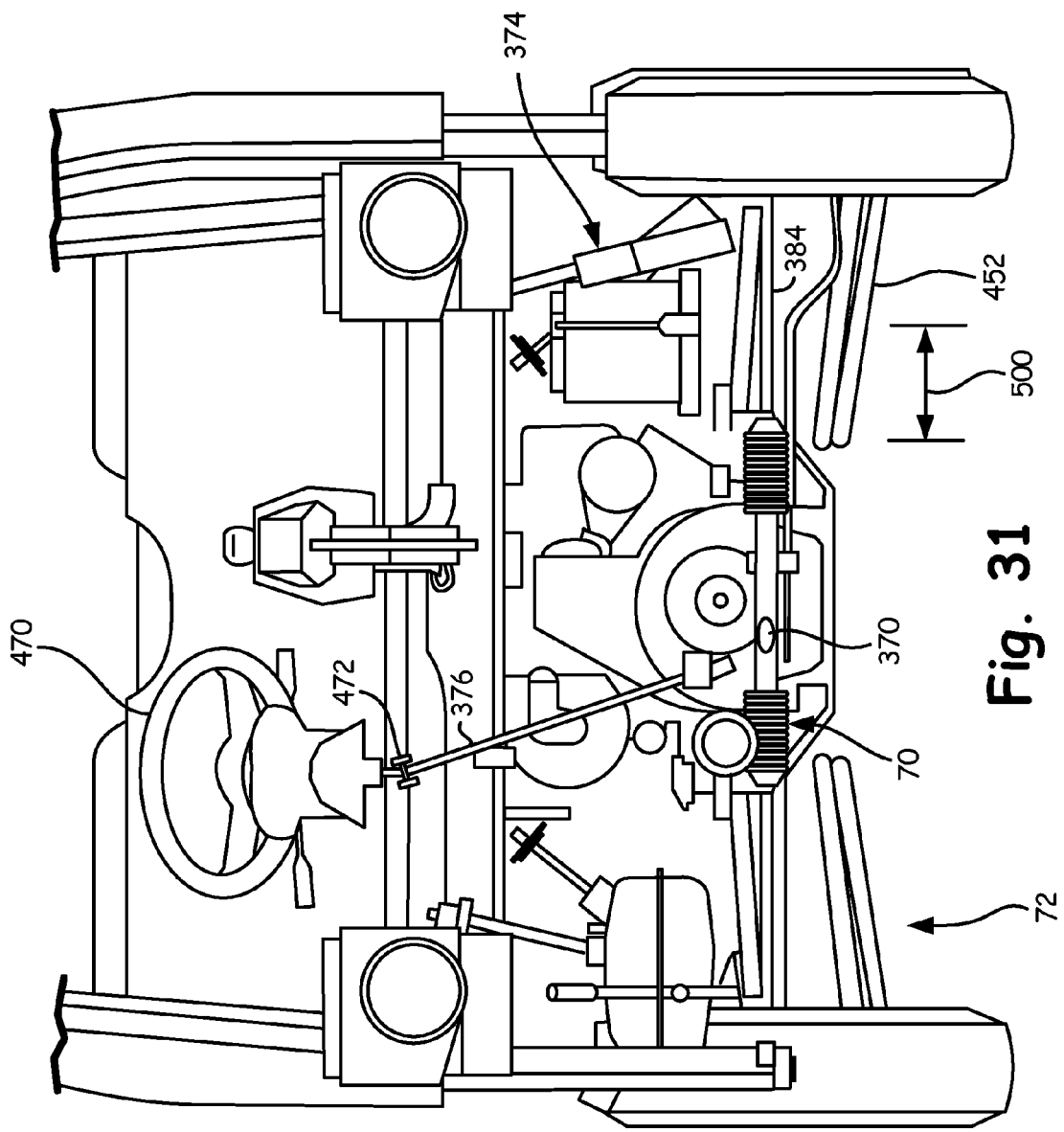
FIG. 31 is a front view of the steering assembly attached to the frame assembly.
Figure 32:
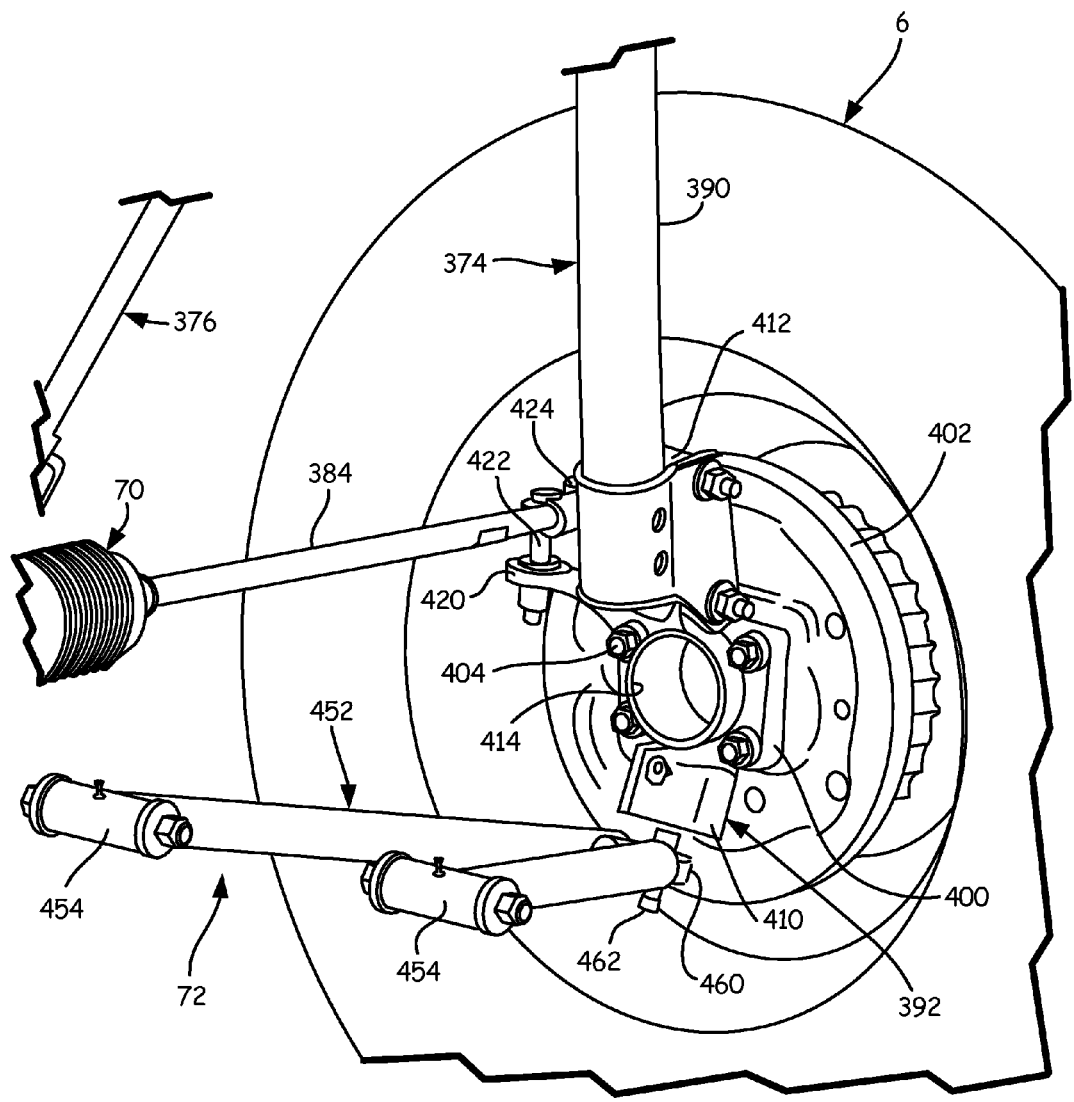
FIG. 32 is a enlarged front perspective view of the steering assembly and front suspension assembly.
Figure 33:
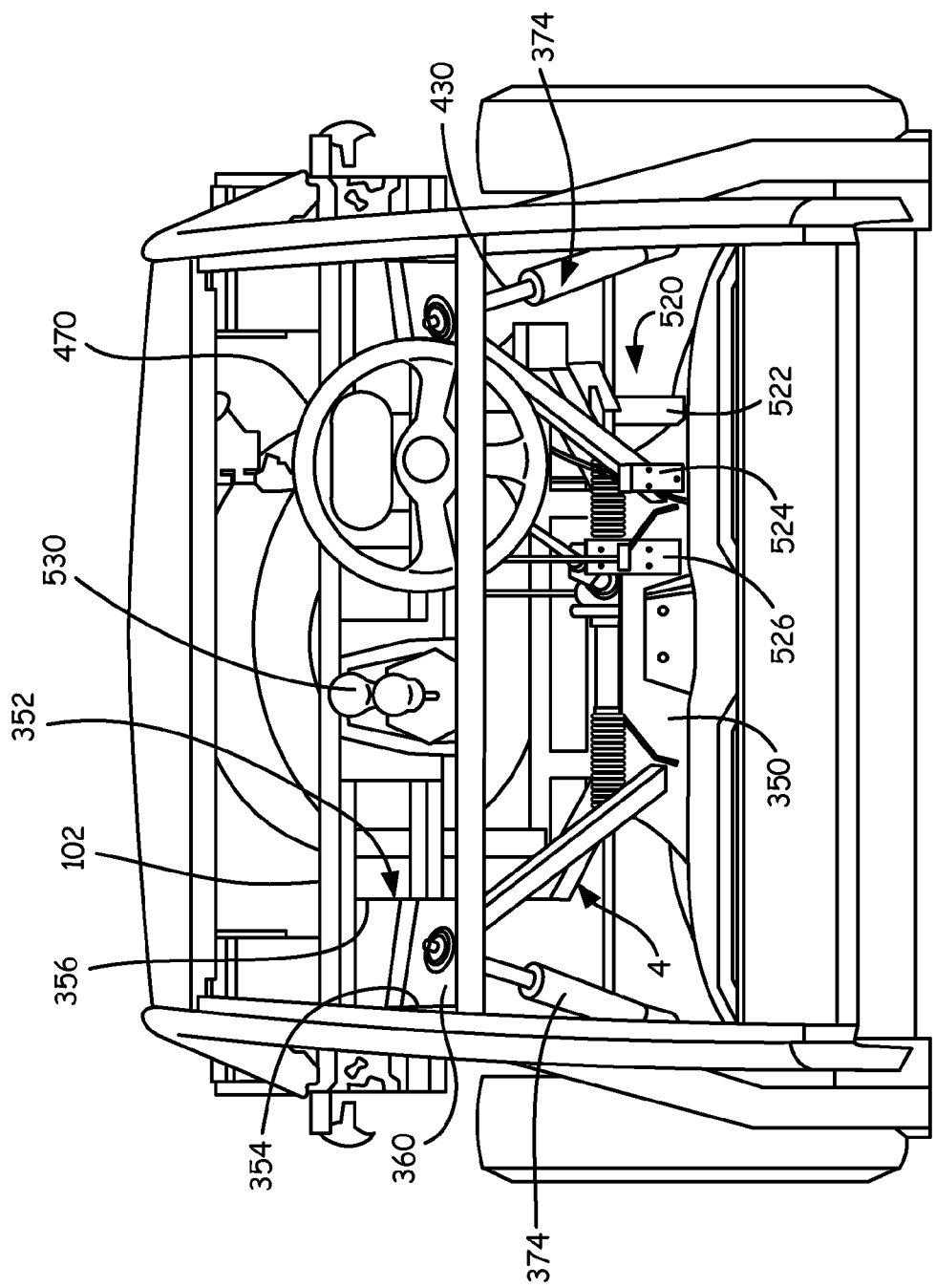
FIG. 33 is an upper view of the driver's compartment.

With reference now to FIGS. 30-33, steering system 70 will be described in further detail. With reference first to FIGS. 30 and 33, frame 4 further includes mounting plate 350 intermediate frame tube portions 90a, and frame 4 further includes upper brackets 352 intermediate transverse tubes 102, 104. As shown best in FIG. 33, bracket 352 includes bracket plates 354, 356 having positioned there between mounting plate 360. Thus as shown best in FIG. 30, steering assembly 70 generally comprises steering gear 370, hub 372, strut 374, and steering linkage 376. As shown best in FIG. 30, steering gear 370 includes a gear body 380 fixably coupled to mounting plate 350 and including an input at 382 and outputs at steering arms 384 as described herein. As shown best in FIG. 32, strut 374 includes a shock portion 390 and a hub portion 392. As will be apparent from the foregoing, strut 374 has a dual function, namely, to operate in the steering assembly as well as the front suspension assembly.

As shown, hub portion 392 includes a base portion 400 attached to wheel plate 402 by way of a plurality of fasteners 404. Wheel hub 392 further includes a lower mounting boss 410 and an upper mounting boss 412. Base portion 400 includes an opening at 414 to include an optional drive shaft for a four-wheel drive vehicle (either provided from a forwardly extending drive shaft from the transmission or from an electric hybrid drive from a forwardly mounted electric motor). Hub 392 further includes a steering link at 420 extending inwardly from base portion 400 and extending toward the front of the vehicle. Steering link 420 includes a fastener at 422 profiled to couple with a bearing end 424 of steering arm 384. As shown best in FIG. 33, strut 374 also includes a shaft portion 430 about which hub portion 392 rotates as further described herein. A strut suspension is described in our patent application PCT Publication PCT/US12/23455, the subject matter of which is incorporated herein by reference.

With reference again to FIGS. 30-33, front suspension 72 will be described in greater detail. As shown first in FIG. 30, frame 4 includes brackets 450 for mounting an alignment arm (or A-arm) 452. Alignment arm 452 includes inner couplings at 454, which pivotally mount to brackets 454 by way of a fastener. As shown in FIG. 32, alignment arm 452 includes an outer end having coupler 460, which couples to boss 410 by way of fastener 462.

Thus, with reference to FIGS. 30-33, the steering and suspension systems will be described. With reference first to FIG. 31, steering system 70 further includes steering wheel 470 to affect the operation of steering shaft 376 by way of universal joint 472. Thus rotational input to the steering wheel 470 causes a rotation of steering shaft 376 and operation of steering gear 370. This operates the steering arms 384 in a push-pull operation, which in turn are coupled to steering links 420 (FIG. 32) causing hubs 392 to rotate about coupler 460 and about the shaft 430 (FIG. 33) of strut 374. This affects the turning of the front wheels 6. In addition, independent front suspension is provided by way of alignment arms 450 coupled to frame 4 at an inner end and to hub 392 at an outer end. Thus alignment arm 452 is pivotally movable upwardly and downwardly together under the influence of the shock portion 390 of strut 374.

Figure 33A:
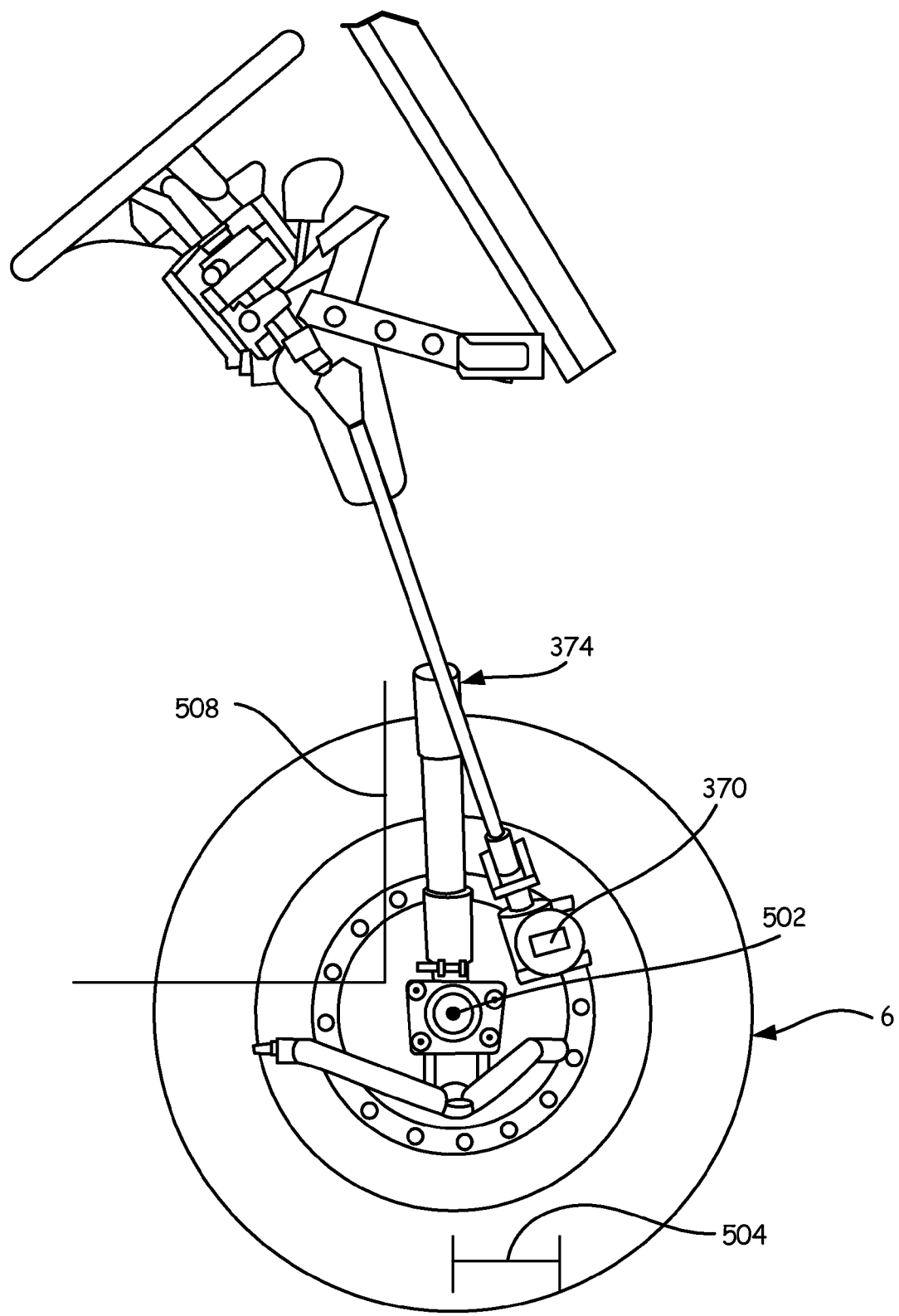
FIG. 33A is a side view of the steering assembly and front suspension assembly.
Figure 33B:
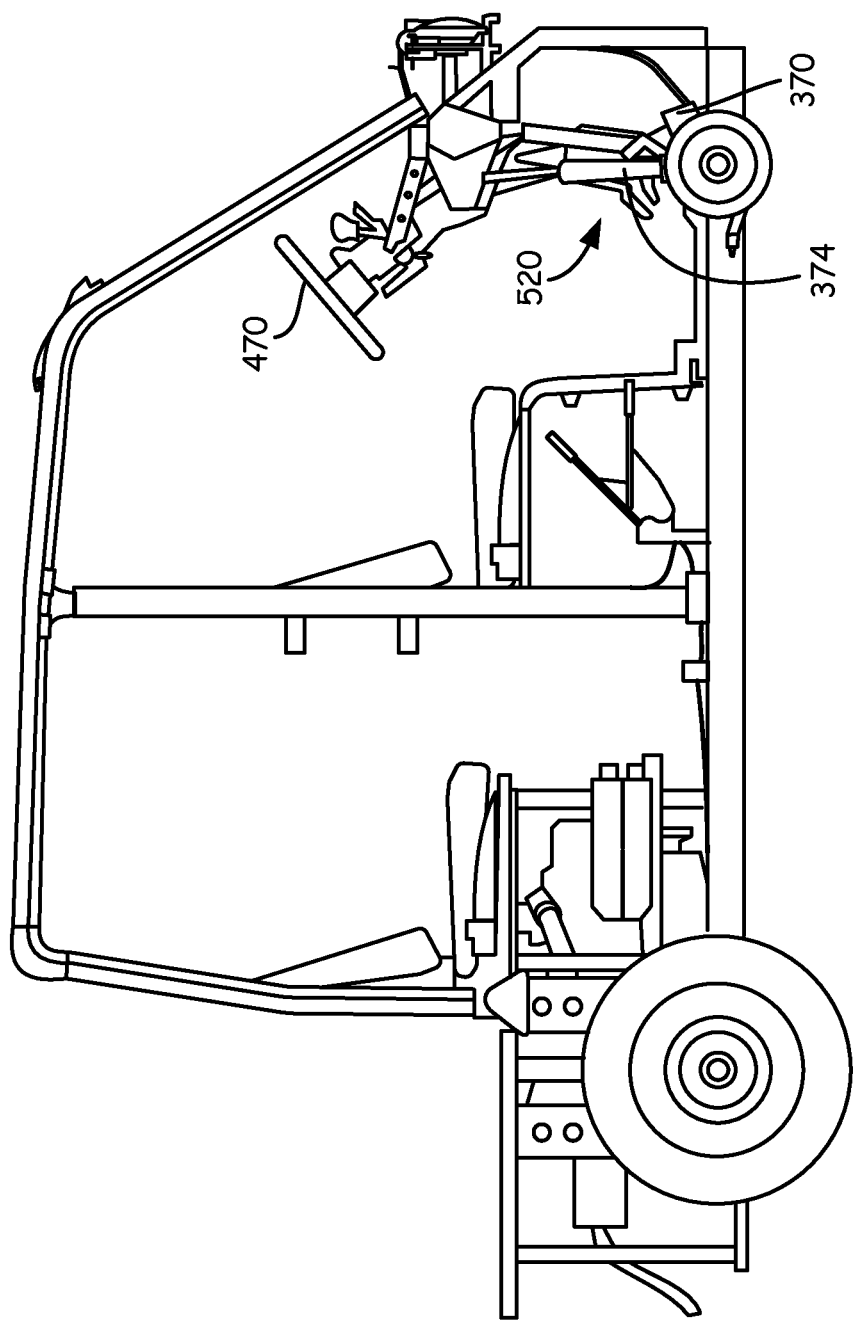
FIG. 33B is a right side view of the vehicle of the present embodiment including a driver and passengers.

With reference to FIGS. 31 and 33A, the use of struts 374, as opposed to an upper alignment arm (as in the case of dual A-arm suspensions), the location of the strut attachment provides more lateral space for the operator's feet. For example in FIG. 31, the lateral attachment point for strut 374 is positioned a distance 500 laterally outward of the inner attachment point of alignment arm 452. Had an upper A-arm been employed, that much lateral room would have been sacrificed. With reference to FIG. 33A, steering gear 370 is positioned forward of an axial center line 502 of front wheels 8 by a distance of 504, which moves steering motor away from a quadrant 508 required for the operator's controls. In fact, and with reference to FIGS. 33A and 33B, operator controls 520 are shown including an accelerator pedal 522, brake pedal 524, and clutch pedal 526. This is made possible by the use of struts 374, as well as having the steering gear 370 forward of the center line 502 (FIG. 33A) of wheel 8.

Figure 34:
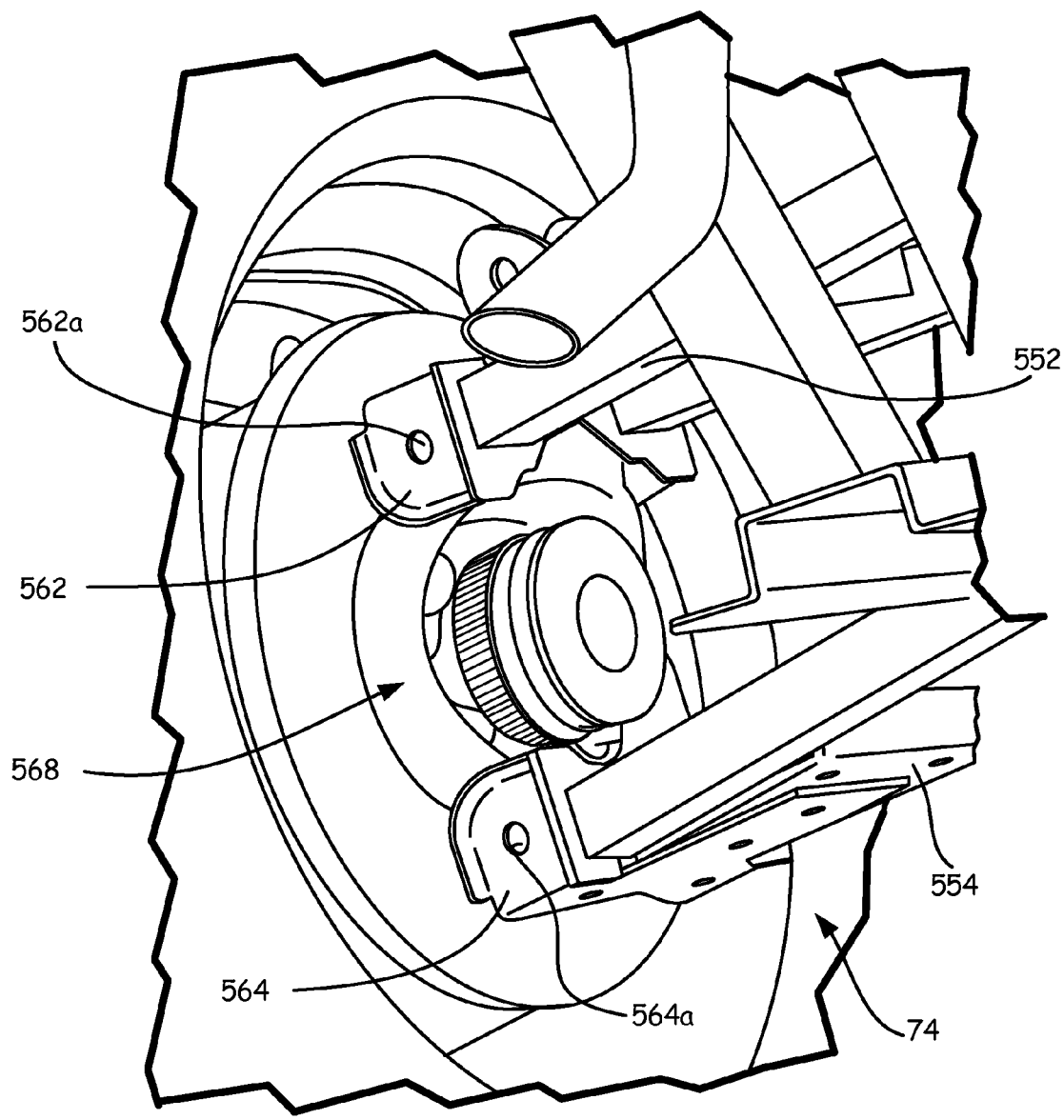
FIG. 34 is a perspective view of the rear suspension assembly.
Figure 35:
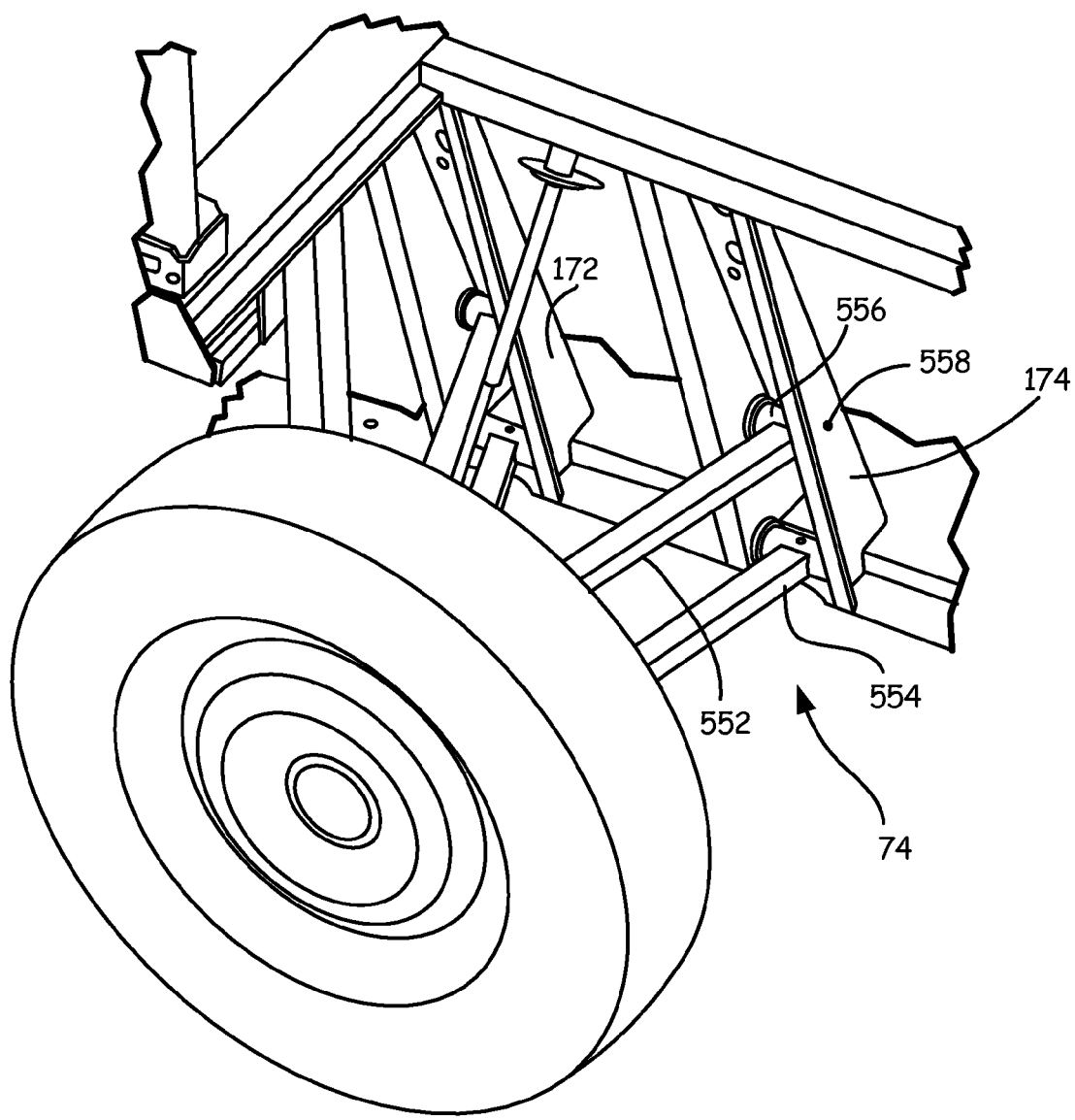
FIG. 35 is a perspective view of the rear suspension assembly.

With reference now to FIGS. 34-38, rear suspension will be described in greater detail. With reference first to FIGS. 34 and 35, rear suspension 74 includes upper and lower alignment arms 552 and 554, respectively, pivotally coupled within channel brackets 172, 174 (FIG. 35). Each alignment arm inner end includes a coupling 556, which is received within channel brackets 172, 174, and channel brackets includes apertures such as 558 aligned with the couplings 556. Fasteners (not shown) may thereafter be positioned through the apertures 558 and couplings 556. Alignment arms 552 and 554 include at an outer end, couplings 562 and 564 coupled to spindle assembly 568.

In one aspect of the present disclosure, the front couplings 454, and rear couplings 556, include a plastic bearing portion over molded on a rigid (such as metal) circular coupling.

Figure 36:
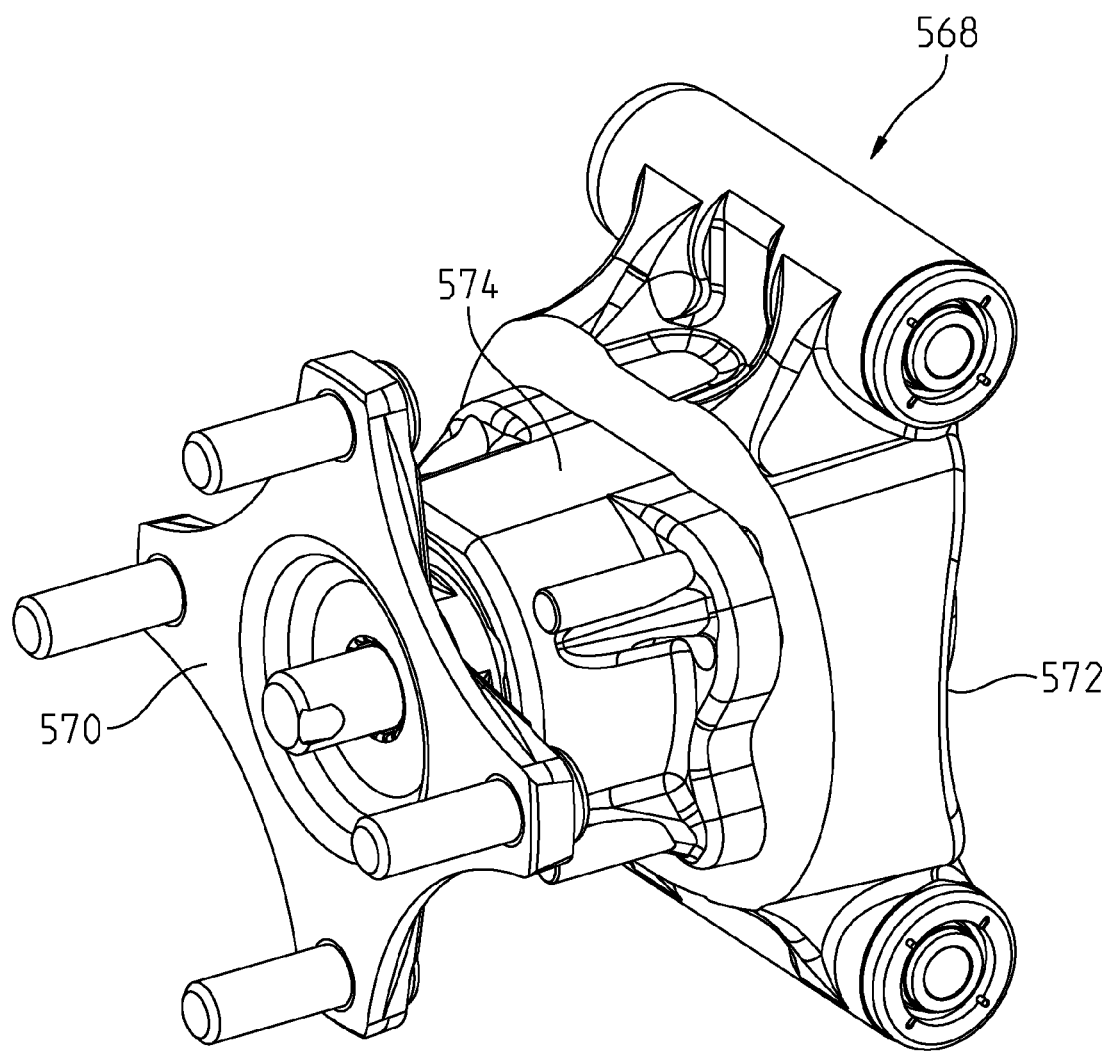
FIG. 36 is a left perspective view of the spindle assembly of the rear suspension assembly.
Figure 37:
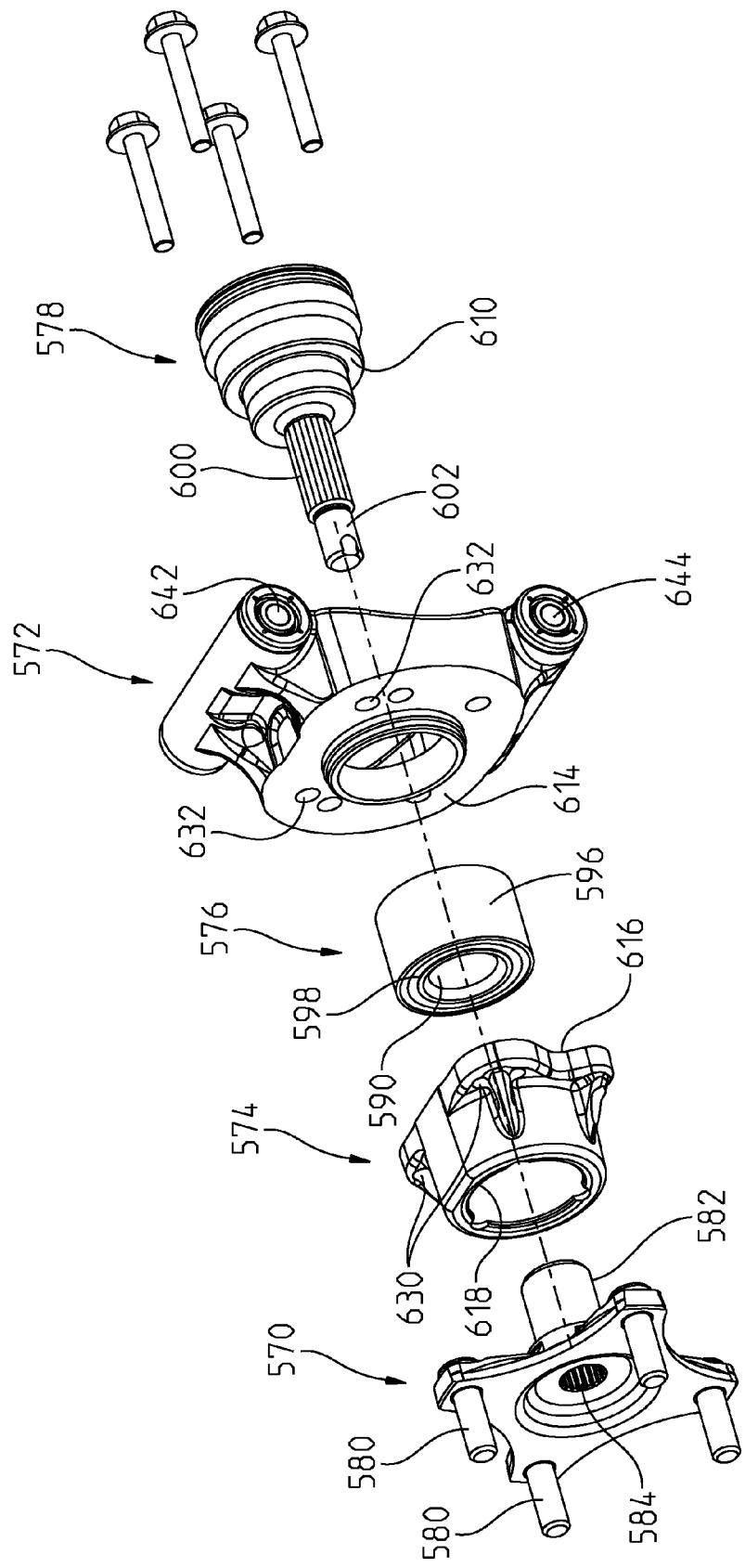
FIG. 37 is an exploded view of the spindle assembly of FIG. 36.
Figure 38:
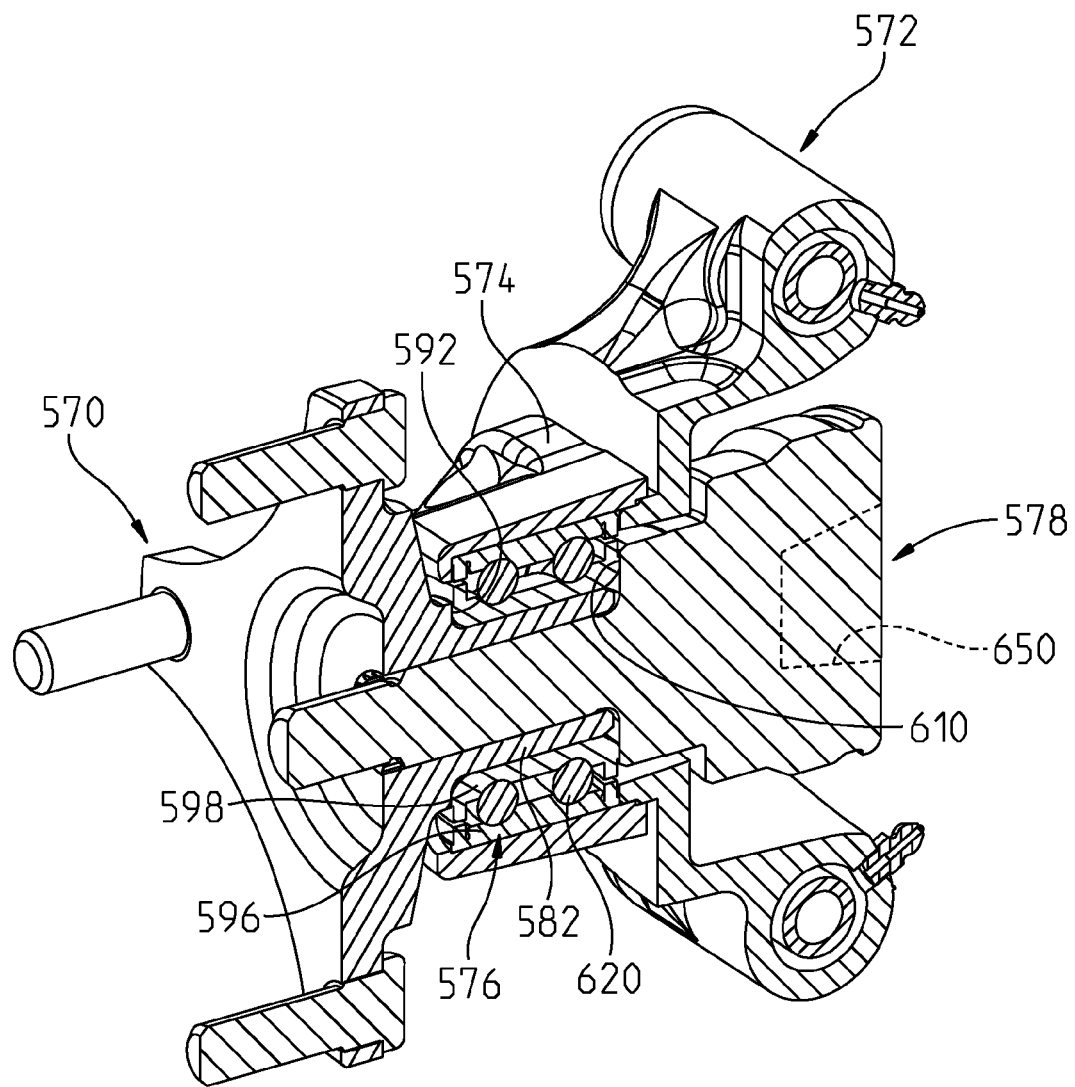
FIG. 38 is a cross sectional view of the spindle assembly of FIG. 36.
Figure 39:
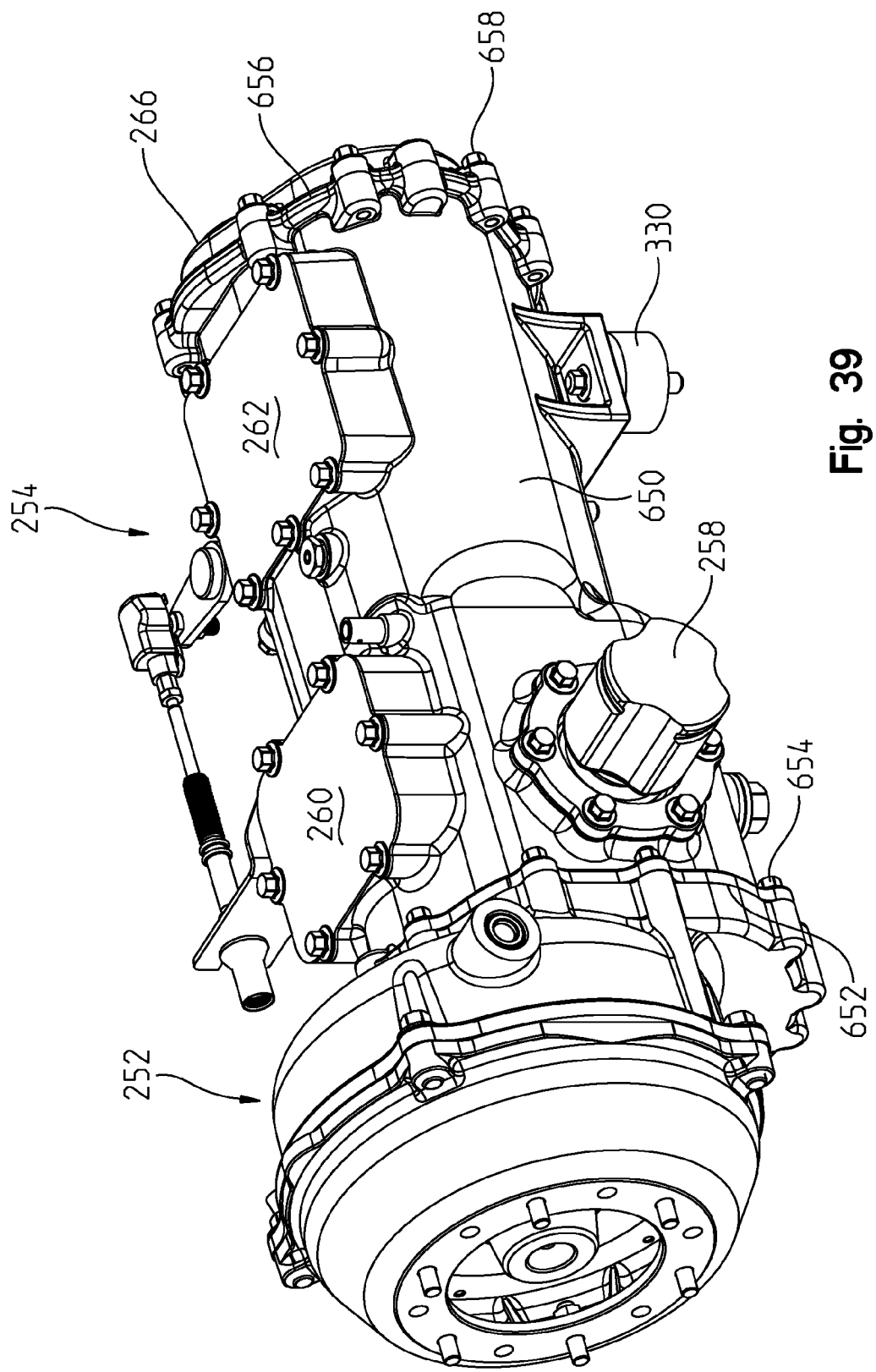
FIG. 39 is a front left perspective view showing the transmission for the powertrain of the present embodiment.

With reference now to FIGS. 36-38, spindle assembly 568 will be described in greater detail. Spindle assembly 568 includes hub 570, knuckle 572, backing plate 574, bearing 576, and drive member 578. As shown, hub 570 includes a plurality of fasteners at 580 for attachment to wheel 8. Hub 570 includes an arbor portion 582, which is internally splined at 584. As shown best in FIG. 37 bearing 576 has an opening at 590, and as best shown in FIG. 38, arbor portion 582 extends into opening 590, where a length of the arbor portion 582 as measured from shoulder 592 is less than a width of bearing 590. As shown in FIG. 38, bearing 576 includes an outer race at 596 and an inner race at 598.

Drive member 578 (FIG. 37) includes a shaft portion at 600 which is splined to cooperate with the splines in opening 584 of hub 570. Drive member 578 further includes a threaded portion at 602, which when coupled together with hub member 570 trap inner race 598 between shoulder 592 of hub 570 and between shoulder 610 of drive member 578.

It should also be appreciated that knuckle 572 includes a front face at 614, (FIG. 37) which receives face 616 of backing plate 574. Backing plate 574 includes a lip at 618, which presses against outer race 586 of bearing 576 when backing plate 574 is coupled to face 614 (FIG. 38). Thus the upper race of bearing 576 is fixed relative to backing plate 574 and knuckle 572; and lower race 598 is fixed relative to hub 570 and drive member 578. Roller bearings 620 trapped between the inner and outer races 596, 598 allow the rotation of 596, 598.

This construction allows the hub to support the load of the wheel by way of the hub being inserted into the bearing 576 and drive member 578 being splined relative to the hub. As shown, backing plate also has an alignment feature based upon the number of, and alignment of, apertures 630, 632. It should be appreciated then that end bracket 562 of upper alignment arm 552 (FIG. 34) includes an aperture at 562a, which aligns with aperture 642 of knuckle 572 (FIG. 37); and that end bracket 564 includes an aperture 564a (FIG. 34), which aligns with aperture 644 of knuckle 572 (FIG. 37).

Figure 40:
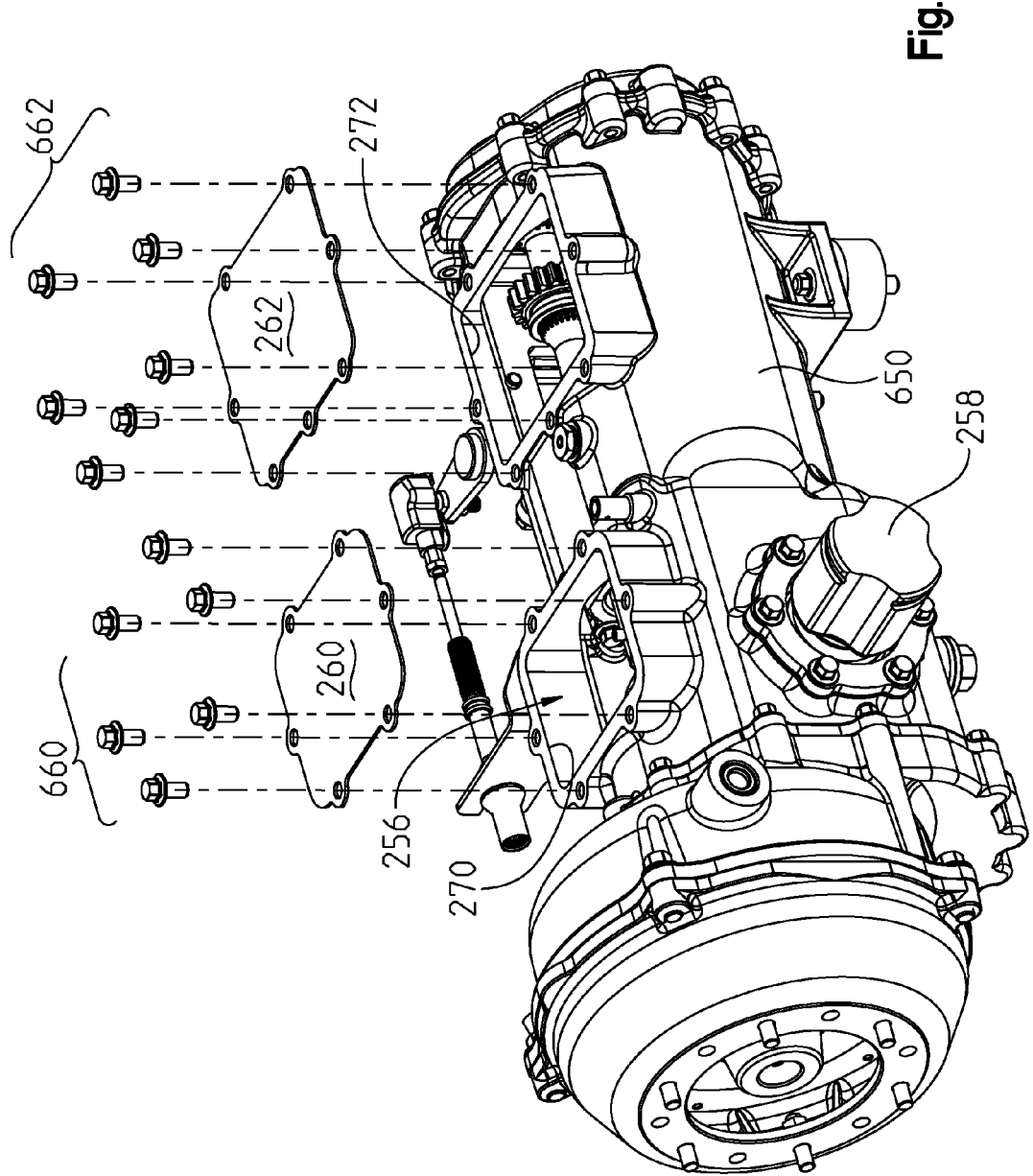
FIG. 40 is a view similar to that of FIG. 9 showing the covers removed.
Figure 41:
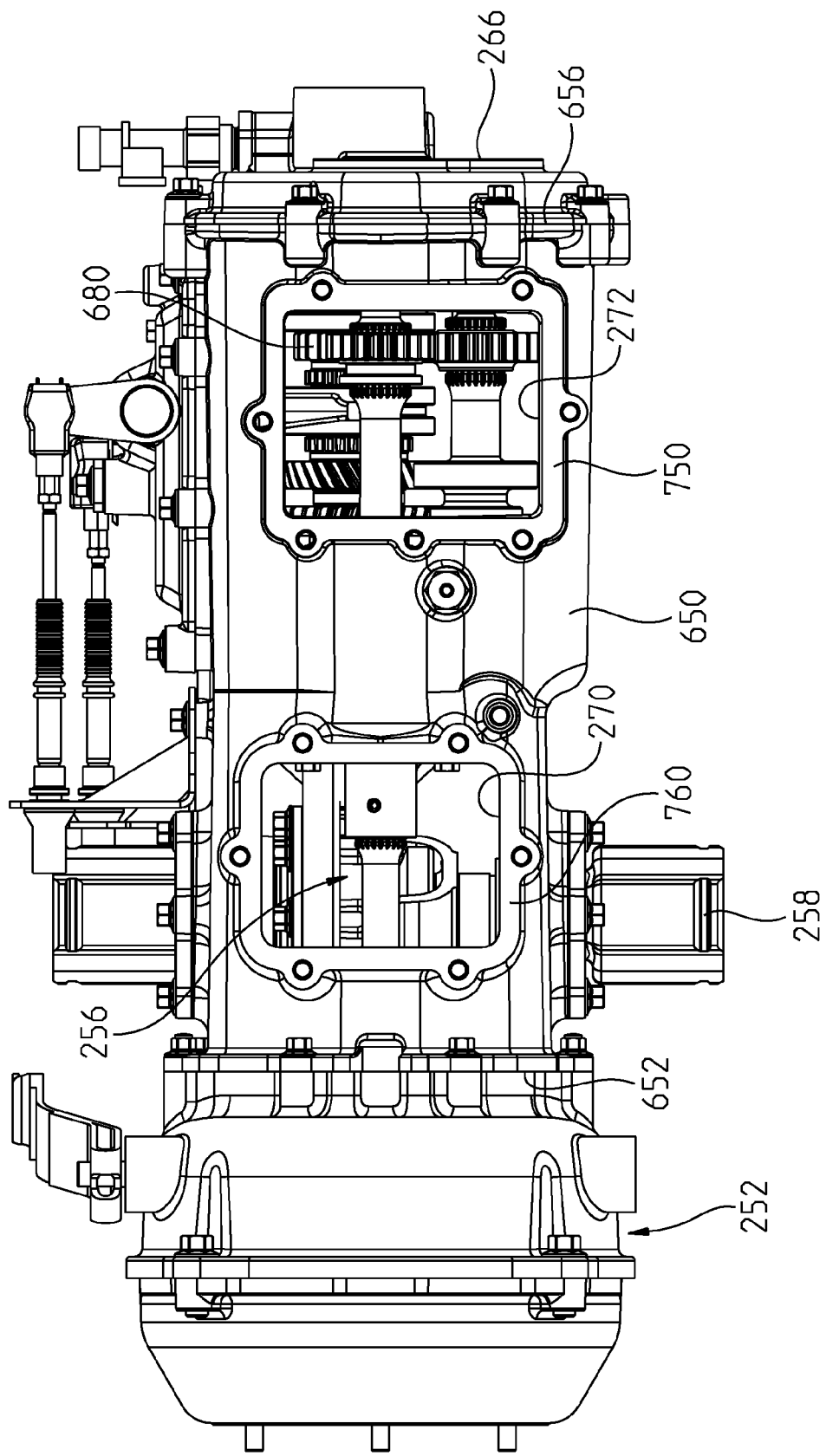
FIG. 41 is a top view of the transmission of FIG. 39.

With reference now to FIGS. 39-47, transmission 254 will be described in greater detail. As shown, transmission 254 includes a housing 650 having a first and front end 652, to which clutch 252 is coupled by way of fasteners 654. Housing 650 includes a second and rear end 656 to which rear cover 266 is coupled by way of fasteners 658. With reference to FIG. 40, covers 260 and 262 are shown removed from housing 650 by the way of removal of fasteners 660 and 662. The removal of cover 260 yields access to opening 270 overlying final drive portion 256. Removal of cover 262 yields access to opening 272 and a portion of the transmission gearing as described herein.

Figure 42:
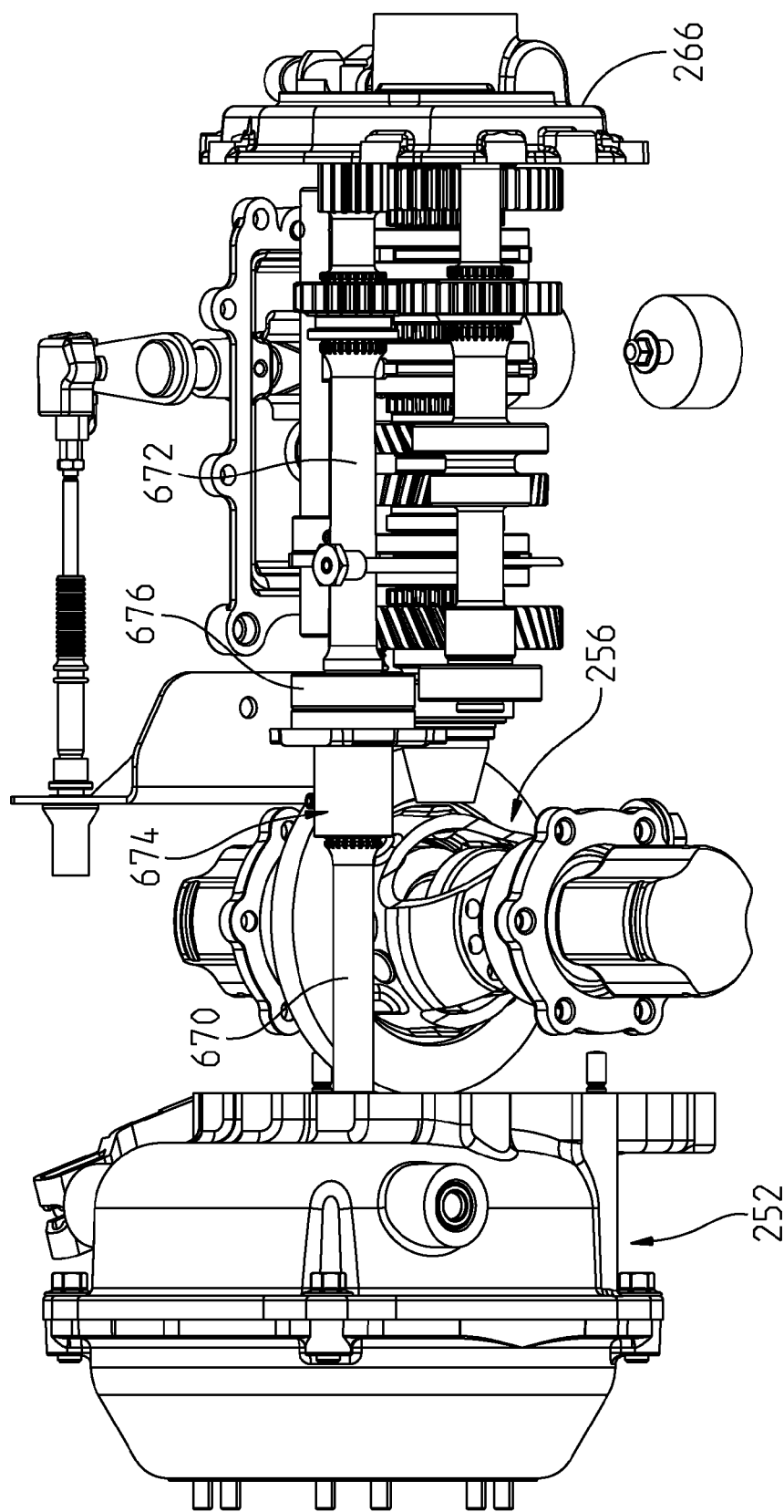
FIG. 42 is a view of the transmission showing the transmission housing removed.
Figure 43:
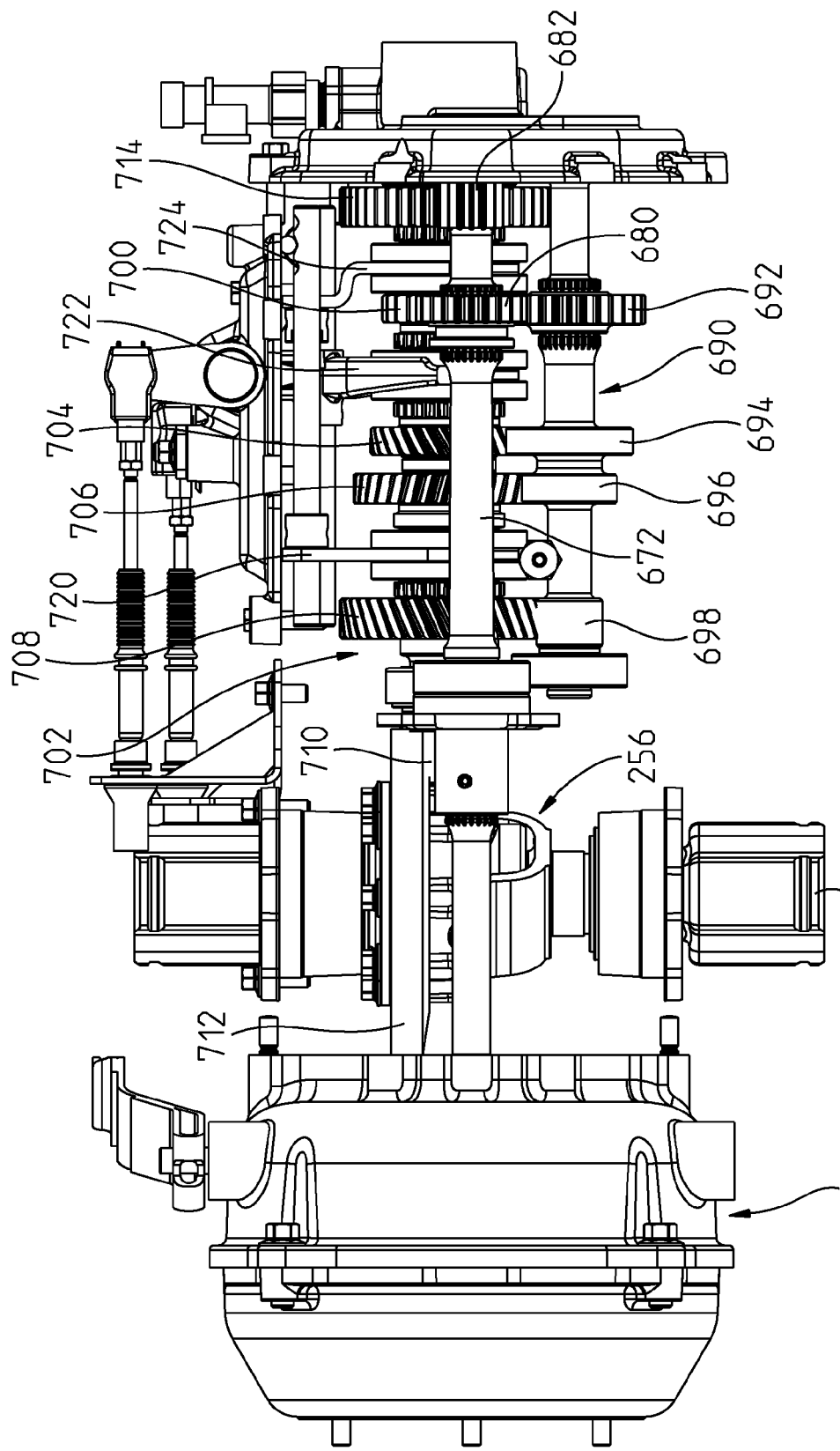
FIG. 43 is a view similar to that of FIG. 42 from the top.
Figure 44:
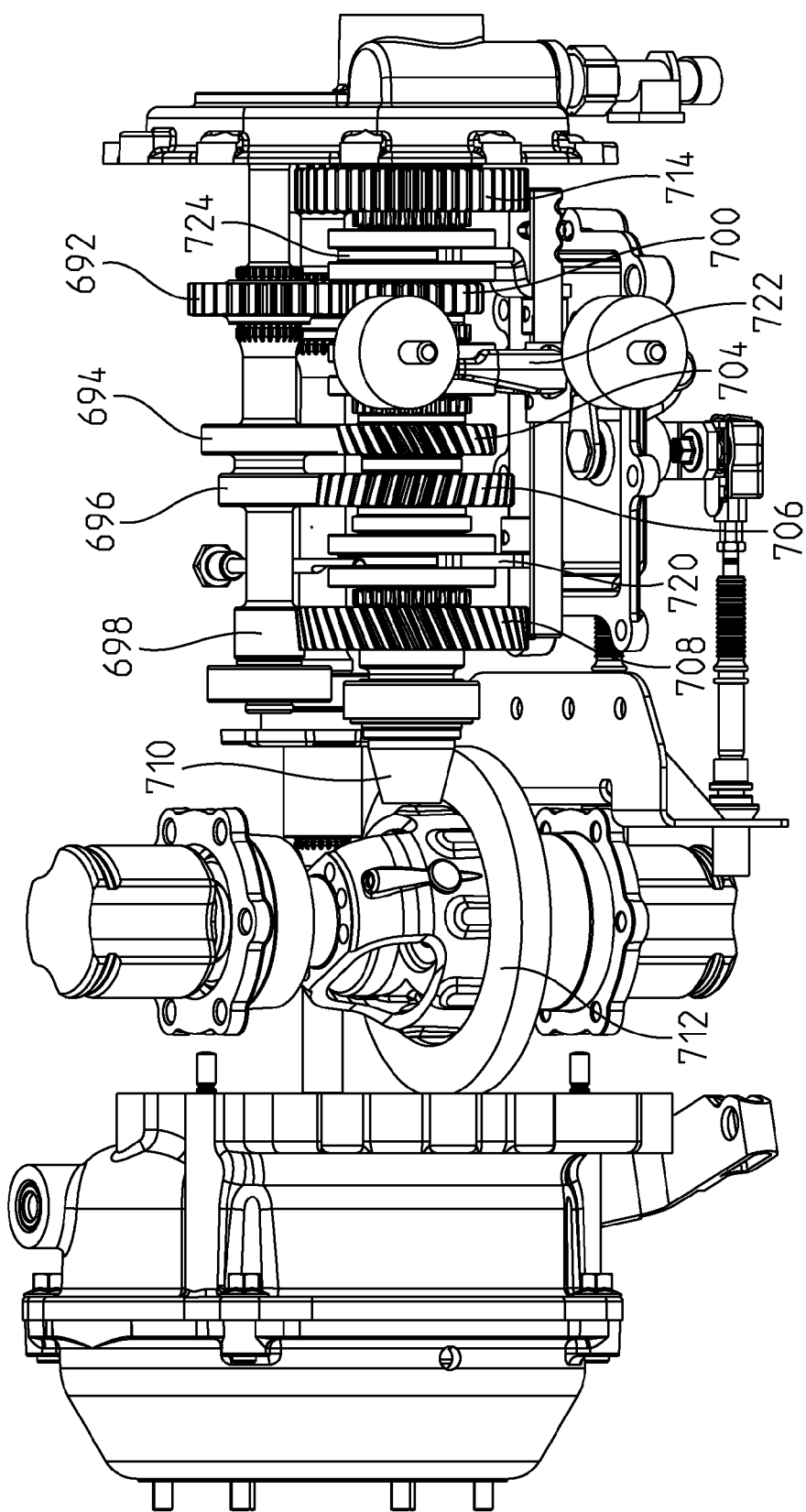
FIG. 44 is an underside view of the transmission shown in FIG. 42.

With reference to FIGS. 42-47, the internal construction of transmission 254 will be described in greater detail. As shown in FIG. 42, housing 650 has been removed, which exposes the internal construction of the transmission shafts. It should be appreciated from FIGS. 42 and 43 that all of the transmission shafts are parallel to a longitudinal direction of the transmission 254. As shown, transmission output shaft 670 extends rearwardly from clutch 252 and is joined to transmission input shaft 672 by way of coupler assembly 674. Input shaft 672 is fixed longitudinally and is held encapsulated in place by a front bearing 676 and a rear bearing encapsulated in rear cover 266. With reference to FIG. 43, input shaft 672 includes drive gear 680 and a pinion 682 positioned at the end of shaft 672. The transmission also includes idler shaft 690 having driven gear 692 in meshing engagement with gear 680 and gears 694, 696, and 698. Gear 692 is in meshing engagement with gear 700 on driven shaft 702. Gear 694 is in meshing engagement with gear 704, gear 696 is in meshing engagement with 706, and gear 698 is in meshing engagement with gear 708. A bevel gear 710 is directly connected to shaft 702 and is in engagement with bevel ring gear 712. At the opposite end of shaft 702 is a reverse gear 714, which cooperates with pinion gear 682 and is described herein.

It should be appreciated that gears 700, 704, 706, 708, and 714 freely spin on its associated shaft 702 and only become in engagement with shaft 702 when engaged by a dog clutch. As shown, dog clutch 720 operates first and second speeds where first speed is accommodated by gears 698, 708; second gear is accommodated by gears 696, 706. It should be appreciated that dog clutch 720 moves to the left as viewed in FIG. 43 to affect first gear, and moves to the right to accommodate second gear. Dog clutch 722 is used to accommodate third and fourth gears, where dog clutch 722 is moved to the left to engage gears 694, 704 and to the right to accommodate gears 692, 700. Dog clutch 724 is movable to the right to engage pinion gear 682 and reverse gear 714 for the reverse gear.

Thus, with reference again to FIG. 41, when cover 262 (FIG. 28) is removed, direct access to gear 680 is provided through opening 272. Therefore, an accessory power takeoff unit (PTO) may be attached over opening 672 onto flange 750 and held in place by fasteners 662 (FIG. 40). Thus, with the transmission in the neutral position (which is FIG. 43 position) an output PTO shaft could be driven off of gear 680 and extend rearwardly in the opposite direction of the engine towards the rear of the vehicle.

With reference again to FIG. 41, when cover 260 (FIG. 28) is removed, direct access to differential 256 is provided through opening 270. Thus, an accessory differential lock may be positioned opening 270 over flange 760 and held in place by fasteners 660 (FIG. 40). The differential lock could selectively lock differential 256 providing the effect of a solid axle.

Figure 45:
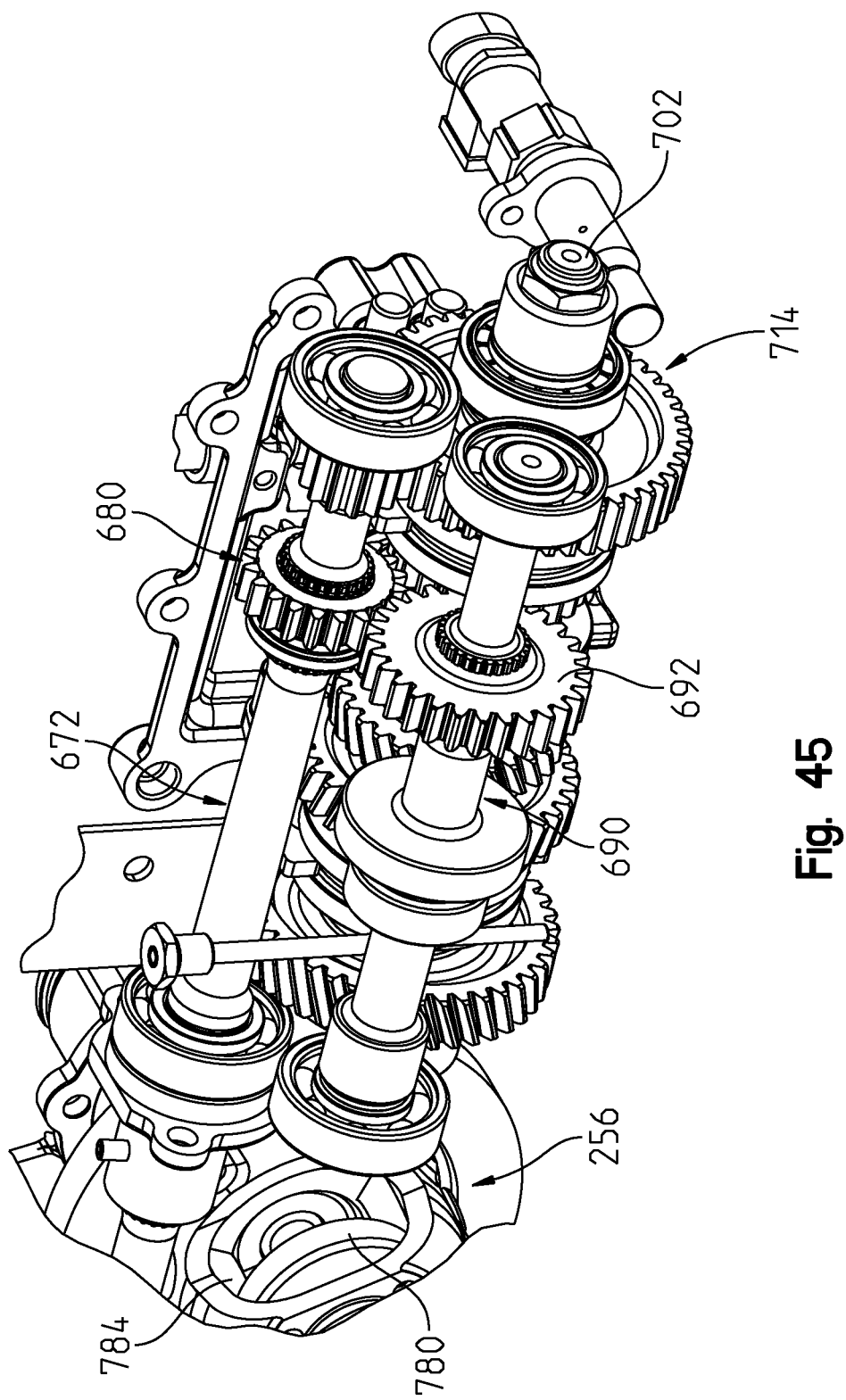
FIG. 45 is a perspective view of the transmission shown in FIG. 42.
Figure 46:
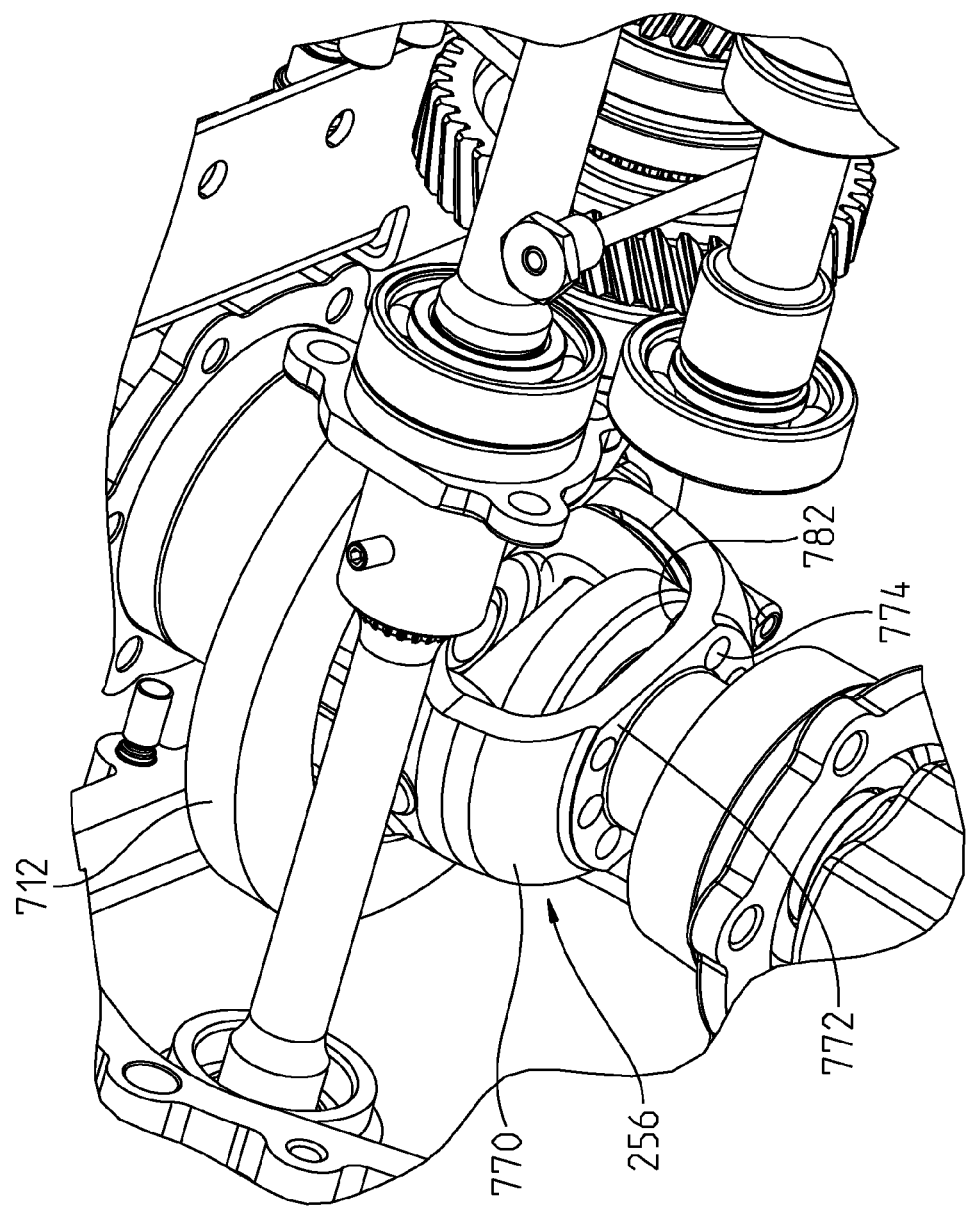
FIG. 46 is an enlarged perspective view over the differential.

As shown best in FIGS. 45 and 46, differential 256 includes a differential cage 770 having an outer flange at 772 with apertures 774 located therethrough. Differential further comprises differential gears 780 having apertures 782. Differential gears 780 are coupled together by differential gears 784. Thus, the differential lock would comprise a locking pin, spring loaded for example, which could when engaged, ride against flange 772, and lock together apertures 774 and 782.

With reference now to FIG. 45, when rear cover 266 is removed from housing 650, drive shaft 672, idler shaft 690, and driven shaft 702 are accessed. Do to the rearward location of the input drive gears, the overall gear ratio of the transmission can be changed without removing the transmission completely from the vehicle. Rather, and with reference first to FIG. 45, the transmission overall gear ratio can be changed by changing gears 680 and 692. This is accommodated by pulling gear 714 off of shaft 702, removing shaft 672 and replacing gear 680, and removing idler shaft 690 and replacing gear 692. The transmission is reassembled in the opposite sense and the cover is replaced.

With reference now to FIGS. 47-49, an alternate transmission is shown. The transmission is shown generally at 790, and in this embodiment, a dedicated PTO shaft 792 protrudes from the cover 266 for connection to an auxiliary component. The shaft 792 is coupled to the transmission drive as described above, but is always coupled. A cover 794 is positioned over the shaft 792 to cover the rotating shaft, but is easily removable and replaceable.

Other aspects of the vehicle include the engine cooling system. As shown in FIG. 14, the frame 4 includes openings 800 therethrough, and the vehicle includes a fan (not shown) in front of the engine for cooling purposes.

The fuel system includes a gas tank 820, see FIGS. 25 and 26, supported by pedestal 822, and a fuel pump (not shown) to deliver fuel to engine 250.

The components of the vehicle such as the frame 4 is typically constructed of a structural material, such as a steel or aluminum, whereas the body components, such as the hood 12, side panels 14, roof 16, utility box 20 and doors 42 and 44 are constructed of a plastic material similar in nature to the same components on the Polaris Ranger RZR and Ranger products.

Several designs of the vehicle also provide for enhanced ergonomics and efficiency. Items include mounting for spare tire 830 (FIG. 19) being provided internally of the hood 12. As mentioned before, gear shifter 530 is located on the dashboard, as opposed to the floor, allowing more efficient use of the front seat. Also, as mentioned before, the steering is located well into the front of the vehicle; in fact the steering is located within the first 20% of the vehicle as measured from the outer body to the steering wheel. Also, as the engine is under the rear seat, the space under the front seat could be utilized for storage. Also, as the outer body components of the vehicle are mainly molded plastic parts, the vehicle can utilize an expansion retainer, similar to that shown and described in U.S. Pat. No. 7,975,640; the subject matter of which is incorporated herein by reference. Also the dashboard 838 (FIG. 1) could include a snap out panel 840 and include a music docking station for an MP3 player, with integrated speakers in another portion of the dash 838.

The vehicle also provides the provision for seat belts, see rear belts 850 in FIG. 21. In one embodiment, the seat belt brackets 852 (FIG. 22) are mounted to channel 140. It is also possible to mount the brackets 852 to seat bottom 52a which will fold out of the way as described above. Alternatively, the brackets 852 could be mounted to a lower edge of frame 230. Still alternatively, the brackets 852 could be mounted to the frame 4, with the seat belts coming up through the space between the seat bottoms and seat backs.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
   a plurality of ground engaging members;
   a frame supported by the ground engaging members and including a front frame portion and a rear frame portion, the frame defining a longitudinal axis, the frame including a support for a front seating area and a rear seating area;
   front seats supported by the front frame portion having a seat bottom and a seat back, the seat back having a rear panel portion;
   rear seats supported by the rear frame portion having a seat bottom and a seat back, the seat back having a rear panel portion, and the seat bottom being supported by a structural panel of the rear frame portion;
   an engine supported by the frame, the engine being positioned under the rear seating area; and
   a utility box being positioned behind the rear seats, the utility box having a first configuration where a front of the utility box is defined by the rear panel portion of the rear seat back and an enlarged configuration where a front of the utility box is defined by the rear panel portion of the front seat, and wherein the utility box has a floor which is substantially planar with the structural panel.

2. The utility vehicle of claim 1, wherein the rear seat bottom is removable whereby the structural panel defines a first floor portion of the enlarged cargo floor.

3. The utility vehicle of claim 2, wherein the rear seat back is removable whereby the rear seat panel portion defines a second floor portion of the enlarged cargo floor.

4. A utility vehicle, comprising:
   a plurality of ground engaging members;
   a frame supported by the ground engaging members and including a front frame portion and a rear frame portion, the frame defining a longitudinal axis, the frame including a support for a front seating area and a rear seating area;
   front seats supported by the front frame portion having a seat bottom and a seat back, the seat back having a rear panel portion;
   rear seats supported by the rear frame portion having a seat bottom and a seat back, the seat back having a rear panel portion;
   a utility box being positioned behind the rear seating area;
   the rear seat bottom is positioned on a structural panel, and the rear seat bottom is removable whereby the rear seat bottom structural panel defines a floor portion of the enlarged cargo floor; and
   the rear seat back is removable whereby the rear seat back rear panel defines another floor portion of the enlarged cargo floor.

5. The utility vehicle of claim 4, wherein the utility box having a first configuration where a front of the utility box is defined by the rear seat panel portion and an enlarged configuration where a front of the utility box is defined by the front seat panel portion.

* * * * *